United States Patent
Xia et al.

(10) Patent No.: US 12,273,920 B2
(45) Date of Patent: Apr. 8, 2025

(54) COLLISION DETECTION AND COLLISION RESOLUTION FOR PRIORITIZED FULL DUPLEX COMMUNICATION

(71) Applicants: SONY GROUP CORPORATION, Tokyo (JP); SONY CORPORATION OF AMERICA, New York, NY (US)

(72) Inventors: Qing Xia, San Jose, CA (US); Li-Hsiang Sun, San Jose, CA (US); Mohamed Abouelseoud, Burlingame, CA (US); Liangxiao Xin, Santa Clara, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 401 days.

(21) Appl. No.: 17/819,285

(22) Filed: Aug. 11, 2022

(65) Prior Publication Data
US 2023/0070940 A1 Mar. 9, 2023

Related U.S. Application Data

(60) Provisional application No. 63/261,062, filed on Sep. 9, 2021.

(51) Int. Cl.
*H04W 74/0816* (2024.01)
*H04W 74/08* (2009.01)
*H04W 84/12* (2009.01)

(52) U.S. Cl.
CPC ... *H04W 74/0816* (2013.01); *H04W 74/0875* (2013.01); *H04W 84/12* (2013.01)

(58) Field of Classification Search
CPC ......... H04W 74/0816; H04W 74/0875; H04W 84/12
See application file for complete search history.

(56) References Cited

U.S. PATENT DOCUMENTS 8,503,340 B1 * 8/2013 Xu ................. H04W 84/12
370/310
10,149,322 B2 * 12/2018 Liu .................. H04W 74/0816
(Continued)

FOREIGN PATENT DOCUMENTS

JP 2005123887 A 5/2005
JP 2016500227 A 1/2016
(Continued)

OTHER PUBLICATIONS

Ahn Hyeongtae et al: "Collision decoding and reporting: A new collision resolution approach using full-duplex radio in WLANs", Ad Hoc Networks, Elsevier, Amsterdam, NL, vol. 106, Jun. 3, 2020 (Jun. 3, 2020), XP086214949, ISSN: 1570-8705, DOI: 10.1016/J. ADHOC.2020.102238.
(Continued)

*Primary Examiner* — Mounir Moutaouakil
(74) *Attorney, Agent, or Firm* — O'BANION & RITCHEY LLP; John P. O'Banion

(57) ABSTRACT

A preamble-based collision detection mechanism for use in wireless local area networks (WLANS), having one or more full-duplex (FD) stations. In addition, a new collision resolution estimation and scheduling mechanism is described for prioritized communication. These techniques can allow for more rapid collision detection and resolution, without the need of performing self-interference (SI) estimation. The techniques includes use of orthogonal preambles, in the time domain and/or frequency domain, into which FD stations embed priority information.

20 Claims, 42 Drawing Sheets

(56) References Cited

U.S. PATENT DOCUMENTS

| | | | |
|---|---|---|---|
| 10,412,677 B2* | 9/2019 | Choi | H04W 52/0238 |
| 10,973,051 B2* | 4/2021 | Lou | H04W 74/0816 |
| 12,075,471 B2* | 8/2024 | Xia | H04W 74/0808 |
| 2014/0146764 A1* | 5/2014 | Kim | H04W 74/006 370/329 |
| 2016/0174240 A1* | 6/2016 | Li | H04W 72/56 370/329 |
| 2018/0124835 A1 | 5/2018 | Lee | |
| 2018/0262232 A1 | 9/2018 | Nabetani | |
| 2019/0013923 A1 | 1/2019 | Liu | |
| 2019/0208571 A1* | 7/2019 | Ahn | H04W 74/08 |
| 2021/0091978 A1 | 3/2021 | Aboul-Magd | |
| 2021/0144640 A1 | 5/2021 | Wang | |
| 2022/0053560 A1* | 2/2022 | Xin | H04W 28/0268 |
| 2023/0070940 A1* | 3/2023 | Xia | H04W 74/0816 |
| 2024/0340951 A1* | 10/2024 | Dong | H04W 72/04 |

FOREIGN PATENT DOCUMENTS

| | | |
|---|---|---|
| JP | 2018152723 A | 9/2018 |
| JP | 2022539407 A | 9/2022 |
| WO | 2021004079 | 1/2021 |
| WO | WO-2021001746 A | 1/2021 |

OTHER PUBLICATIONS

Genadiy Tsodik (Huawei): "Improving System Efficiency using Full Duplex Based Collision Detection", IEEE Draft; 11-18-1019-01-00FD-Improving-System-Efficiency-Using-Full-Duplex-Based-Collision-Detection, IEEE-SA Mentor, Piscataway, NJ USA vol. 802.11 FD, No. 1 May 24, 2018 (May 24, 2018), pp. 1-10, XP068126248.

Kome Oteri (Interdigital): "Technical Report on Full Duplex for 802.11—FD Architecture", IEEE Draft; 11-18-1225-02-00FD-Technical-Report-On• Full-Duplex-For-802-11-FD-ARCHITECTURE, IEEE-SA Mentor, Piscataway, NJ USA vol. 802.11 FD, No. 2 Jul. 11, 2018 (Jul. 11, 2018), pp. 1-11, XP068128357.

Sameer Vermani (Qualcomm): "Open Issues on Preamble Design", IEEE Draft; 11-20-1238-11-00BE-Open-Issues-On-Preamble-Design, IEEE-SA Mentor, Piscataway, NJ USA vol. 802.11 EHT; 802.11be, No. 11 Nov. 3, 2020 (Nov. 3, 2020), pp. 1-26, XP068174858.

Yan Xin (Huawei Technologies), Technical Report on Full Duplex for 802.11 , IEEE 802.11-18/0498r8 , Sep. 18, 2018.

* cited by examiner

Standalone Frame

Asymmetric FD

Symmetric FD

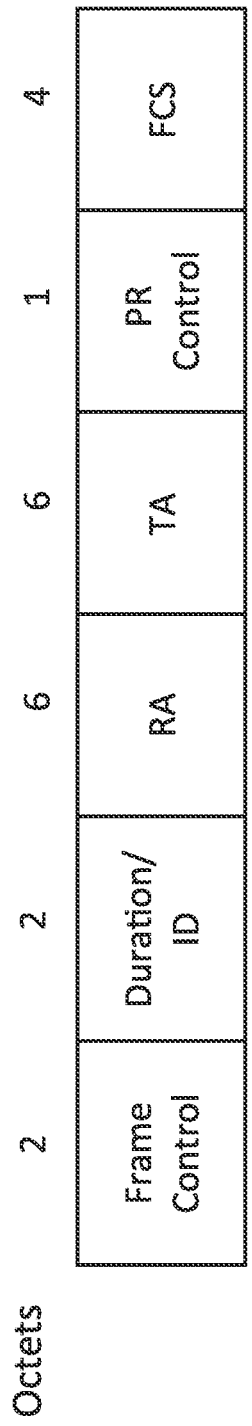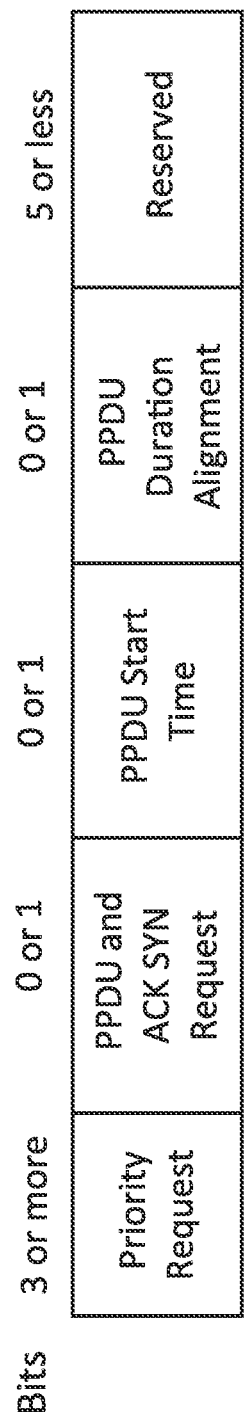
FIG. 48 P-RTS frame format
FIG. 49 PR control field

P-CTS frame format

PR control field

PR+CDP frame format

PR+CDP control field

COLLISION DETECTION AND COLLISION RESOLUTION FOR PRIORITIZED FULL DUPLEX COMMUNICATION

CROSS-REFERENCE TO RELATED APPLICATIONS

This application claims priority to, and the benefit of, U.S. provisional patent application Ser. No. 63/261,062 filed on Sep. 9, 2021, incorporated herein by reference in its entirety.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

STATEMENT REGARDING FEDERALLY SPONSORED RESEARCH OR DEVELOPMENT

Not Applicable

BACKGROUND

1. Technical Field

The technology of this disclosure pertains generally to wireless local area networks (WLANS), and more particularly to full-duplex WLANS which address self-interference issues.

2. Background Discussion

The use of Full Duplex (FD) technology on wireless local area networks (WLANs) is becoming increasingly important as it has the capability of increasing spectral efficiency.

However, in using FD, issues arise with self-interference (SI) of an FD device as received by the same device through transceiver coupling and multipath reflections.

Accordingly, there is a need for FD technology which addresses SI issues. The present disclosure fulfills that need and provides additional benefits.

BRIEF SUMMARY

A new preamble-based collision detection apparatus and method, which can be performed without Self Interference (SI) estimation. Also disclosed is a new collision resolution estimation and scheduling mechanism for communication with prioritized traffic.

The collision detection (CD) mechanism is able to detect collisions more rapidly using orthogonal (e.g., time/frequency domain) preambles in time domain or in frequency domain. In at least one embodiment the priority information is embedded in a preamble. The priority levels can be predetermined and agreed by all FD STAs. This priority information can be embedded in a FD preamble field following the legacy preamble field defined in 802.11. The FD STA can handle detection of colliding preambles in different ways, which can depend on relative priority.

In at least one embodiment, the mechanism can guarantee prioritized transmission after the process of intra-BSS collision estimation, such as FD STAs indicating priority in control frames used for collision avoidance, and/or an FD scheduler STA allowing higher priority traffic to be processed no later than the lower priority traffic when intra-BSS collision is estimated.

In at least one embodiment, an FD STA can initiate a Transmit Opportunity (TXOP) with a Ready-To-Send/Clear-to-Send (RTS/CTS) exchange.

There are many possible implementations of the disclosed technology, examples of which are described throughout the specification.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 48 is a data field diagram of a P-RTS frame according to at least one embodiment of the present disclosure.

FIG. 49 is a data field diagram of a PR request field from FIG. 48, according to at least one embodiment of the present disclosure.

DETAILED DESCRIPTION

1. Previous State of the Art

Full Duplex (FD) technology is under discussion in the 802.11 FD Technical Interest Group (TIG), and at this writing there is no standard for FD tech. Benefits of FD include the ability to simultaneously transmit and receive wireless signals sharing the same frequency resource; thus, providing the potential to double the spectral efficiency of bidirectional links compare to half-duplex links.

The challenge is to efficiently and sufficiently cancel the self-interference (SI) which is transmitted by an FD device and received by the same device through transceiver coupling and multipath reflections.

There are numerous use cases for the technology, including for example Virtual Reality (VR), Artificial Reality (AR), telemedicine, and so forth.

1.1. Self-Interference Cancellation (SIC)

Figure 2:
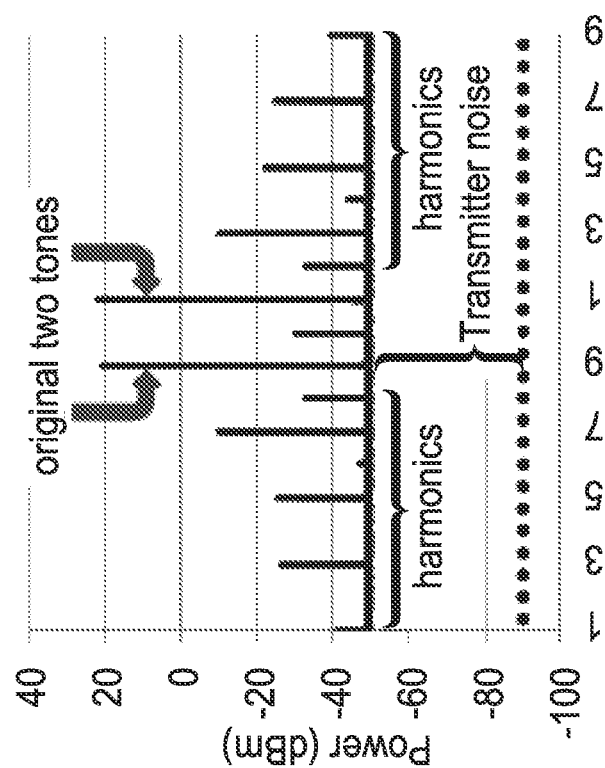
FIG. 1 and FIG. 2 are plots comparing what is thought to be transmitted versus what is actually received to demonstrate various noise sources including SI.
Figure 1:
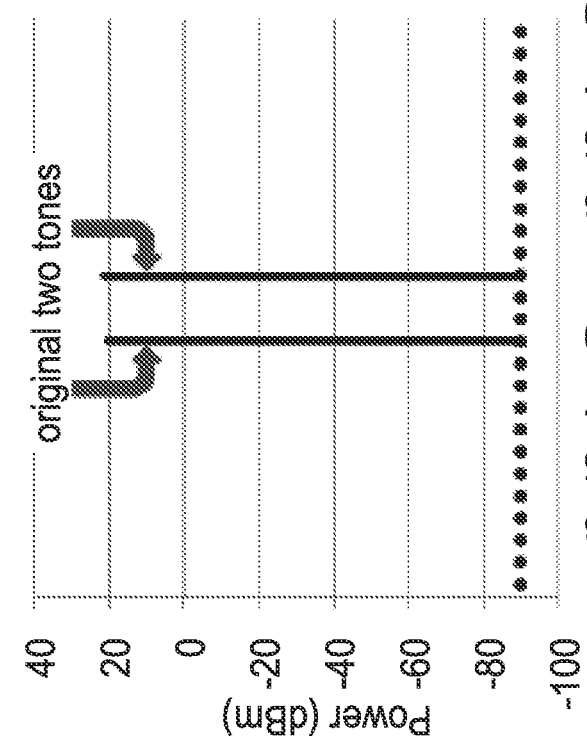

FIG. 1 and FIG. 2 depicts the spectrum (power and frequency) of an expected transmission (FIG. 1), and what was actually transmitted (FIG. 2). The result is that a signal originally transmitted by a STA is as seen in FIG. 1, however, the actual transmitted signal is as depicted in FIG. 2. The numerous analog components in the transceiver distort the original signal as seen in FIG. 1, by adding transmitter noise and harmonics to the transmitted signal, resulting in the signal received as per FIG. 2.

Figure 3:
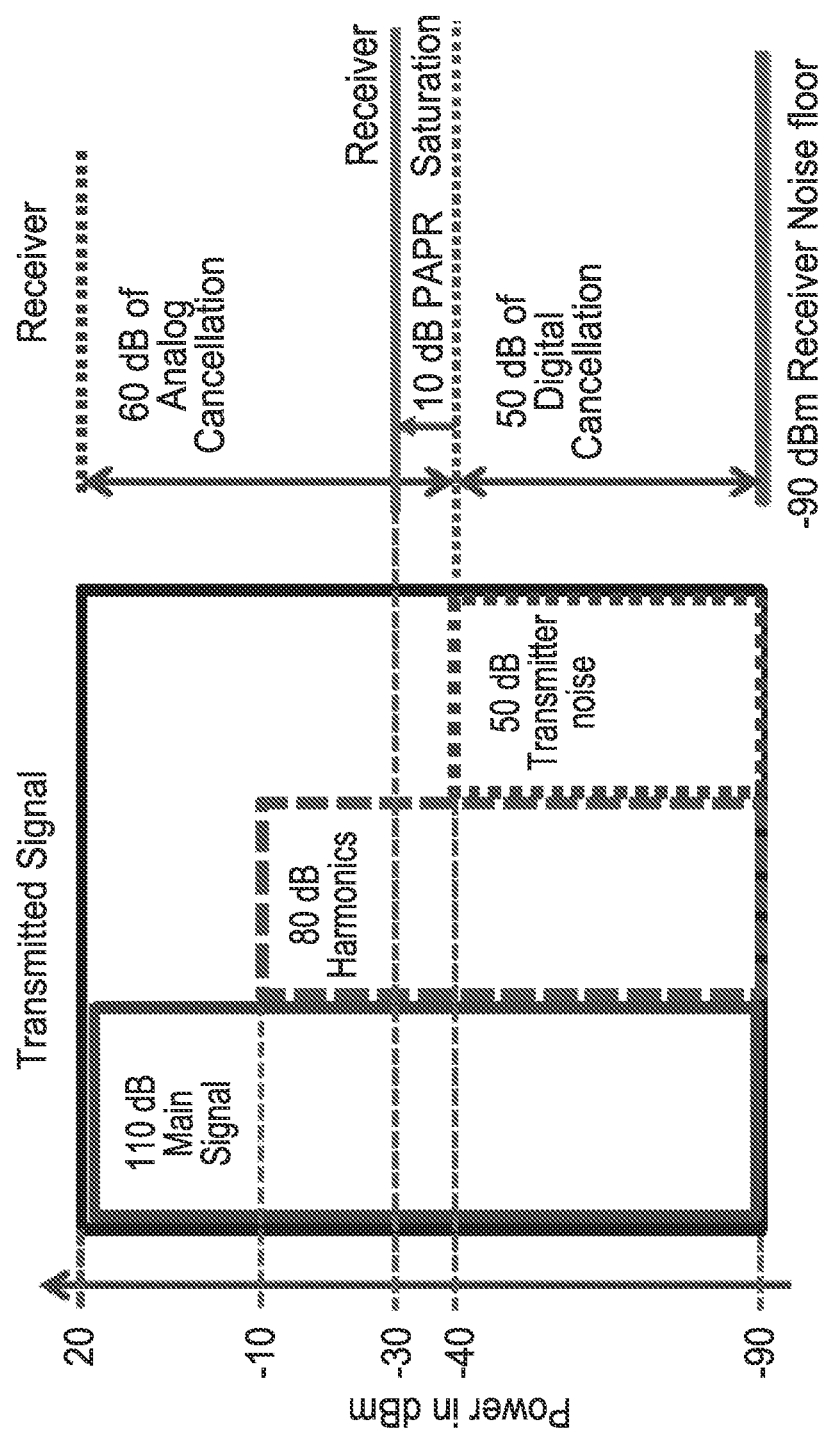
FIG. 3 is a chart of SIC requirements of analog and digital cancellation based of a transmitted signal with its sub-component.

FIG. 3 depicts Self-Interference Cancelation (SIC) requirements for FD to sufficiently cancel any self-interference so that the interference power is reduced down to the level of the receiver noise floor (−90 dBm). On the left of the figure is seen the transmitted signal comprising 110 dB main signal, 80 dB of harmonics, and 50 dB of transmitter noise. On the right of the figure is seen what is picked up at the receiver and the contributions of noise cancelation, which includes 60 dB of analog SIC cancellation, with which the receiver chain satisfies the 10 dB of Peak-to-Average-Power-Ratio (PAPR) at receiver saturation, and 50 dB of digital SIC cancellation, the use of SIC results in the −90 dBm receiver noise floor.

Accordingly, an SIC should provide the following capabilities. (1) Any FD system should provide 110 dB of linear self-interference cancellation to reduce SI to the receiver noise floor. This can eliminate the strongest main signal component (110 dB) above the noise floor. (2) A FD system shall reduce non-linear harmonic components that are 80 dB above the noise floor. (3) Any FD system shall have an analog cancellation component that provides at least 50 dB of analog noise cancellation to cancel the transmitter noise. (4) Since receiver (RX) chain in radios can get saturated if the input signal is beyond a particular level which is determined by their Analog-to-Digital-Converter (ADC) resolution. As seen in FIG. 3, since the transmitted SI can be as high as 20 dBm, thus, a FD system needs to have an analog cancellation that provides 60 dB of SI reduction to satisfy the requirement of Rx saturation level with 10 dB margin for Peak to Average Power Ratio (PAPR) considered. In addition, a digital cancellation that provides 50 dB of SI reduction results in a Receiver Noise Floor achieving −90 dBm.

1.2. Prioritized Communication

In 802.11 Intra-access category (AC) communication prioritization provides six transmit queues that map to four enhanced distributed channel access functions (EDCAFs) to differentiate between traffic streams in the same AC to finer prioritize between AC_VI streams or AC_VO streams.

1.3. Previously Proposed Solutions

Collision detection has been proposed for stopping concurrent transmissions from FD devices based on FD assisted collision detection to avoid wasted time caused by collisions. Further FD assisted EDCA access with contention resolution is also proposed to accelerate the recovery from collision. FD assisted Carrier-Sense-Multiple-Access/Collision Avoidance (CSMA/CA) has been proposed to improve the efficiency of existing MAC protocol. An FD preamble has been proposed which needs to be flexible enough to facilitate self-interference cancellation (SIC).

Figure 4:
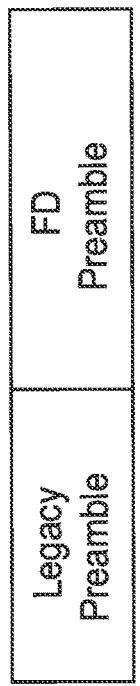
FIG. 4 and FIG. 5 depict an FD preamble that may be specified as a FD standalone training frame as in FIG. 4, or appended to the existing frames as is seen in FIG. 5.
Figure 5:
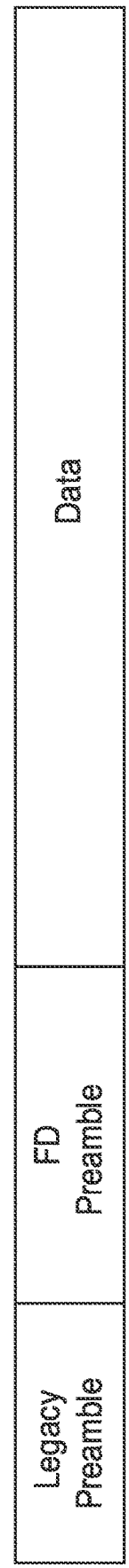

FIG. 4 and FIG. 5 depict an FD preamble that may be specified as a FD standalone training frame as in FIG. 4, or appended to the existing frames as is seen in FIG. 5.

Self-interference cancellation (SIC) has been proposed which analyzes and/or proposes resolutions to cancel self-interference for FD transceiver.

The existing solutions request the complete SIC. In addition, the current collision detection solutions cannot distinguish the different priorities of the colliding signals, and thus usually halts transmissions from both sides to avoid further collision.

2. Contribution of the Present Disclosure

Full Duplex (FD) collision detection methodologies are described which utilize prioritized preambles defined in a new FD preamble field. The collision detection of the prioritized preambles does not require complete Self-Interference Cancellation (SIC). The use of collision detection based on the FD preamble, without SIC, improves transmission efficiency of the detecting STAs, so it can halt transmitting the remainder of the Physical Layer Protocol Data Unit (PPDU) to avoid further collisions.

Additionally, the present disclosure describes another collision resolution method for the prioritized streams, which grants the higher prioritized streams with earlier access than the lower streams when an intra-BSS collision occurs.

3. Hardware Embodiments

Figure 6:
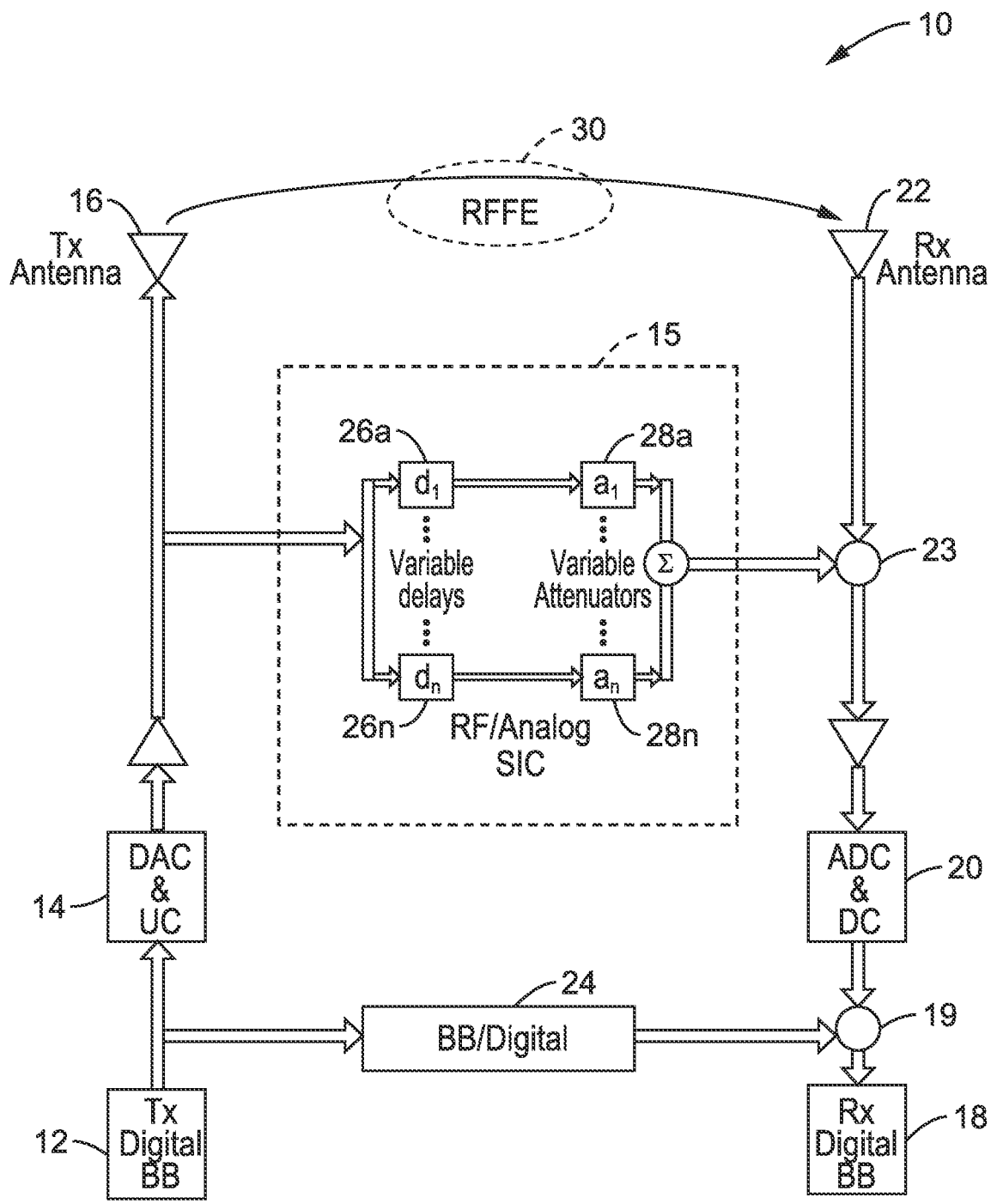
FIG. 6 is a block diagram of full duplex transceiver with analog and digital SIC, showing that between each pair of Tx chain and Rx chain, there are RF/analog Self-Interference-Cancellation (SIC) and baseband/digital SIC elements, according to at least one embodiment of the present disclosure.

FIG. 6 illustrates an example embodiment 10 of Self-Interference Cancelation (SIC) hardware as utilized in a station having a Radio Frequency Front End (RFFE) 30. This SIC hardware is utilized in wireless local area networks (WLANs), such as the STA seen below in FIG. 7 and the MLD seen in FIG. 8.

The Tx Digital BB 12 is the baseband Transmit (TX) signal. The baseband digital signal accumulates harmonics and transmitter noises through modulation of the Digital-to-Analog converter (DAC) and upconverter (UC) 14 to a passband signal. Before the transmitted signal goes to TX antenna 16, a small portion of the transmitted signal, which includes the transmitter noise, is passed through circuit 15 to do Analog SIC.

The SIC circuit consists of parallel fixed lines of varying delays 26a through 26n and tunable attenuators 28a through 28n. These lines are then collected and added up, and this combined signal is then subtracted 23 from the signal on the receive path.

The passband signal received from antenna 22, has SIC correction applied 23, and passes through analog to digital converter (ADC) and down converter (DC) 20. A digital SIC 24 is applied 19 to the baseband digital signal from the ADC and DC, to estimate the remaining residual self-interference, which includes the main TX SI after analog cancellation and any delayed reflections of this signal from the environment, to produce receiver digital baseband signal 18.

Figure 7:
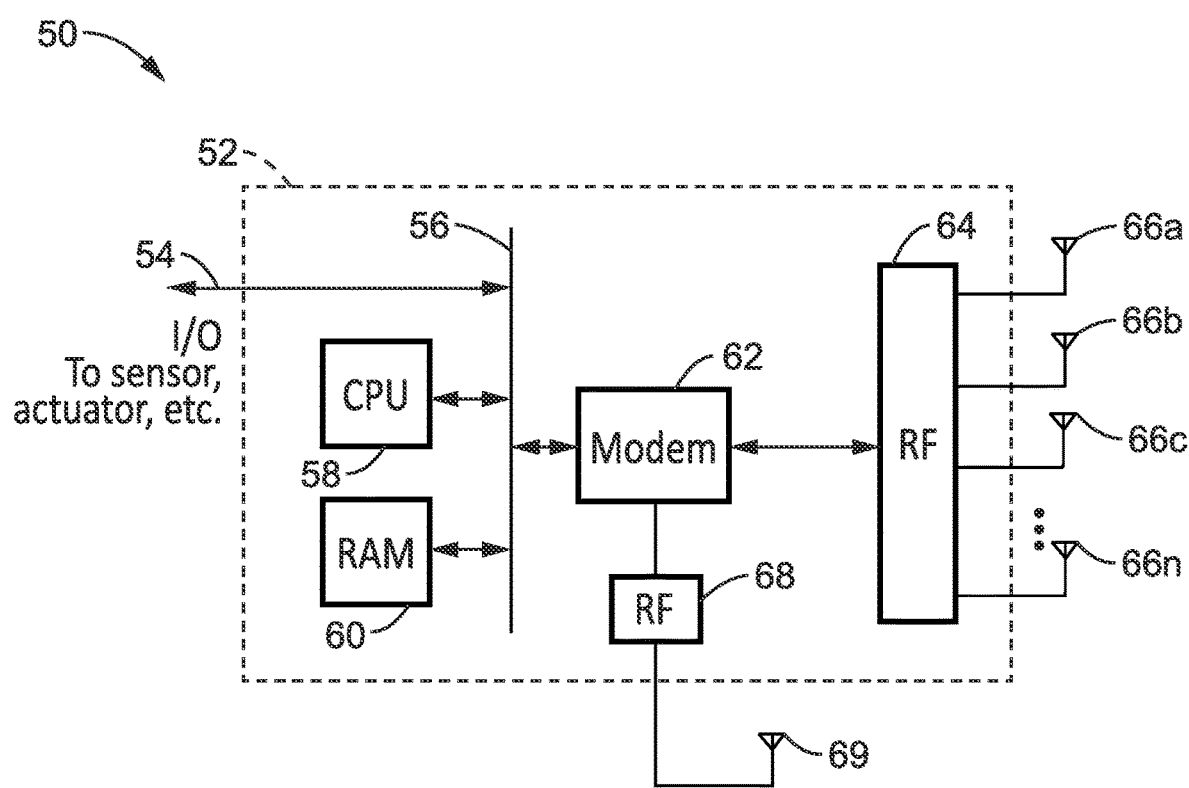
FIG. 7 is a hardware block diagram of wireless station (STA) hardware, according to at least one embodiment of the present disclosure.

FIG. 7 illustrates an example embodiment 50 of STA hardware configured for executing the protocol of the present disclosure. An external I/O connection 54 preferably couples to an internal bus 56 of circuitry 52 upon which are connected a CPU 58 and memory (e.g., RAM) 60 for executing a program(s) which implement the communication protocol. The host machine accommodates at least one modem 62 to support communications coupled to at least one RF module 64, 68 each connected to one or multiple antennas 69, 66a, 66b, 66c through 66n. An RF module with multiple antennas (e.g., antenna array) allows for performing beamforming during transmission and reception. In this way, the STA can transmit signals using multiple sets of beam patterns.

Bus 54 allows connecting various devices to the CPU, such as to sensors, actuators and so forth. Instructions from memory 60 are executed on processor 58 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. The present disclosure is primarily directed at the sub 6 GHz band.

It should be appreciated that the present disclosure can be configured with multiple modems 62, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware as shown in the figure, can be combined into a multi-link device (MLD), which typically will have a processor and memory for coordinating the activity, while there is not always a need for a separate CPU and memory for each STA within the MLD.

Figure 8:
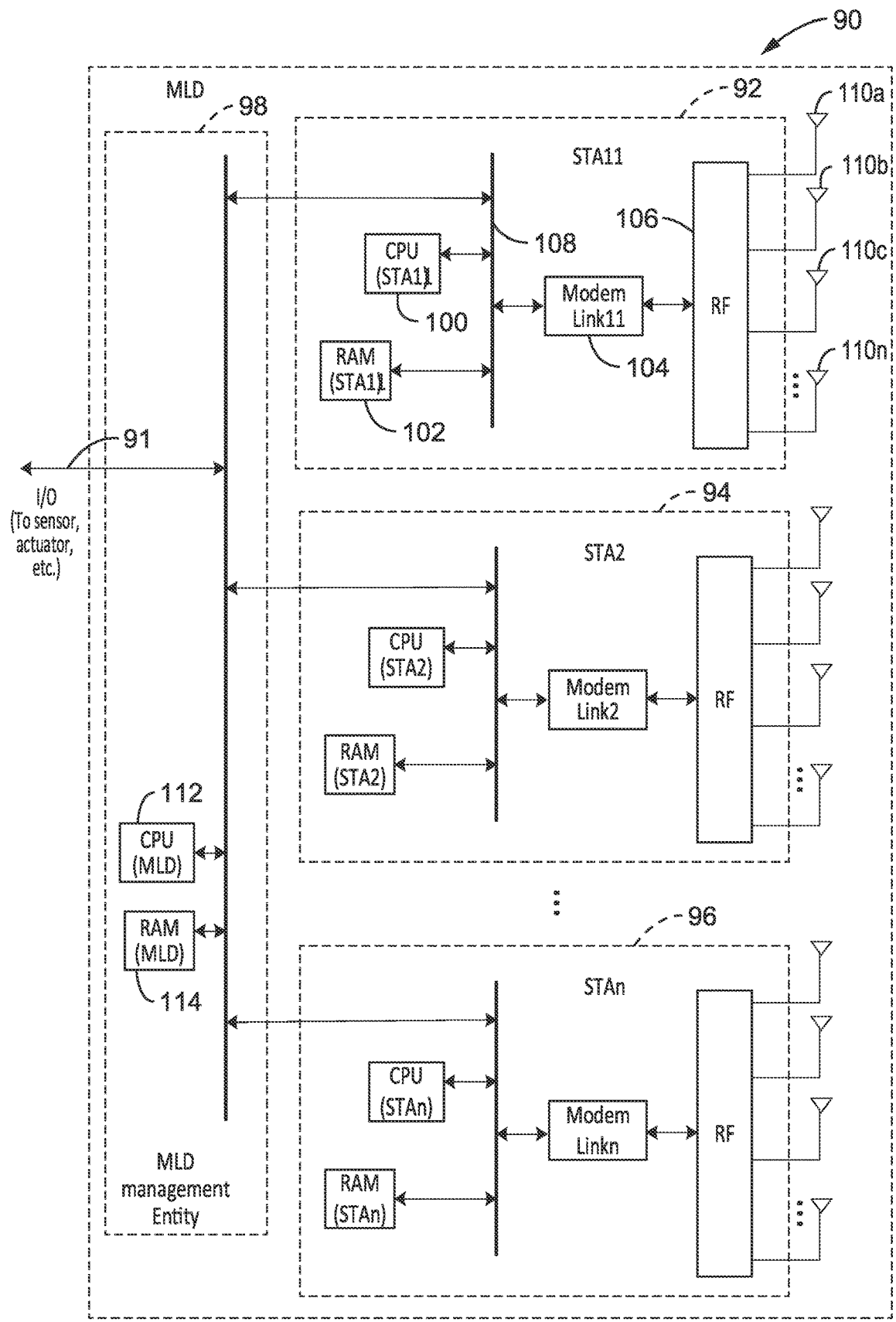
FIG. 8 is a hardware block diagram of a station configuration, such as contained in Multi-Link Device (MLD) hardware, according to at least one embodiment of the present disclosure.

FIG. 8 illustrates an example embodiment 90 of a multi-link device (MLD) hardware configuration. The MLDs may comprise a soft AP MLD, which is a MLD that consists of one or more affiliated STAs, which are operated as APs. A soft AP MLD should support multiple radio operations on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 98 having a CPU 112 and memory (e.g., RAM) 114 to allow executing a program(s) that implement communication protocols at the MLD level. The MLD can distribute tasks to, and collect information from, each affiliated station to which it is connected, exemplified here as STA1 92, STA2 94 through to STA_N 96 and the sharing of information between affiliated STAs.

In at least one embodiment, each STA of the MLD has its own CPU 100 and memory (RAM) 102, which are coupled through a bus 108 to at least one modem 104 which is connected to at least one RF circuit 106 which has one or more antennas. In the present example the RF circuit has multiple antennas 110a, 110b, 110c through 110n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

4. Architecture 4.1. Example FD Embodiments

Figure 9:
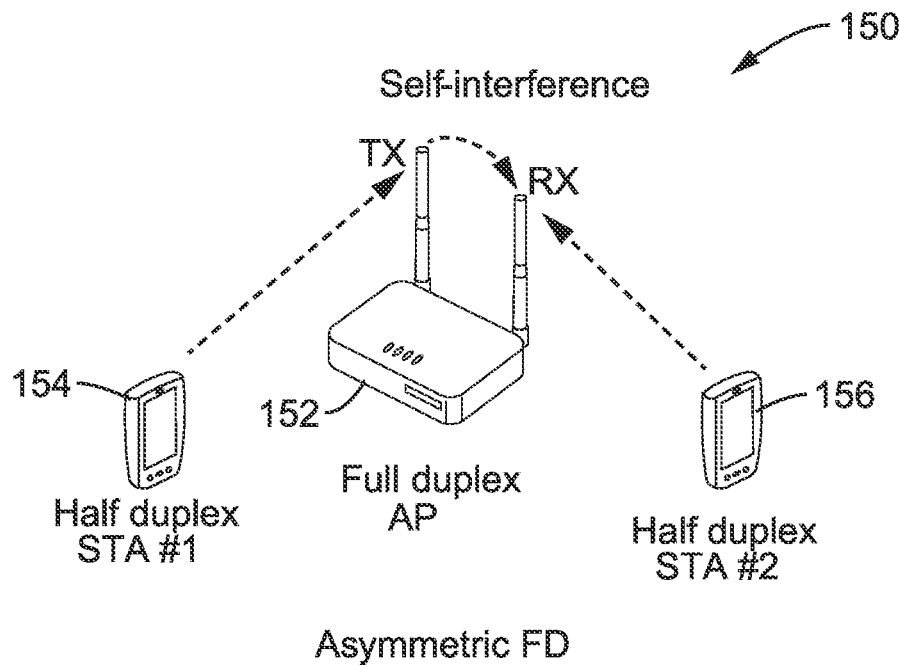
FIG. 9 is an example network topology for asymmetric FD as used for demonstration purposes according to at least one embodiment of the present disclosure.

FIG. 9 illustrates an example embodiment 150 of an asymmetric FD architecture, in which FD AP 152 is transmitting to FD STA1 154 and receiving from FD STA2 156 simultaneously. In this case, the transmitted signal from the TX antenna of FD AP creates self-interference and is received by the RX antenna of the FD AP.

Figure 10:
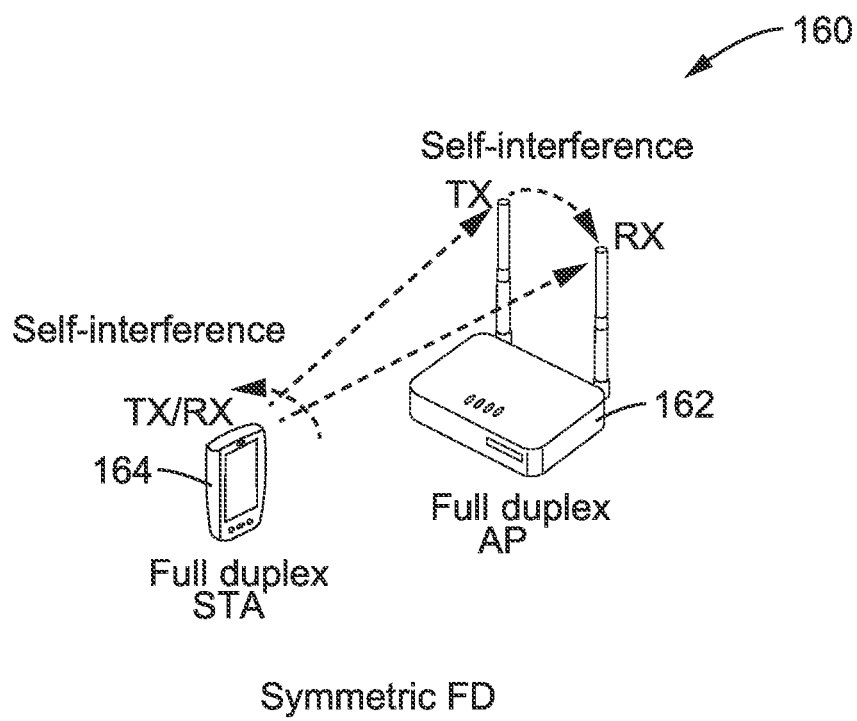
FIG. 10 is an example network topology for symmetric FD as used for demonstration purposes according to at least one embodiment of the present disclosure.

FIG. 10 illustrates an example embodiment 160 of a symmetric FD architecture, in which FD AP 162 is transmitting to, and receiving from, another FD STA 164. FD AP and FD STA receive self-interferences generated by themselves.

4.2. Network Topology

Figure 11:
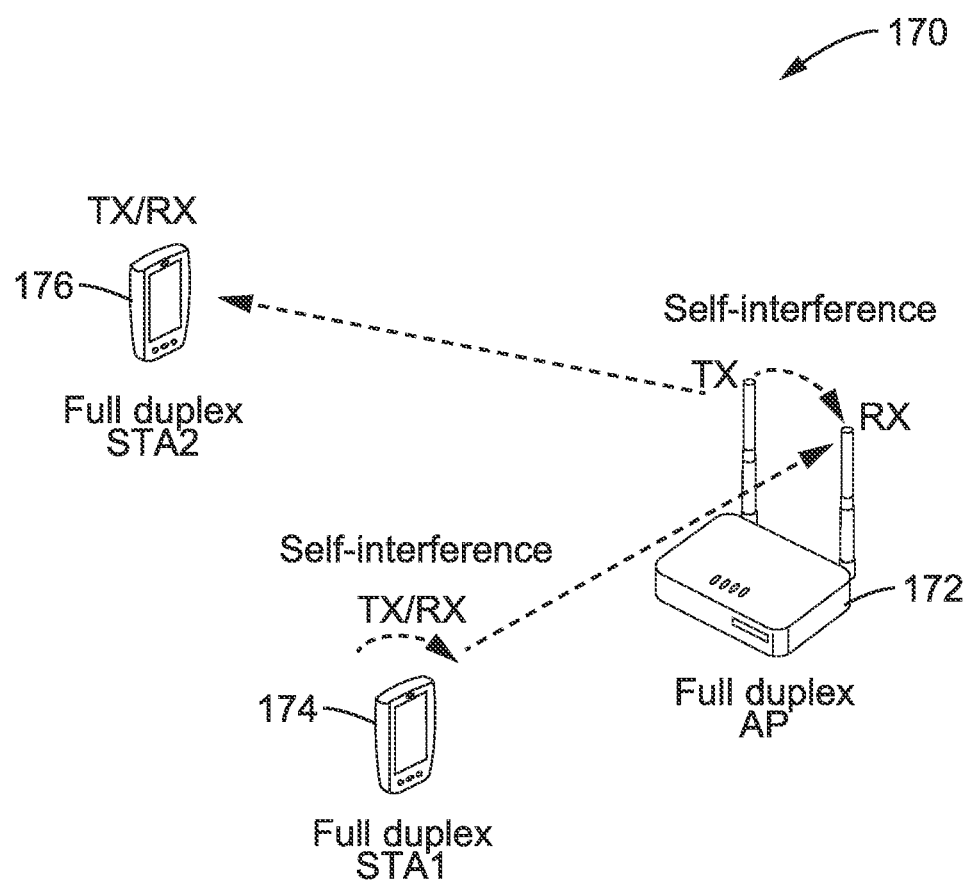
FIG. 11 is an example network topology having an AP and multiple FD stations for demonstration purposes according to at least one embodiment of the present disclosure.

FIG. 11 illustrates an example embodiment 170 of a network topology used in the examples by way of illustration and not by way of limitation, which is also true of the other topologies exemplified herein.

The example depicts three FD transceivers as FD AP 172, FD STA1 174 and FD STA2 176. FD AP, FD STA1 and FD STA2 are within the communication range of each other (e.g., they can 'hear' each other). FD STA1 and FD AP start a transmission simultaneously. FD STA1 is sending a PPDU to FD AP, at the same time FD AP is sending a PPDU to FD STA2. FD STA1 and FD AP would be subject to SI before SIC processing is performed.

5. Prioritized FD

In this scenario under study two different priority FD STAs within the range of each other send PPDUs at the same time. The preamble of the PPDUs may have indications of priorities.

Figure 12:
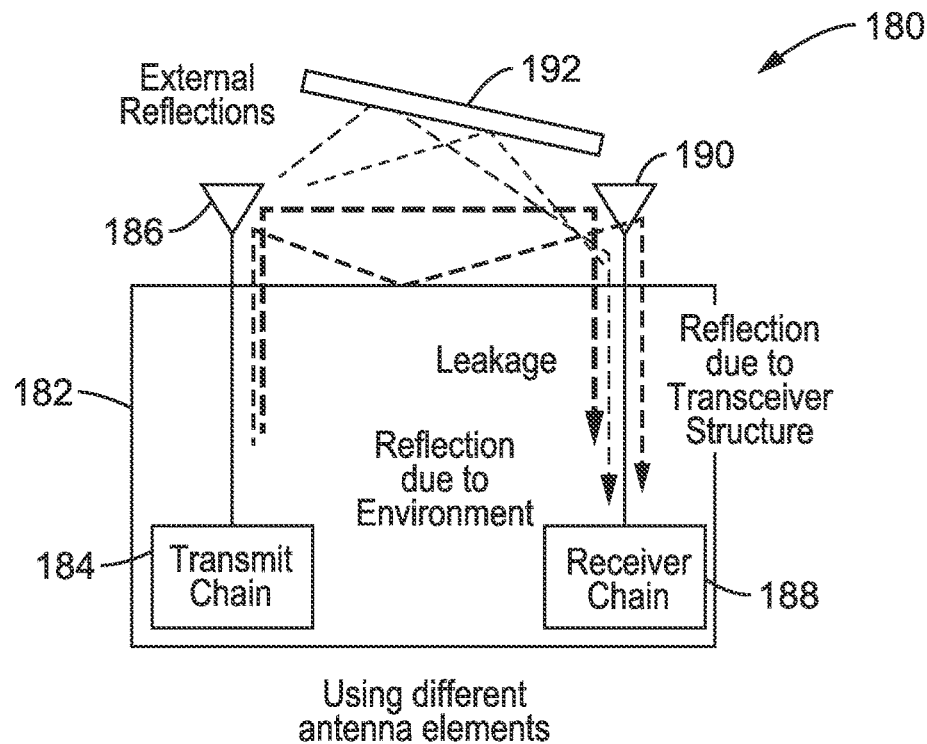
FIG. 12 and FIG. 13 are block diagrams of self-interferences paths for a dual and single antenna element which demonstrate various forms of interference.
Figure 13:
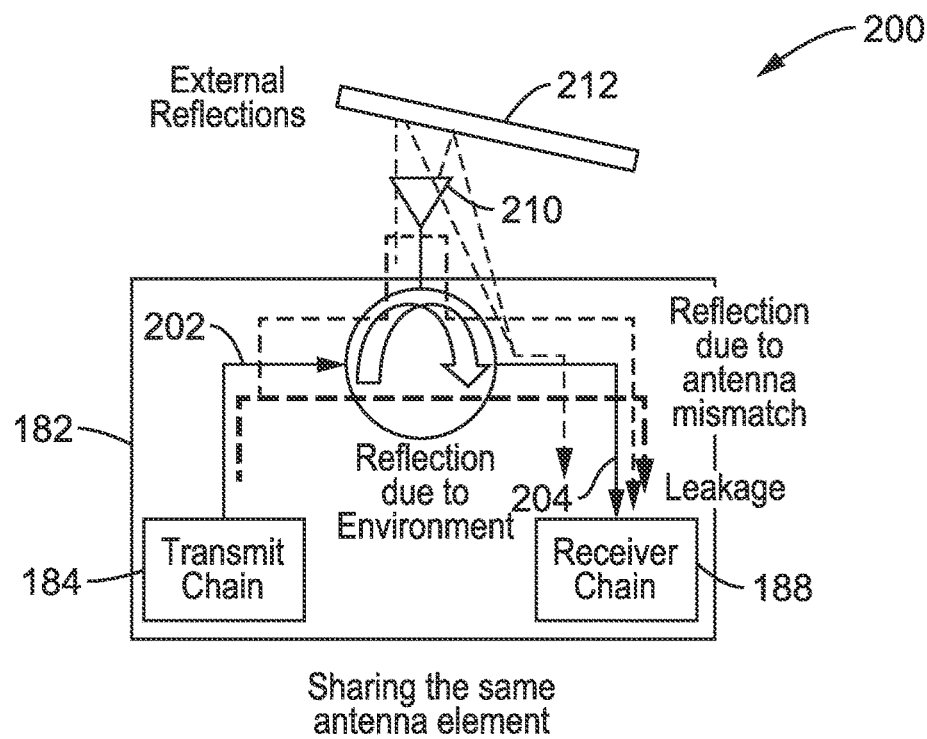

FIG. 12 and FIG. 13 illustrate examples 180, 200, of self-interferences paths for dual and single antennas. In FIG. 12 a STA 182 is shown with a transmit chain 184 to antenna 186, and a receiver chain 188 from antenna 190. The figure depicts leakage between the antennas, reflections due to transceiver structure, and external reflections 192. In FIG. 13 a STA 182 is shown with transmit chain 184 coupled 202 to a single antenna 210, and receive chain 188 coupled 204 to the same antenna 210. The figure depicts leakage between the transmit chain and the receiver chain, reflections due to antenna mismatch, reflection due to the environment, and external reflections 212.

5.1. Problem with Collision Detection for Prioritized FD

Self-Interference Cancellation (SIC) is one of the major challenges in 802.11 FD technology. The current FD technology attempts preamble-based collision detection, which is performed after completing self-interference cancellation (SIC). However, there is no mechanism for performing preamble-based collision detection before SI channel estimation.

If the FD transceiver has not performed self-interference (SI) estimation of the external reflections (as shown in FIG. 12 and FIG. 13) of the SI, the FD transceiver will not recognize the presence of another signal.

In addition, the FD transceiver may not be able to determine that a collision has occurred based on Cyclic Redundancy Check (CRC) error by hearing (receiving) its own preamble. The colliding signal is too weak compared to self-interference of its own preamble (e.g., which is coded with MCS0).

5.2. Solutions for Collision Detection for Prioritized FD

The following are approaches for dealing with these self-interference (SI) issues. (1) Include priority information in the FD preamble for collision detection resolution. In this case, the collision detection does not request the complete SIC. (2) Each STA Transmits FD preamble of the PPDU that carries the priority signals that is orthogonal to other priority signals carried by the FD preamble of the other STAs. For example, the orthogonal priority signals can be preconfigured. (3) When collision is detected, the STA with higher priority should retransmit the PPDU. (4) The STA with lower priority, or the same priority, should stop (halt) its transmission and start a backoff procedure after once again sensing that the medium is idle. (5) The STA detects a collision without detecting the priority of the colliding FD preamble, so the STA shall stop transmission and start a backoff after sensing the medium is idle (available).

5.2.1. Collision Detection with Time Domain Orthogonal Signals

The following description is based on the topology seen in FIG. 11, FD STA1 is sending a PPDU to FD AP, and at the same time FD AP is sending a PPDU to FD STA2. FD AP and FD STA1 receive signals during their transmission. The received signals contains the self-interference signals and the interference signals from other STAs. The following describes use of time domain signals in an FD preamble.

Figure 14:
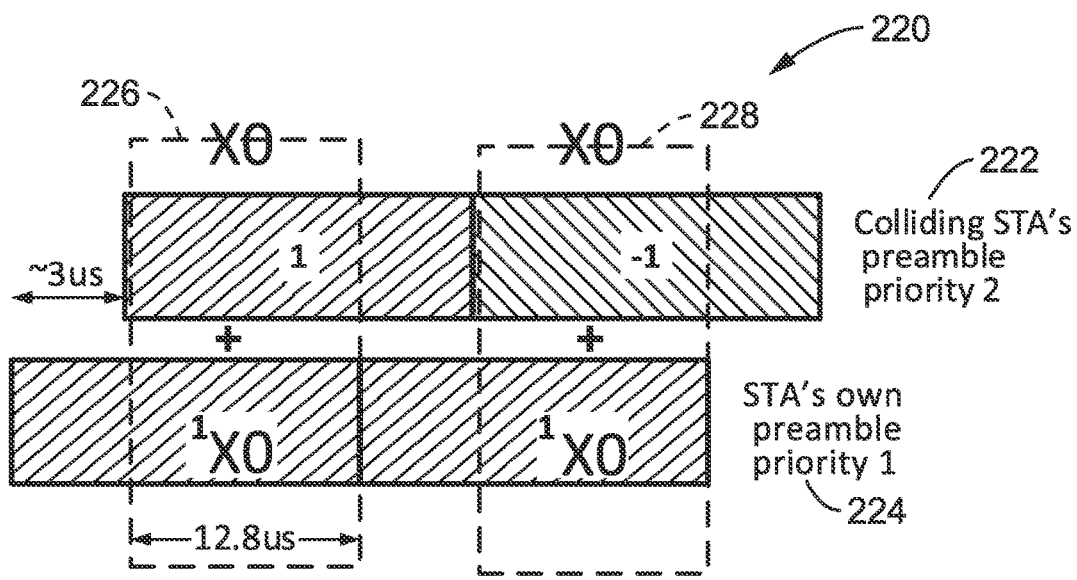
FIG. 14 is a signal diagram on making time domain signals orthogonal in a FD preamble for collision detection according to at least one embodiment of the present disclosure.

FIG. 14 illustrates an example embodiment 220 to make time domain signals orthogonal (orthogonalize) in a FD preamble for use in collision detection. Blocks 222 and 224 represents Orthogonal Frequency Division Multiplexing (OFDM) symbols (defined as data samples with the Cyclic Prefix (CP), which in this case is around 3 µs in time domain.

The window size, depicted as the vertical dashed line boxes, represent the duration of an OFDM symbol duration without the use of CP. Assuming the detecting STA is FD STA1, and the colliding STA is FD AP. The upper symbols 222 are colliding with the STA's FD preamble signal with priority 2. The lower symbols 224 are detecting the STA's own FD preamble with priority 1.

5.2.2. Example 1-1 CD with TD Orthogonal Signals

This example is based on the content in section 5.2.1, and describes the collision detection procedure.

(a) Before transmitting the FD preamble, the STA, which is a FD transceiver, has not performed channel estimation of self-interference (SI) from external surroundings.

(b) The FD preambles of different STAs should be coded before transmission, meaning multiplied by different column vectors of the P-matrix before transmission so that they are orthogonal to each other.

P-matrix, which is an orthogonal matrix, (in this case $$\begin{bmatrix} 1 & 1 \\ 1 & -1 \end{bmatrix}$$

is used for collision detection before performing the self-interference cancellation. The P-matrix can be configured based on existing 802.11 standards or any other desired orthogonal matrix may be utilized.

Different priorities of the FD preamble are reflected by different columns of the P-matrix. The P-matrix is preconfigured, so that STAs can recognize the priority represented by each column.

For example, [x0,x0] are two symbols as part of the FD preamble and the two x0 symbols are identical. STA1 (with priority 1) multiplies [x0,x0] by first column of P-matrix, it sends out [x0,x0]; STA2 is the colliding STA (with priority 2) multiplies [x0,x0] by the second column of the P-matrix, it then sends out [x0, −x0].

(c) At this point it becomes a simple process for each FD transceiver to detect the existence of an FD preamble from another STA if it is transmitting and receiving FD preambles simultaneously, which could arise before performing SI estimation.

For example, when STA1 is sending out the first x0 symbol, it is receiving y0, which equals x0*h1+x0*h2, where h1 and h2 are the channel coefficient from self-interference, and from STA2 to STA1, respectively, note that [h1,h2] are unknown at this point before channel estimation. When STA1 is sending out the second x0 symbol, it is simultaneously receiving y1, which equals x0*h1−x0*h2. After the reception of y0 and y1, STA1 could detect the collision by subtracting y1 from y0, which equals 2*x0*h2. STA1 recognizes this result as representing a collision because if there is no collision, y0 (no collision)=x0*h1, and y1 (no collision)=x0*h1, the results of y0−y1=0.

(d) Once the STA detects a colliding FD preamble, the STA shall determine if it should retransmit the frame, or stop (halt) transmission and perform a backoff after sensing that the channel medium is idle. In at least one embodiment, the decision is made based on comparing its own priority with the priority indicated in the received FD preamble from colliding STA.

It should be appreciated that different priorities are reflected by different orthogonal column vectors of the P-matrix.

The prioritized FD preambles are coded using the same P-matrix, the FD STA which detected a colliding FD preamble based on step (c) can deduce the vector of the P-matrix/priority that the colliding STA is using. For example, the STA1 detects the collision by subtracting y1 from y0, which equals 2*x0*h2 as explained in (c), and recognizes that this result represents a collision. STA1 is using [1,1] vector of the P-matrix to represent the priority 1. With this information, STA1 can deduce that the colliding FD preamble is coded with [1, −1] vector of P-matrix, which represents priority 2.

The STA should retransmit PPDU if it has higher priority. Otherwise, it shall stop transmitting PPDU immediately and backoff after sensing the medium idle.

6. Carrier Frequency Offset (CFO) Problem Statement

Significant (heavy) levels of Carrier Frequency Offset (CFO) can ruin the orthogonality between two signals, in which case the solution proposed above in transmitting time domain orthogonal signals could suffer performance degradation.

Example: consider the following collision detection with time domain orthogonal signals with CFO. Observed by a STA, the signal from the other STA has a linear phase offset of $e^{-2\pi f_d t}$, where $f_d$ is CFO which has a maximum of 40 ppm (parts per million) in the IEEE standard. The above assumes an OFDM symbol duration 12.8 µs, when subcarrier spacing is 78.125 kHz. A very long cyclic prefix (CP) is assumed of approximately 3 µs (round-trip delay for a 450 m BSS). When $f_d$ is equal to 39 kHz, which is 7.8 ppm of 5 GHz, whereby the phase offset between the $2^{nd}$ and the $1^{st}$ symbol of the colliding FD preamble is π (before applying 1, −1 orthogonal cover). The colliding FD preamble is thus completely canceled together with self-interference. Accordingly, in this case STAs cannot detect a collision.

6.1. Lack of Synch Added to Problem Statement of Section 5.1

If two parties involved in a collision do not have a synchronized center frequency, time domain orthogonal signals may completely lose orthogonality.

6.1.1. Proposed Solution to Lack of Synch

The following are descriptions of a solution according to the present disclosure for overcoming the lack of proper center frequency synchronization. FD preamble includes priority information which is embedded in the frequency domain. Different priorities can be carried by different subcarriers or tones of the FD preamble with them being separated by at least 40 ppm.

In the received baseband signal after analog cancellation and before digital cancellation (it should be noted that the digital cancellation requires SI channel estimation), the STA zeros out the tones of its own FD preamble to discover other STAs with a different priority.

If an FD STA detects the colliding FD preamble as having a lower priority than its own priority, it should retransmit the FD preamble and the remainder of the PPDU. Otherwise, it shall stop (halt) transmission and start a backoff process after sensing that the channel medium is again idle. In response to receiving the retransmitted FD preamble from a higher priority STA, the receiver can resynchronize and estimate the channel.

6.1.2. FD Orthogonal Prioritized FD Preamble

As defined in the 802.11 standard, the transmitted center frequency tolerance shall be ±20 ppm for 20 MHz. It should be appreciated that where parts per million (ppm) is used to describe frequency accuracy, e.g., an accuracy of 20 ppm indicates that the mean frequency of the clock may be off by 20 Hz for every 1 MHz of its specified value.

Different priorities can be carried by different subcarriers and/or tones of the transmitted FD preamble. Each STA only transmits one or several consequent tones to carry the priority. The tones used for indicating a priority carry symbol "1"s, and other tones carry symbol "0"s.

When a FD device is transmitting, it cannot distinguish a simultaneously received prioritized FD preamble from itself or from a colliding STA if the received prioritized FD preamble indicates the priority on the subcarriers and/or tones is within 40 ppm of the subcarriers and/or tones carrying its own priority. Thus, different priorities shall be carried on different subcarriers and/or tones of the FD preamble with at least a spacing of 40 ppm apart. The large space of greater than 40 ppm between subcarriers carrying priority information enables the detection of a different priority even with CFO. The subcarrier(s) and/or tone(s) are predetermined to represent a specific priority.

A STA transmitting its prioritized FD preambles can detect a collision from the received FD preamble, by zeroing out the self-interference of its own priority signals using analog SIC. A collision is detected if the STA detects another priority signal after the zeroing out is performed.

The priority tones interleaved in the prioritized preamble may not be understood by legacy devices.

6.1.2.1. Prioritized FD Preamble Symbol in Frequency

Figure 15:
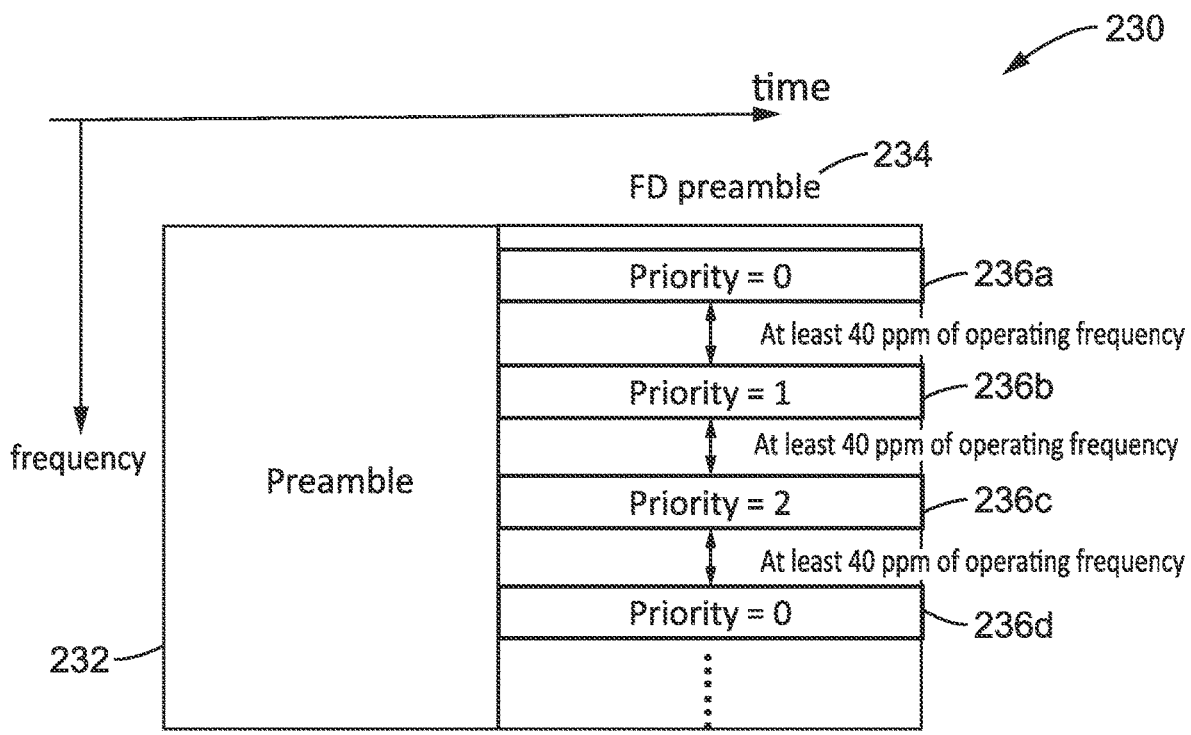
FIG. 15 is a signal diagram of a preamble field and a FD preamble in the time domain and in the frequency domain, according to at least one embodiment of the present disclosure.

FIG. 15 illustrates an example embodiment 230 of a preamble field 232 and a FD preamble 234 in the time domain and in the frequency domain. The preamble field can be the same as the preamble defined in the 802.11 baseline protocol. The FD preamble field follows immediately after the preamble field and is used to carry a specific priority. Different priorities, exemplified as 236a, 236b, 236c and 236d, can be indicated in different subcarrier(s) of the FD preamble, with a given spacing (i.e., at least 40 ppm) in between. By way of example and not limitation, there are three priorities represented in the figure. It will be noted that the Number of priorities are predetermined and agreed upon by STAs applying this type of preamble.

Figure 16:
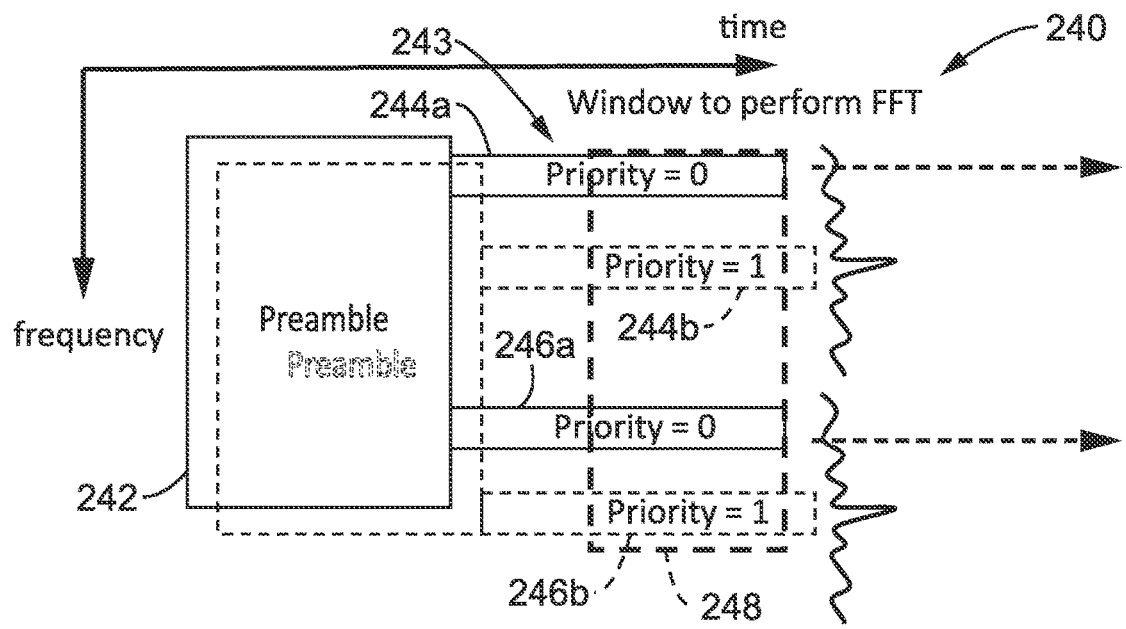
FIG. 16 is a signal diagram of frequency domain collisions between different prioritized preambles, according to at least one embodiment of the present disclosure.

6.1.2.2. Example 1-2: CD with Freq. Orthogonal Signals indicate Different Priorities FIG. 16 illustrates an example embodiment 240 of frequency domain collisions between different prioritized preambles. The figure shows the preamble 242 and FD preambles 243 as were seen in FIG. 15. This example is based on the same topology as introduced in FIG. 11. It is assumed that FD STA1 sends PPDU with preambles indicating priority0 244a and 246a; while at the same time the FD AP, as an interferer, sends a PPDU with a preamble indicating priority1 244b and 246b. As shown in time domain, the two preambles from FD STA1 and FD AP are sent almost at the same time. As a result, collisions may arise on FD STA2.

After FFT, FD STA1 which indicates a priority equal to zero, will zero out the pulses associated with priority0 transmissions 244a and 246a, which are carried by priority0 tones, as well as a portion of the spurious signals, which are also on the priority 0 tones, but are from the interfering preamble indicating priority 1 (after analog SIC). Then, FD STA1 can detect the peaks in the priority1 signal which indicates existence of a colliding preamble with different priority (priority 1) corresponding to the tones 244b and 246b.

The FD AP performs the same action as does FD STA1, and can also detect a colliding preamble with different priority (priority 0). The lower priority (e.g., priority 0) FD STA1 should then stop transmission and start a backoff. It is assumed in this discussion, that priority 0 refers to a lower priority than priority 1. The higher priority (e.g., priority 1) FD AP may retransmit and allow the intended receiver to re-synchronize and estimate the channel.

Figure 17:
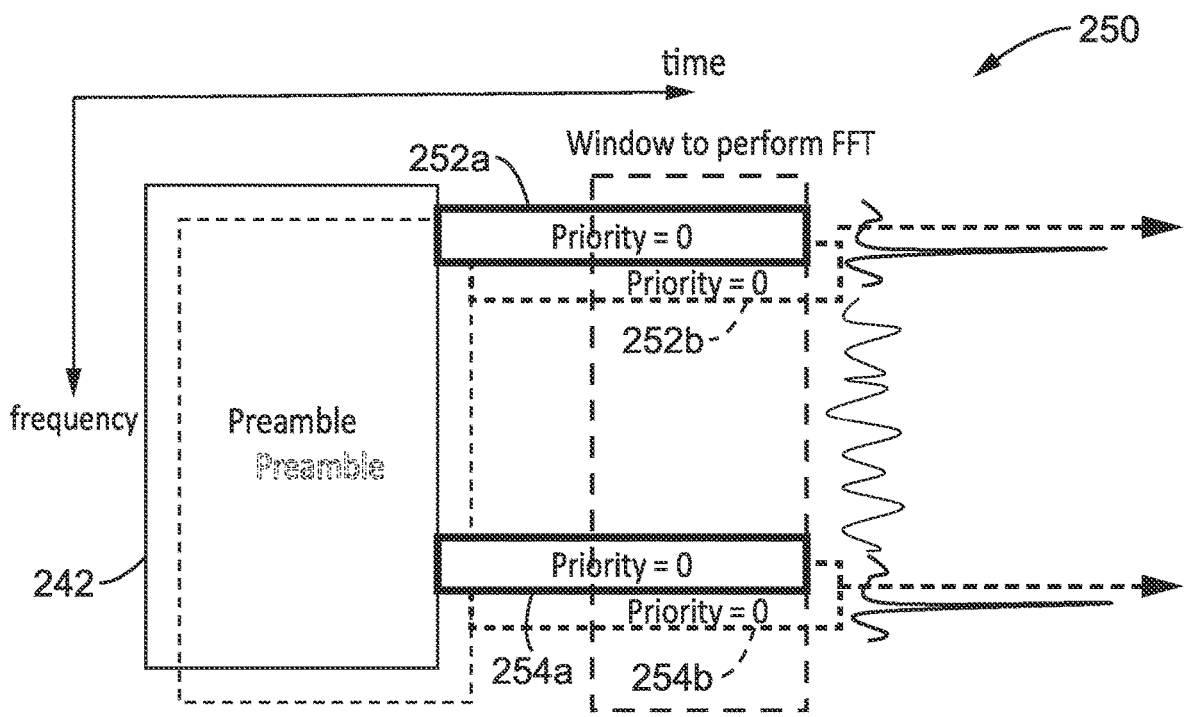
FIG. 17 is a signal diagram of collisions between frequency-domain preambles which indicate the same priority, according to at least one embodiment of the present disclosure.

6.1.2.3. Example 1-3: CD with Freq. Orthogonal Signals Indicating Same Priority FIG. 17 illustrates an example embodiment 250 of collisions between frequency-domain preambles which indicate the same priority. This example is also based on the same topology as introduced in FIG. 11. It is assumed that FD STA1 sends a PPDU with a preamble indicating priority 0 252a and 254a. At this same time, an interfering FD AP, sends PPDU with preamble 252b and 254b, also indicating priority 0 and collision may occur on FD STA2.

After FFT, FD STA1 (indicates priority=0) then zeros out the pulses carried by priority 0 tones (after analog SIC), and the following is performed.

(a) FD STA1 may also zero out the interfering priority 0 pulses from STA2, because of its very small CFO of less than 40 ppm. In this case, STA1 shall not halt transmission since it cannot distinguish if the received peak in the priority 0 tone before SIC is produced by a colliding preamble or its own transmitted preamble has experienced doppler effect as introduced in the doppler effect case. Thus, collision may occur on FD STA2, and further collision resolution solutions are described for dealing with this type of collision issue in another section.

(b) FD STA1 may detect the interfering peaks from FD AP, if CFO is significant (e.g., greater than 40 ppm), whereby the STA recognizes the interfering peaks indicate existence of a colliding preamble with the same priority (priority 0). In this case, FD STA1 halts transmission and performs a backoff when the channel is again idle. The FD AP performs in the same manner as described for FD STA1.

A number of aspects should be noted in regard to the figure. In the Doppler effect case, STA1 sends PPDU with preamble still indicating priority 0; there is no other interfering STAs. If considering doppler effect, STA1 may still receive peak pulses on another tone/tones (different from the tone/tones indicating priority=0) which is the reflected signal of its own transmission.

It is likely that the received peak pulse has the same priority tone or tones as the transmitted tone or tones, because the speed of the STA or the obstacles that reflect the signal are usually quite small compared to the speed of the wave. The changing in frequency between received frequency and the emitted frequency $\Delta f=\Delta v*f0/c$, where f0 is the emitted frequency and c is the wave's propagation speed in air (around $3*10^8$ m/sec).

6.1.2.4. Example 1-4: CD Between Prioritized and Legacy Preambles

Figure 18:
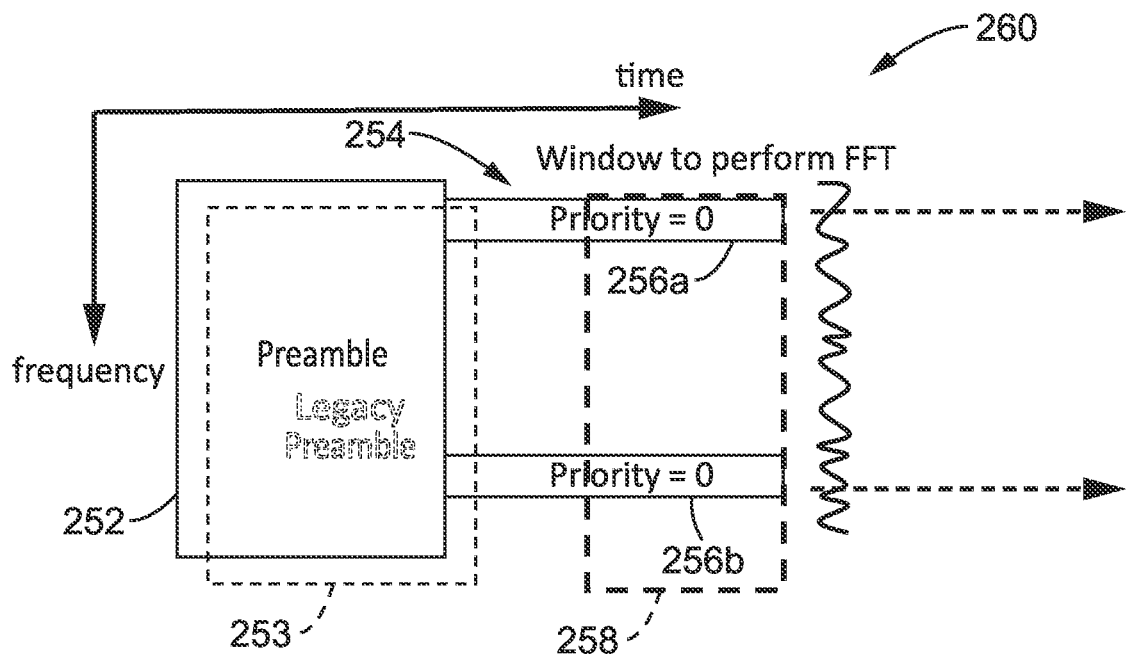
FIG. 18 is a signal diagram of collision detection between a prioritized preamble and a legacy preamble, according to at least one embodiment of the present disclosure.
Figure 19:
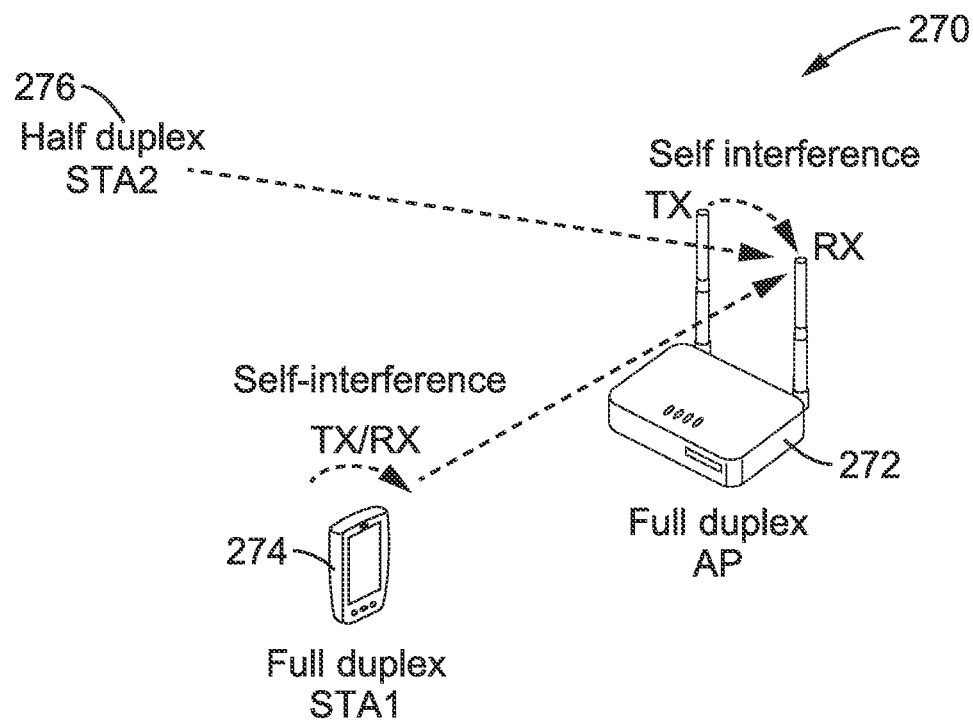
FIG. 19 is an example network topology used for FIG. 18, according to at least one embodiment of the present disclosure.

FIG. 18 and FIG. 19 illustrates an example embodiment 260 with a different topology 270.

In FIG. 19 is seen a FD AP 272 which is receiving from both an FD STA1 274 and a half-duplex STA2 276.

In FIG. 18 a preamble 252 with FD preamble 254, and a legacy preamble 253. It is assumed that FD STA1 sends a PPDU to FD AP with prioritized preamble 256a, 256b indicating priority on priority 0 tone/tones. At this same time, the non-FD STA2, an interferer, sends PPDU to the FD AP with a legacy preamble; whereby a collision may arise on the FD AP.

It should be noted that the legacy preamble is using the preamble frame format as defined in 802.11 standard, which does not contain subcarriers/tones to contain priority information.

After FFT window 258, FD STA1 (indicates priority=0) zeros out its pulses carried by priority tones (after analog SIC). FD STA1 cannot detect the peek which indicates any of the predetermined priorities. However, FD STA1 detects the existence of the colliding signal. FD STA1 halts transmission and performs a backoff when the channel is idle. The Non-FD STA2 uses a legacy CSMA/CD approach to detect collisions.

Figure 20:
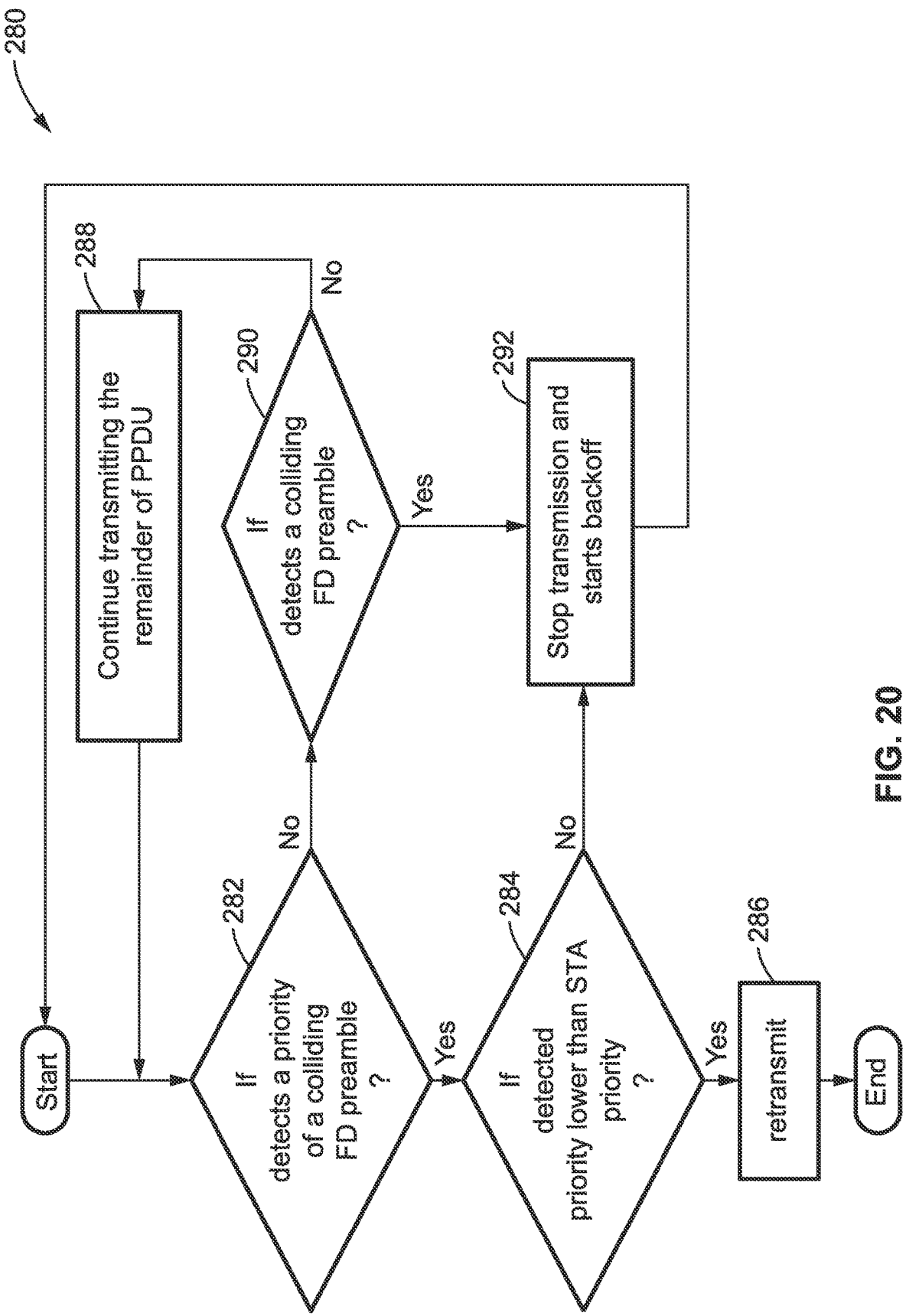
FIG. 20 is a flow diagram of a transmitting station reacting to detection of a collision, according to at least one embodiment of the present disclosure.

FIG. 20 illustrates an example embodiment 280 of a transmitting station, which could be a FD non-AP STA or a FD AP, reacting to detection of a collision. A check 282 determines the priority level of a colliding FD preamble. If the condition is met, then at block 284 a check determines if the detected priority is lower than that of the detecting station. If the condition is met, then a retransmission 286 is performed.

Returning to block 282 when the condition is not met, then execution reaches block 290 which determines if a collision of FD preambles has occurred. If the collision has not occurred, then at block 288 the transmitting STA continues transmitting the remainder of the PPDU.

Otherwise, with the condition in block 290 being met, execution reaches block 292 at which time the STA stops transmission and commences a backoff when the channel is idle.

6.2. Collision Resolution for Prioritized FD

A problem can arise when a FD AP needs to prioritize high priority traffic over lower priority traffic, and both sets of traffic are using the channel at the same time and the destination non-AP STA of the DL traffic and source non-AP STA of the UL traffic are different, whereby collision occurs at the destination non-AP STA of the DL traffic.

6.2.1. Topology for Problem 6.2.

Figure 21:
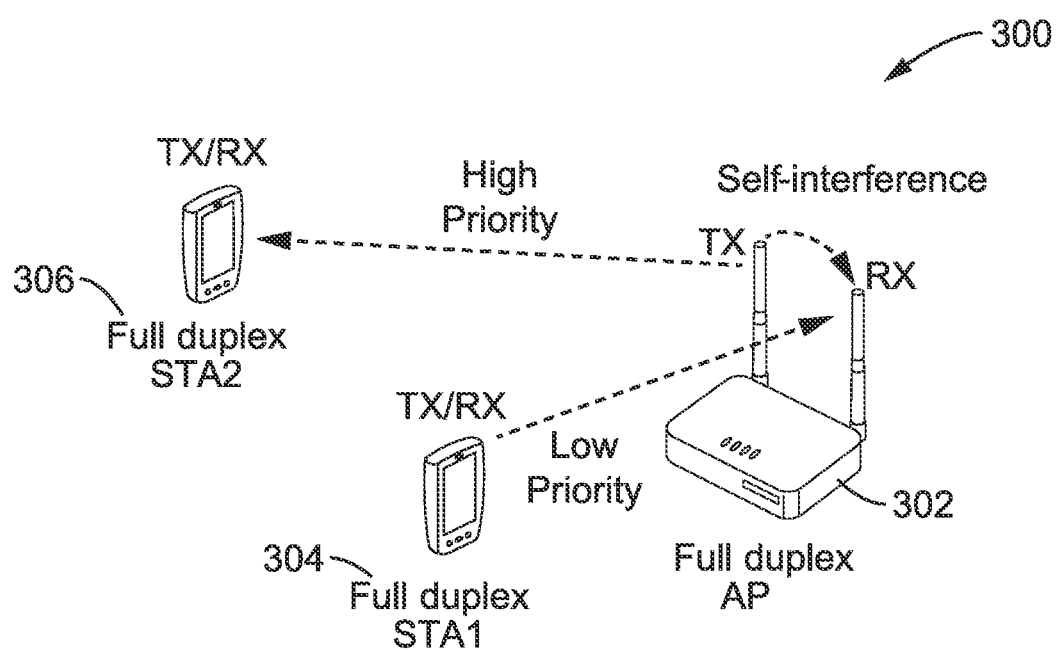
FIG. 21 is an example network topology for describing Problem 6.2, according to at least one embodiment of the present disclosure.

FIG. 21 illustrates an example embodiment 300 of a topology showing a FD AP 302 receiving a low priority traffic from a FD STA1 304, and transmitting high priority traffic to a FD STA2 306. FD STA1, FD STA2 and FD AP are in communication range of one another, with the object being for the AP to send High priority traffic to STA2 and STA1 to send Low priority traffic to AP.

FD STA 1 transmits a Ready-To-Send (RTS) to FD AP and FD AP sends an RTS to FD STA2 simultaneously. Collision arises on FD STA2, resulting in FD AP not receiving CTS from FD STA2, although FD AP can receive RTS from FD STA1.

6.2.2. Solution for Problem 6.2.

A prioritized collision avoidance scheme is described. (1) FD devices may indicate priority in the control frames used for collision avoidance. (2) If a FD device transmits a prioritized frame and receives another prioritized frame during transmission, the FD device recognizes there is an intra-BSS interference and should first deal with the higher prioritized traffic. (3) The FD device which estimates intra-BSS interference as described in item 2, may broadcast a frame indicating the preferred priority that the FD device should handle first. (a) After receiving the frame indicating request traffic priority; the FD device transmitting lower priority traffic halts (stops) any transmissions/retransmissions. (b) The FD device that transmits the higher, or same, priority traffic should continue the (re)transmission process. (4) The FD AP may trigger a non-AP FD device to initiate the transmission of lower prioritized traffic. The non-AP FD device with lower prioritized traffic may re-access the channel, without being triggered, if the channel is idle for at least a PIFS duration after the non-AP FD device receives the broadcast frame which indicates a higher prioritized traffic is preferred.

(5) If a FD device directly transmits Data PPDU instead of RTS, it can use the simultaneously transmitted FD preamble and received FD preamble to estimate the intra-BSS collision and decide on the following process based on the priority resolution. (a) A FD device which estimates the existence of an intra-BSS collision with a lower priority than itself, should retransmit the PPDU. A portion of the Resource Units (RUs) may be reserved for purposes other than for serving DATA PPDUs; and more particularly for exchanging control messages between the AP and other STAs. (b) A FD device which estimates the existence of an intra-BSS collision with higher priority than itself, is configured to stop transmitting the remainder of the PPDU; unless it receives a control frame from the reserved RU or the non-reserved RUs, such as a trigger from its destination. If this STA fails to receive any other frame exchanges between other STAs, it may access the channel again after EDCA backoff when CCA is idle. (c) A FD device which only receives a preamble without the remainder of the DATA PPDU may send a control frame using the reserved RUs (e.g., can be predetermined RUs) to indicate the existence of an overestimated intra-BSS collision. If the preamble source STA receives this control frame through the reserved RUs, it may retransmit or trigger (through reserved RUs) to retransmit the previously suspended PPDUs which has been overestimated as the intra-BSS colliding signal.

6.2-1 Example 2-1: HP Traffic Grant w/PR+CDP Frame

Figure 22:
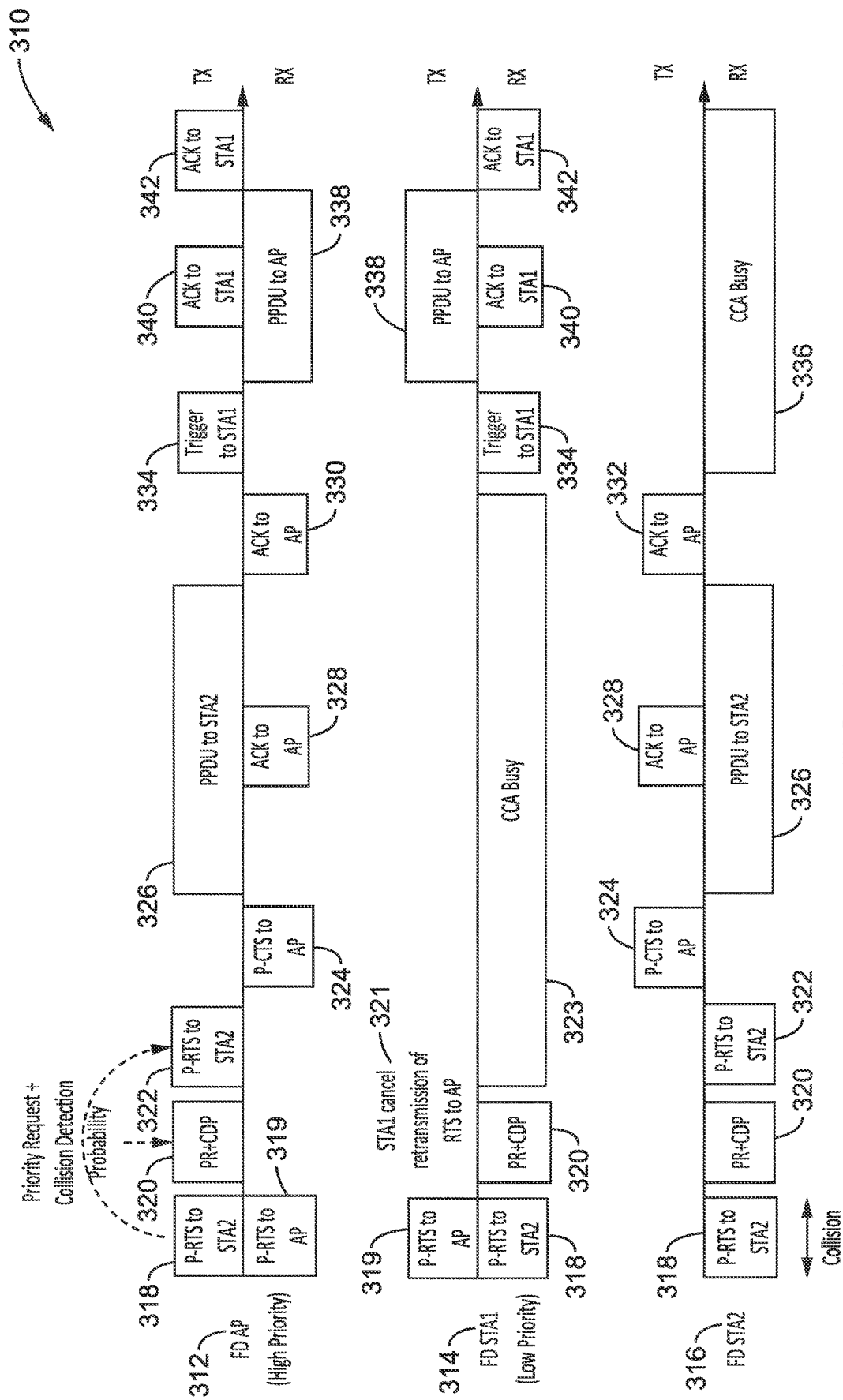
FIG. 22 is a communication diagram of Example 2-1 for performing an HP traffic grant with a PR plus CDP frame, according to at least one embodiment of the present disclosure.

FIG. 22 Illustrates an example embodiment 310 of FD AP with High Priority (HP) 312, FD STA1 with Low Priority (LP) 314, and a FD STA2 316. It is assumed STA1 and STA2 can hear (communicate with) each other, and the process commences with RTS/CTS.

The topology is the same as seen in FIG. 21. The FD AP has High Priority (HP) traffic to send to FD STA2, and FD STA1 has Low Priority (LP) traffic to send to FD AP. The FD AP, FD STA1 and FD STA2 are in communication range of (e.g., they can hear) each other. FD AP and FD STAs initiate a Transmit Opportunity (TXOP) each with a prioritized control frame, e.g., prioritized RTS (P-RTS) 318 and 319.

(1) The AP receives P-RTS 319 from STA1 (lower priority traffic) and at the same time sends P-RTS 318 to STA2 (higher priority traffic).

(2) The AP broadcasts a new frame with a Priority Request+Collision Detection Probability (PR+CDP) 320 to declare AP requests for higher priority DATA transmission. The AP may thus indicate collision detection possibility in the new (PR+CDP) frame.

(3) After receiving the broadcast PR+CDP frame 320, STA1 recognizes that it does not meet the priority requirement and thus it cancels its retransmission of P-RTS after a P-CTS timeout, which starts since it sent the previous P-RTS.

(4) If the AP does not receive the P-CTS from STA2 before the P-CTS timeout, which is a period that commences when the AP started sending the previous P-RTS, the AP shall retransmit another P-RTS 322 to STA2. It should be noted that the transmission time of the PR+CDP frame should be no longer than a P-CTS timeout. If the transmission time of the PR+CDP frame is longer than a P-CTS timeout, the AP shall retransmit the P-RTS a SIFS period after the AP sending out the PR+CDP frame.

(5) STA2 receives the retransmitted P-RTS from the AP and responds to the AP with P-CTS 324. The AP transmits PPDU 326 to STA2, with Ack/BA 328 and 330.

(6) STA1 is seen CCA busy 323 and does not access the channel for (re)transmitting PPDUs unless it receives a trigger from AP so that STA1 may again access the channel.

Then in the remainder of the figure the AP triggers 334 STA, which access the channel and send PPDU 338, which are Acked 340 and 342.

Figure 23:
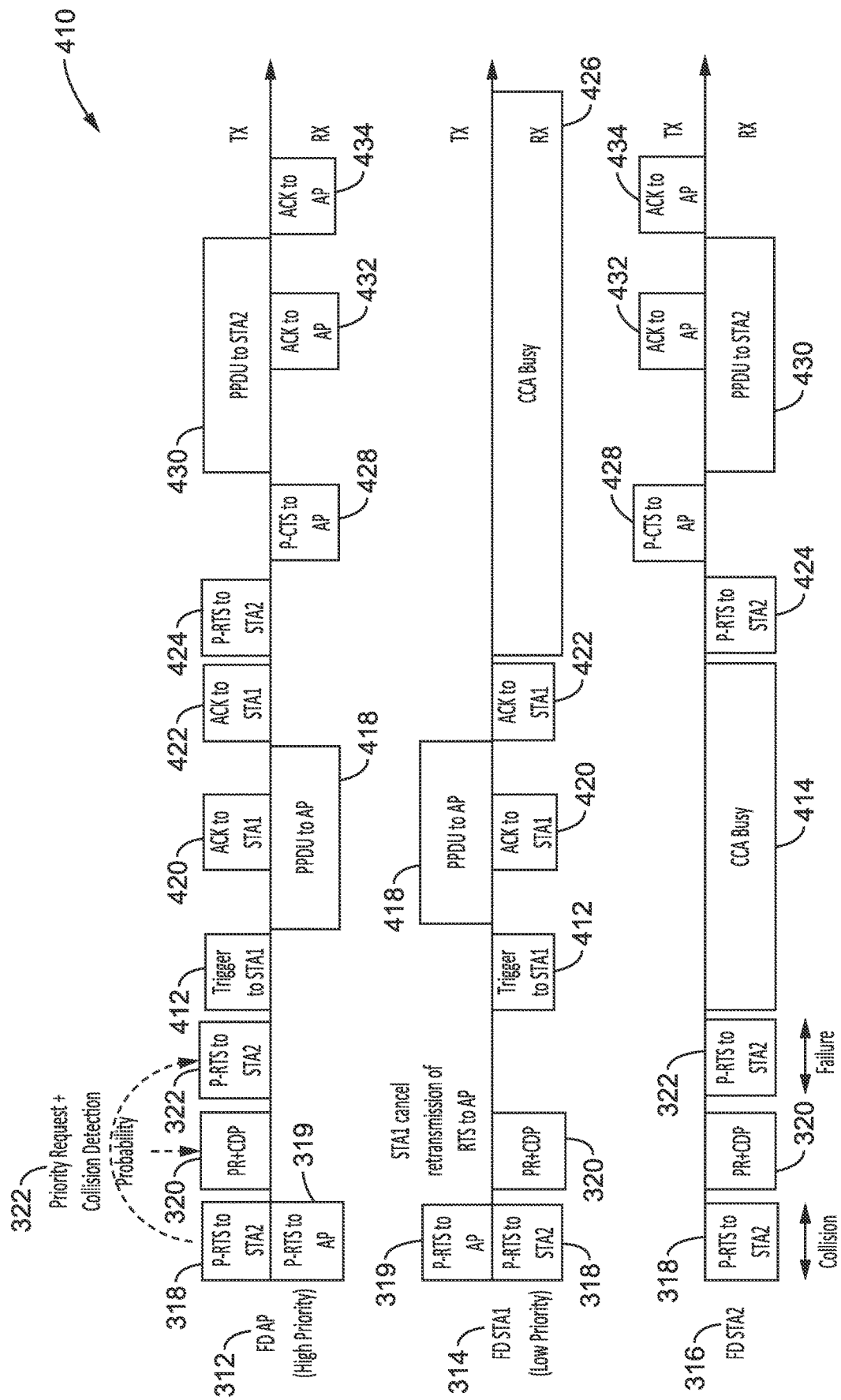
FIG. 23 is a communication diagram of Example 2-1-0: FD AP Trigger LP Traffic w/o Receiving any Response from the Granted HP Traffic Destination, according to at least one embodiment of the present disclosure.

6.2-1-0 Example 2-1-0: FD AP Trigger LP Traffic w/o Receiving any Response from the Granted HP Traffic Destination FIG. 23 illustrates an example embodiment 410 which is a variation of that seen in FIG. 22. The description is the same as that in example 2-1. The first four bullet points for this example are the same as that described in Example 2-1; the differences commence here at the 5$^{th}$ element.

(5) STA2 fails to receive the retransmitted P-RTS 322 from the AP, and thus does not respond to the AP with P-CTS.

(6) The AP, since it does not receive the P-CTS from STA2 after the retransmission of P-RTS, sends a trigger frame 412 to STA1 to enable STA1 to access the channel.

(7) STA1 receives the trigger frame from AP and sends UL PPDU 418 to AP and receives Ack/BA 420 from the AP during the transmission of UL PPDU.

(8) After acknowledging 422 all the UL PPDU from STA1, AP can retransmit P-RTS 424 to STA2. STA1 becomes CCA busy 426.

(9) STA2 successfully receives the P-RTS from the AP and responds with a P-CTS 428 to the AP.

(10) The AP sends a DL PPDU 430 to STA2 after receiving the P-CTS from STA2. AP may receive Ack/BA 432 from STA2 during the transmission of DL PPDU.

(11) STA2 shall acknowledge 434 AP for all received DL PPDUs.

Figure 24:
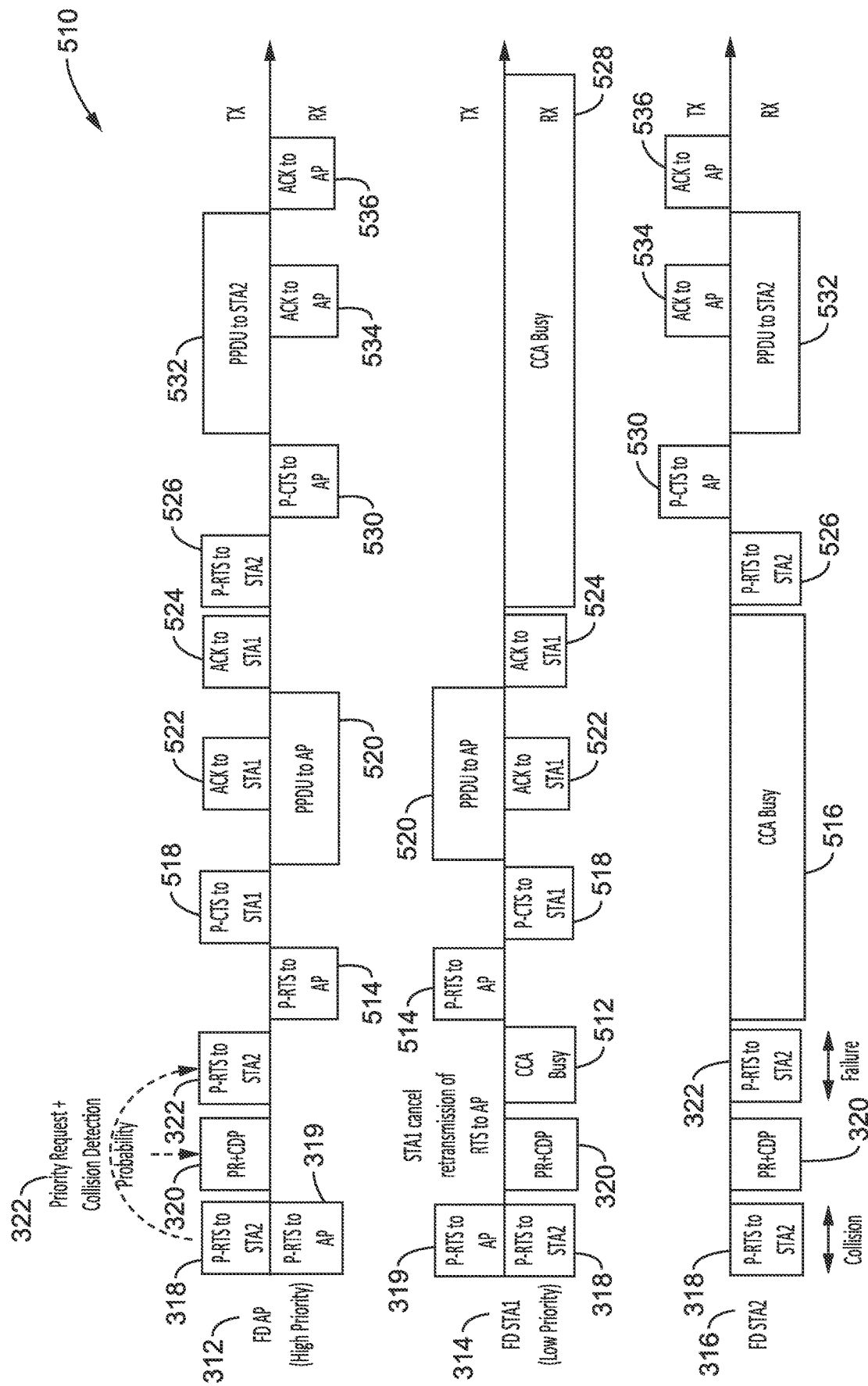
FIG. 24 is a communication diagram of Example 2-1-1: FD STA1 Re-Access Channel w/o Receiving Trigger from FD, according to at least one embodiment of the present disclosure.

6.2-1-1 Example 2-1-1: FD STA1 Re-Access Channel w/o Receiving Trigger from the FD AP FIG. 24 illustrates an example embodiment 510 which has the same topology and description as in Example 2-1. The first four bullet points are same as that described in Example 2-1; with the steps below starting at that point.

(5) STA2 fails to receive the retransmitted P-RTS 322 from the AP, and thus it does not respond to the AP with a P-CTS.

(6) AP does not receive the P-CTS from STA2 after the retransmission of P-RTS, and thus it doesn't send a trigger frame to STA1 to enable STA1 to access the channel.

(7) STA1 is CCA busy 512 during P-RTS. Then as STA1 senses CCA idle, it accesses the channel again by sending, for example a CTS-to-self, retransmitted P-RTS to AP or send UL DATA after receiving trigger frame from AP. In this example STA1 sends retransmitted P-RTS 514 to the AP, and STA2 is seen CCA busy 516.

(8) AP receives the P-RTS from STA1 and responds with a P-CTS 518 to STA1 to enable STA1 transmission of the LP UL PPDUs.

(9) STA1 receives the P-CTS frame from AP and sends UL PPDU 520 to the AP and then receive Ack/BA 522 from AP during the transmission of UL PPDU.

(10) After acknowledging all 524 the UL PPDU 526 from STA1, AP can retransmit P-RTS 526 to STA2.

(11) STA2 successfully receives the P-RTS from the AP and responds with a P-CTS 530 to the AP.

(12) AP send a DL PPDU 532 to STA2 after receiving the P-CTS from STA2. AP can receive Ack/BA 534 from STA2 during the transmission of DL PPDU.

(13) STA2 acknowledges 536 the AP for all received DL PPDUs.

6.2-2-1-2 Example 2-1-2: HP Traffic Grant w/o PR+CDP Frame

Figure 25:
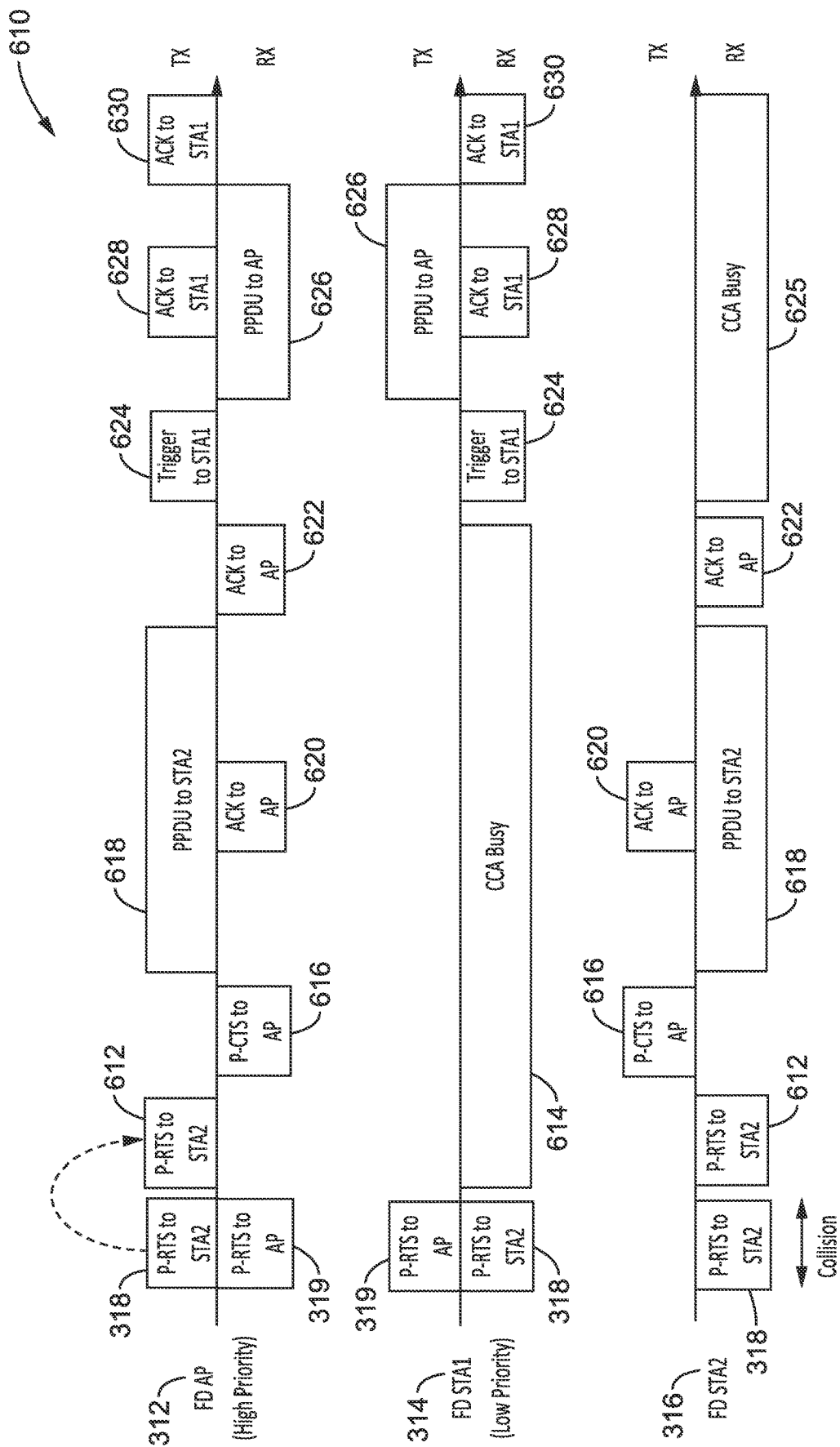
FIG. 25 is a communication diagram of Example 2-1-2: HP Traffic Grant w/o PR+CDP Frame, according to at least one embodiment of the present disclosure.

FIG. 25 illustrates an example embodiment 610 in example 2-1-2: HP Traffic Grant w/o PR+CDP Frame. The topology and general description is the same as in FIG. 21. In this instance, if both AP and STA1 estimate the intra-BSS collision and are preconfigured to grant the higher prioritized traffic, then after priority resolution from a colliding preamble, they can perform the following.

At the FD AP: (a) transmit P-RTS 318 from AP (High Priority) to STA2 and receive P-RTS 319 from STA1 (Low Priority) at the same time. (b) After priority resolution of the received preamble, the AP decides to continue transmission of higher prioritized traffic. AP (High P) retransmits P-RTS 612 to STA2 instead of sending P-CTS as response of the received P-RTS from FD STA1 (LP). At this time STA1 is CCA busy 614. Upon receipt of P-CTS 616 from STA2, AP transmits PPDU 618, to which STA2 Acks 620, 622. After this the AP sends a trigger 624 to STA1 which responds with PPDU 626 which the AP Acks 628, 630, while STA2 is CCA busy 625.

At FD STA1: (a) Transmit P-RTS 319 from STA1 (Low Priority) to the AP and receive a P-RTS 318 from the AP(High Priority) at the same time. (b) After priority resolution based on the received preamble, STA1 stops transmission to avoid colliding with a higher prioritize traffic and goes CCA busy 614. (c) STA1 receives trigger 624 from AP (High Priority) to transmit PPDU 626, receipt of which is acknowledged 628, 630, all while STA2 is CCA busy 625.

6.2-2-2 Example 2-2: HP Traffic Grant when AP has LP

Figure 26:
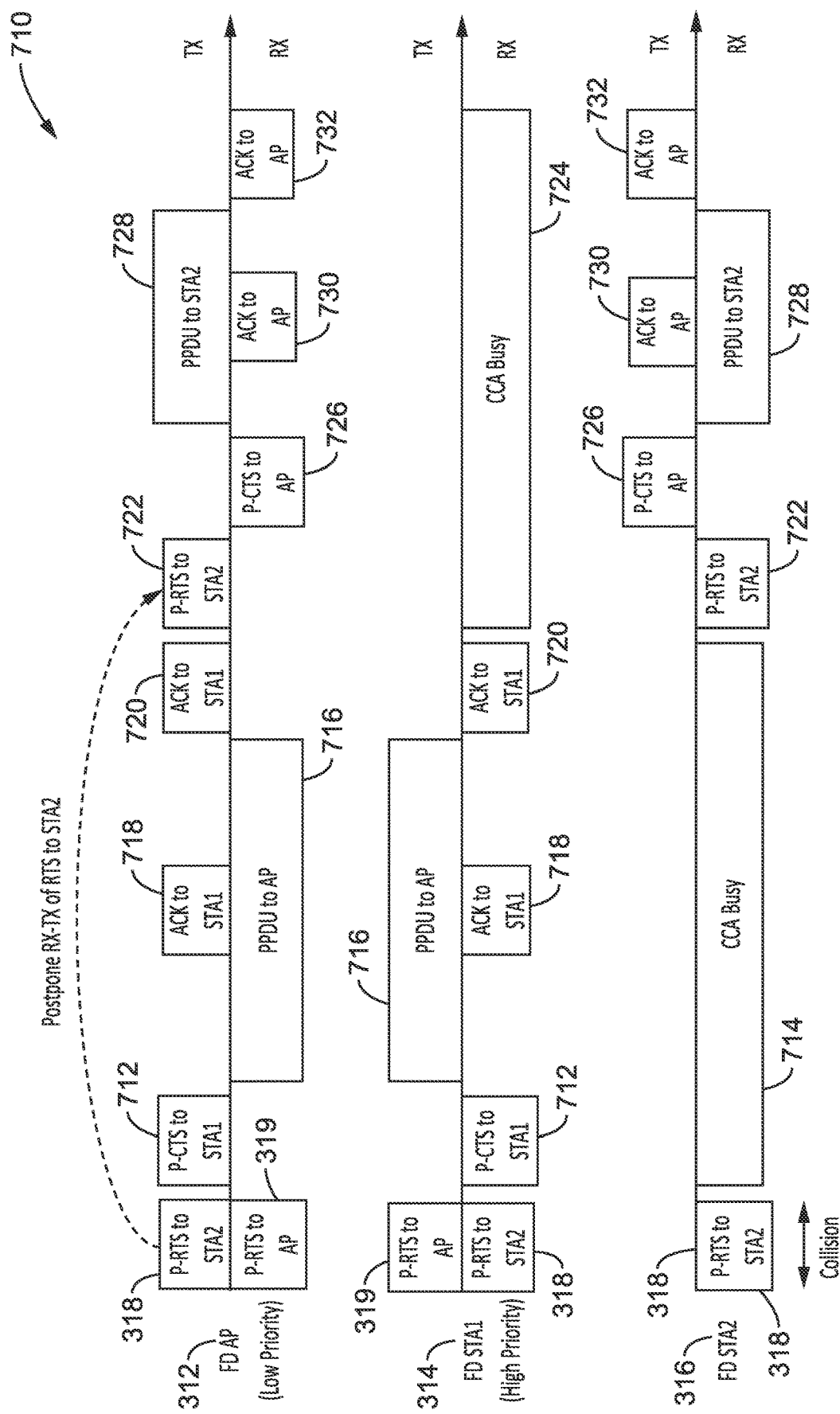
FIG. 26 is a communication diagram of Example 2-2: HP Traffic Grant when AP has LP, according to at least one embodiment of the present disclosure.
Figure 27:
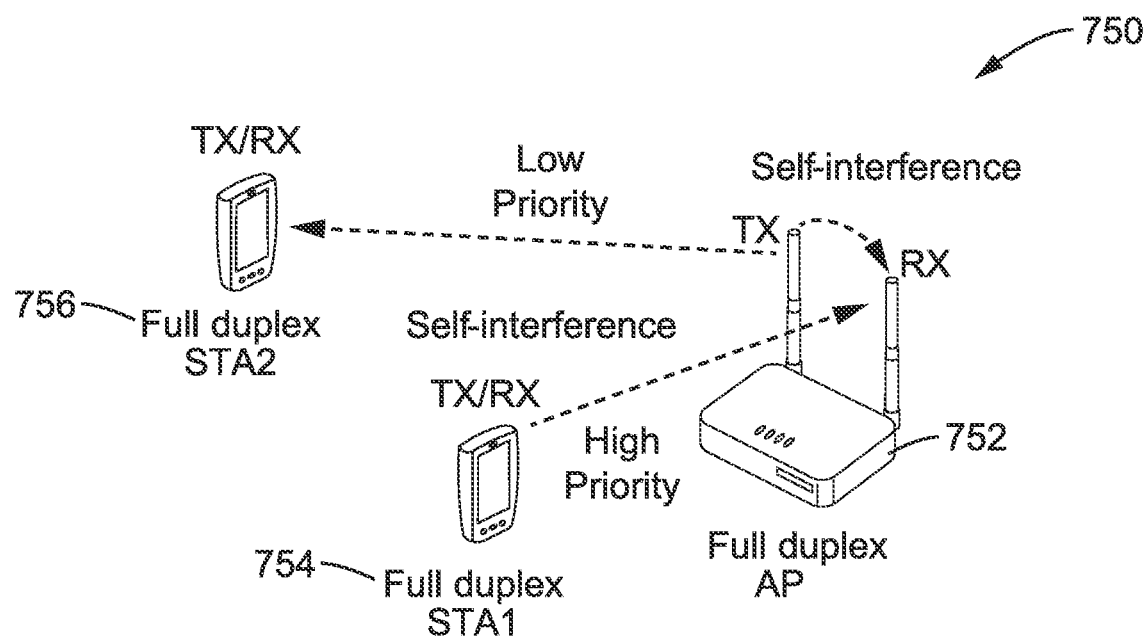
FIG. 27 is an example network topology for use in describing Example 2-2: HP Traffic Grant when AP has LP, according to at least one embodiment of the present disclosure.

FIG. 26 and FIG. 27 illustrate an example embodiment 710, and example topology 750 of a high priority traffic grant when the AP has low priority traffic.

In FIG. 27 the topology is almost identical to FIG. 21, the difference being that the priority of the traffic is swapped with the FD AP having LP traffic to FD STA2 and FD STA1 having HP traffic to the AP.

Referring now to FIG. 26, the stations are in range of one another, and the FD AP and FD STAs initiate a TXOP with a prioritized control frame, exemplified with a Prioritized-RTS (P-RTS).

(1) FD STA1 sends P-RTS 319 (HP) to FD AP and FD AP sends P-RTS 318 to FD STA2 (LP) at the same time. P-RTS frames may collide at FD STA2 if FD STA1 and FD STA2 are within the communication range of each other.

(2) FD AP responds with a P-CTS 712 to STA1 (HP) at first and temporally pauses retransmission of P-RTS to STA2. At that time STA2 is CCA busy 714.

(3) STA1 transmits UL PPDU 716 after receiving P-CTS from AP; and receives Acks 718 and 720, accordingly.

(4) AP retransmits P-RTS 722 to STA2 after completing the transmission sequence with STA. STA 1 is CCA busy 724 at this time.

(5) STA2 responds with P-CTS 726 after receiving P-RTS 722 from AP1.

(6) AP1 sends a DL PPDU 728 to STA2 after receiving P-CTS from STA2; and receives Acks 730 and 732, accordingly.

6.2-2-3 Extended Example 2-3: Effects of OBSS Collision

Figure 28:
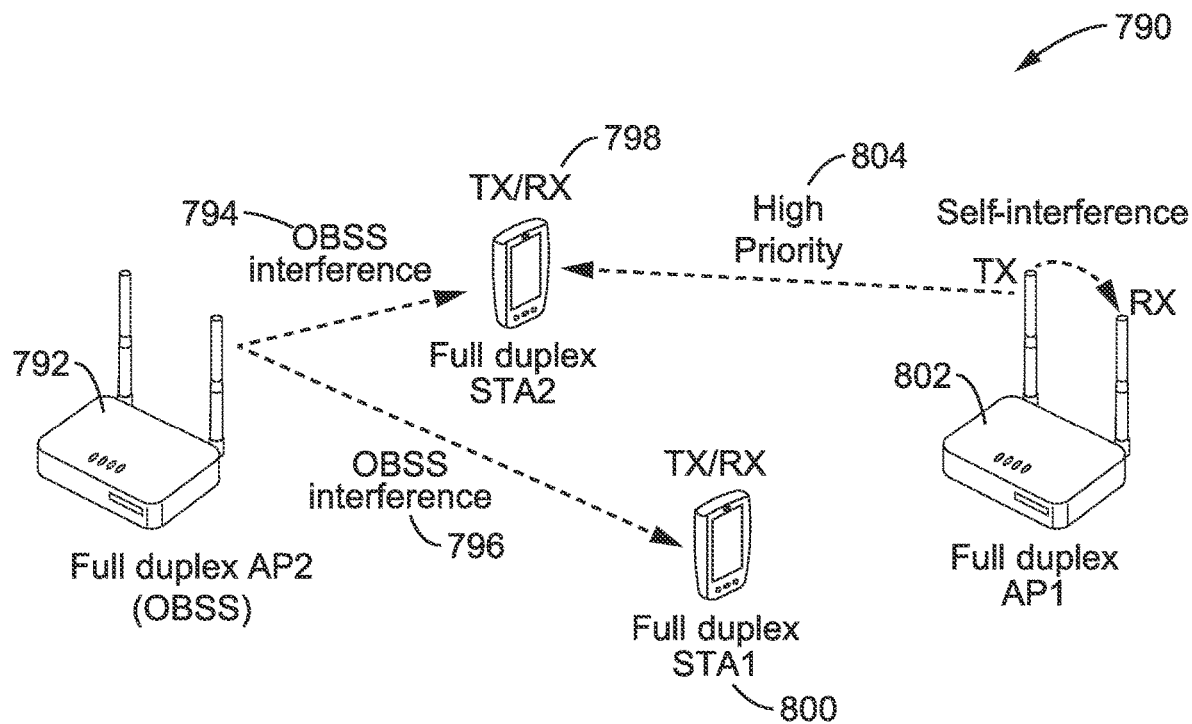
FIG. 28 is an example network topology for describing Extended Example 2-3: Effects of OBSS Collision for OBSS interference, according to at least one embodiment of the present disclosure.
Figure 29:
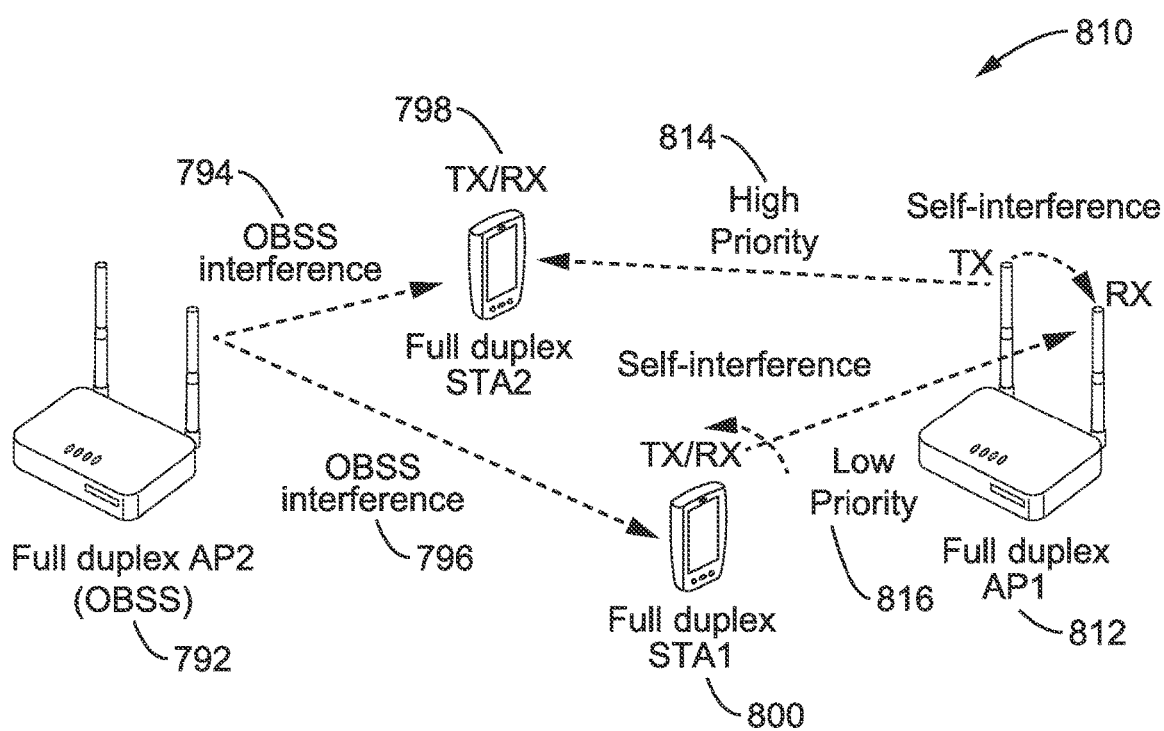
FIG. 29 is an example network topology for describing Extended Example 2-3: Effects of OBSS Collision for intra-BSS interference, according to at least one embodiment of the present disclosure.

FIG. 28 and FIG. 29 illustrates example topographies 790 and 810, used for illustrating the effects of Other Basic Service Set (OBSS) collision. As we have seen illustrated in example 2-1-1, 2-1-2 and 2-2, the AP should grant the transmission of higher prioritized traffic after performing collision resolution. However, collisions may be caused by an OBSS interference, and the AP does not receive the colliding frame.

In FIG. 28 the FD AP1 802 estimates the existence of OBSS interference. FD STA1 800 and FD STA2 798 are associated with FD AP1 802, with FD AP2 792 being an OBSS AP, which can create OBSS interference, exemplified by signals 794 and 796. FD AP1 802 is sending out high priority traffic (HP) 804 to STA2 798.

At the same time that FD AP1 is sending high prioritized traffic 804 to FD STA2, the OBSS AP2 is sending some frames in the OBSS. The high prioritized traffic frame from FD AP1 and the interference 794 frame from FD AP2 collide at FD STA2. AP1 doesn't receive the interference frame from the OBSS AP2 and cannot estimate the existence of the collision during sending out the high prioritized traffic frame. In this case, FD AP1 should retransmit the frame based on the legacy retransmission policies.

In FIG. 29 the AP estimates the existence of intra-BSS interference. The topology and the OBSS interference is the same as that in FIG. 28, however, in this example FD AP1 812 is sending out the same HP traffic 814 to FD STA2 798; but in this example FD STA1 800 is also transmitting a lower priority traffic frame 816 to FD AP1 812.

As a result of the above, collisions arise on FD STA2 798 which is caused by intra-BSS interference and OBSS interference. In this case, FD AP1 can only estimate the existence of an intra-BSS collision, by receiving a colliding preamble indicating lower priority during transmission.

Although FD AP1 cannot estimate the existence of the OBSS collision, it should still process the proposed protocol and grant the transmission of higher prioritized traffic after collision resolution is performed.

6.2-2-4 Example 2-4: AP Over-estimates Collision

Figure 30:
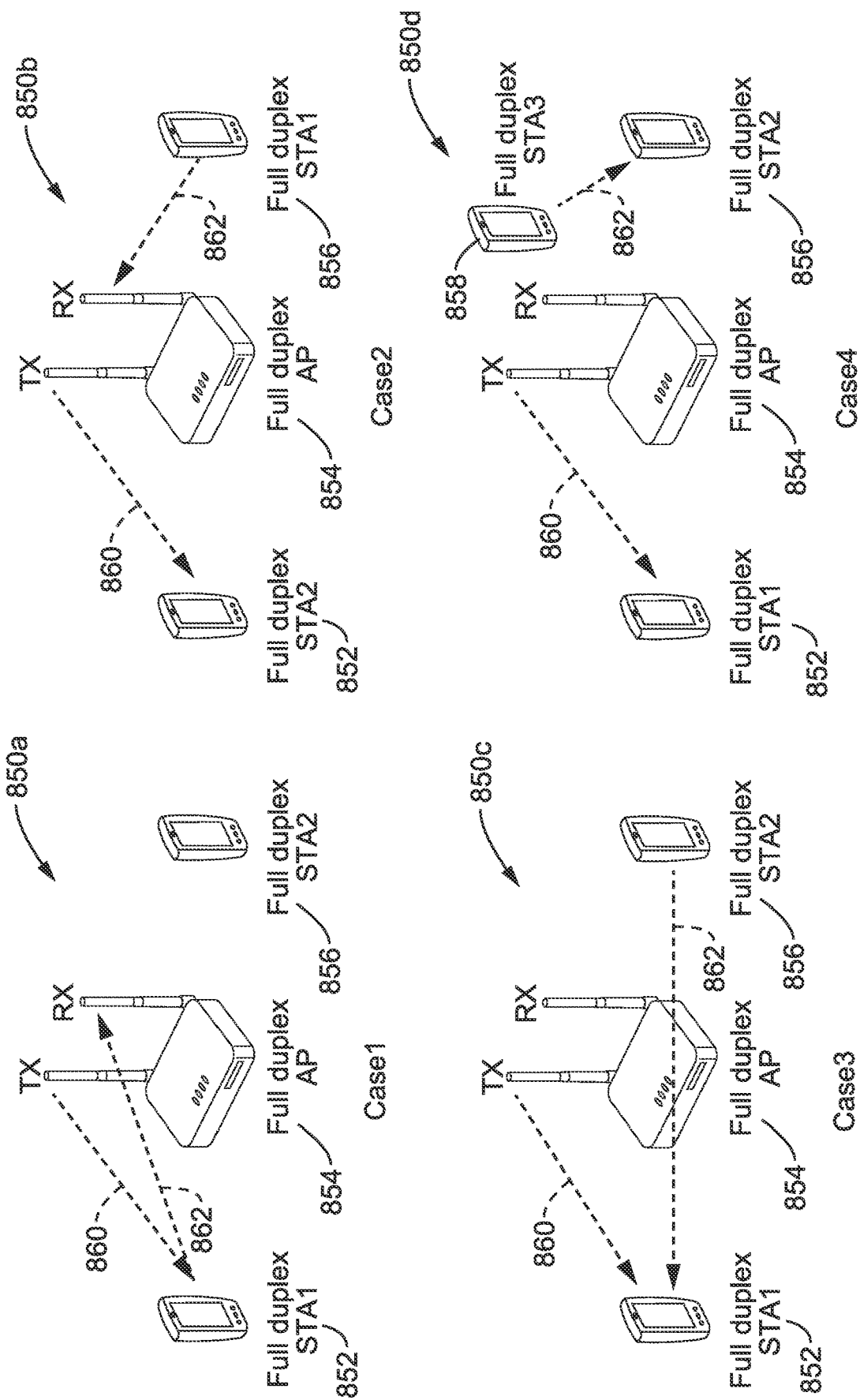
FIG. 30 is an example network of topologies in which cases the AP may overestimate the collision as described according to at least one embodiment of the present disclosure.

FIG. 30 illustrates example cases 850a, 850b, 850c and 850d in which the AP may overestimate the collision. These cases depict different scenarios combining an FD AP 854 with one or more of the stations such as FD STA1 852, FD STA2 856, and FD STA3 858. The AP sometimes may overestimate an intra-BSS collision as shown in Case 2 850b and Case 4 850d; in these cases, FD STA1 and FD STA2 are out of communication range of each other. However, AP doesn't know (e.g., does not have information indicating) that FD STA1 and FD STA2 cannot hear each other (are not able to communicate with each other). Thus, the AP may estimate there is a collision inside the BSS in these two cases, however, there is no collision, due to the two stations being out of range of one another. Thus, the AP is said to have overestimated the collision.

In Case 1 850a the AP may detect a fake collision when it is transmitting to FD STA1, and FD STA1 is also transmitting to the AP. However, the FD AP cannot recognize the receiving PPDU is addressed to itself without decoding the receiver address indicated in the header of the receiving PPDU. AP would stop transmitting once it detects the existence of the interfering preamble. But actually, there is no collision inside the BSS.

In Case 3 850c the AP can detect a collision when it is transmitting to FD STA1 while FD STA1 is transmitting to FD STA2. The AP hears (detects) the interfering preamble and may stop transmission, thus avoiding the collision on FD STA2.

The following section discusses solutions using a PR+CDP frame adapted to overcome issues with an overestimated collision.

Figure 31:
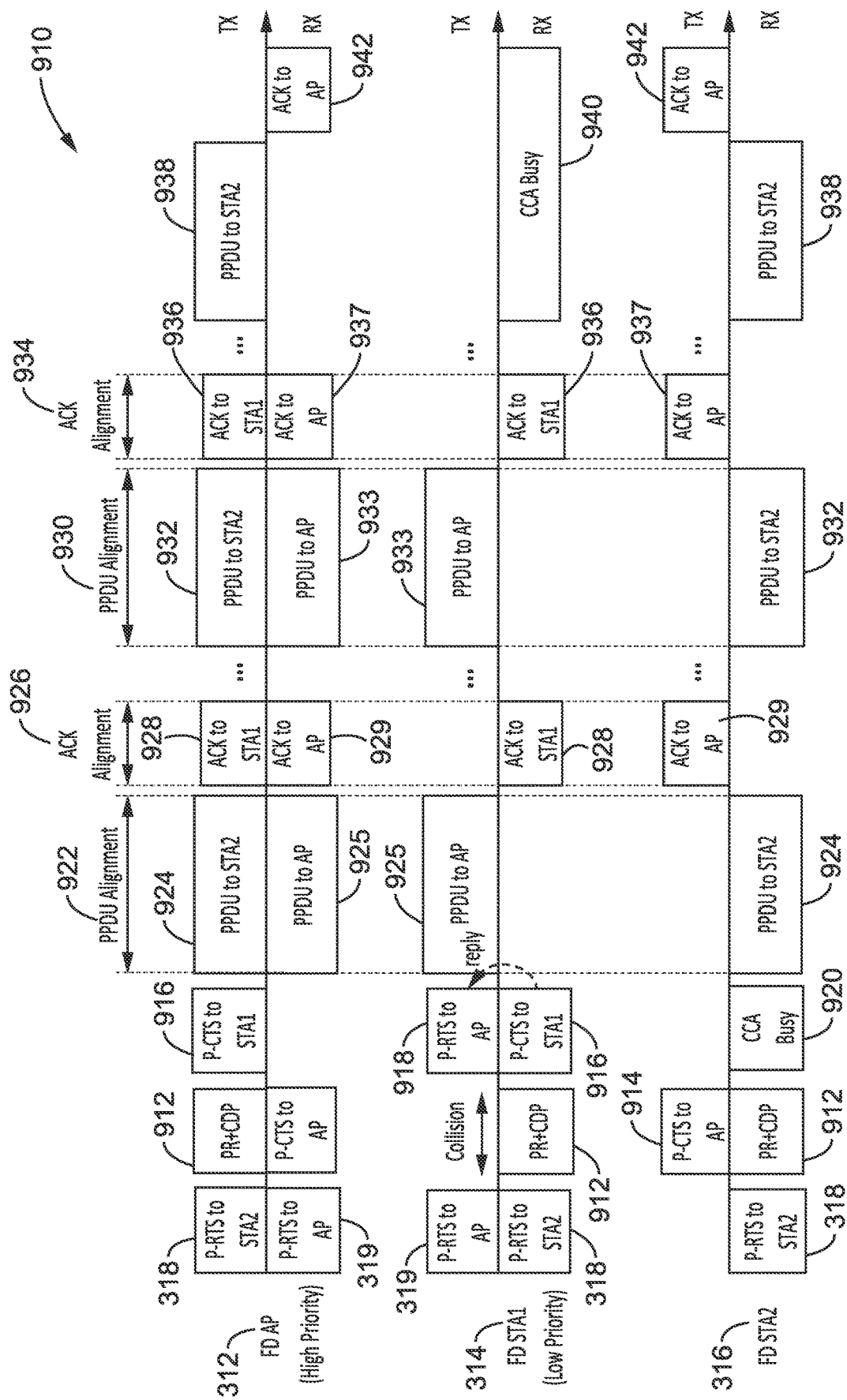
FIG. 31 is a communication diagram of resolving example Case 2 of an overestimated collision of FIG. 30, according to at least one embodiment of the present disclosure.

FIG. 31 illustrates an example embodiment 910 of resolving example Case 2 of an overestimated collision of FIG. 30 in which the FD AP has High Priority (HP) traffic to FD STA2, FD STA1 has Low Priority (LP) traffic to FD AP. FD STA1 and FD STA2 are not in communication range with each other, yet both can communicate with the FD AP. FD AP and FD STAs initiate a TXOP with a prioritized control frame, e.g., prioritized RTS (P-RTS).

(1) AP receives P-RTS 319 from STA1 (lower priority) and sends P-RTS 318 to STA2 (higher priority) at the same time.

(2) AP broadcasts a new frame (PR+CDP) 912 to declare AP requests for higher priority (with indicating priority level) DATA transmission. (i) AP may indicate collision possibilities in the new (RP+CDP) frame.

(3) STA1 and STA2 are out of the communication range of each other, which means there is no collision of P-RTSs as mentioned in previous steps. STA2 responds with a P-CTS 914 to the P-RTS sent by AP, which overlaps with the received PR+CDP frame from AP in time.

(4) The P-CTS from STA2 collides with the PR+CDP frame from AP on STA1; but the P-CTS can be received by the AP when the AP is transmitting the PR+CDP frame.

(5) After the AP receives P-CTS 914 from STA2, the AP is aware it has overestimated the intra-BSS collision and it should respond with P-CTS to the previously received P-RTS from STA1.

(6) Since STA1 did not receive the PR+CDP frame 912, it should retransmit P-RTS to the AP after the first P-CTS timeout, and the retransmitted P-RTS to the AP may overlap with the received P-CTS from the AP in time, which may not have start/end point alignment. In this case, STA1 will not retransmit P-RTS again.

(7) Both STA1 and the AP received the P-CTS from their destinations and start transmitting one or multiple PPDUs 924, 925, 932, 933 to the destination simultaneously with each PPDU start point and end point being aligned.

(8) The alignment 922 and 930 of start time of PPDU can be achieved in the following ways: (a) based on predetermined time after AP (as the collision estimator) sends the first P-RTS until it sends P-CTS to STA1 (as the overestimated collider) plus a SIFS. (b) Alignment information can be sent such as PPDU start time can be defined in the PR+CDP frame.

(9) Alignment 922 and 930 of the PPDU length can be achieved in the following ways: (a) Indicated in the first P-RTS; (b) Indicated in PR+CDP frame; (c) Indicated in management frames that exchanges between AP and STAs.

(10) AP and STA2 receives the PPDUs 924, 925, 932, 933 and responds with Ack/BA 928, 929, 936 and 937 simultaneously with Ack/BA start point and end point alignment 926 and 934. (a) If FD STA is transmitting PPDU, it may receive another PPDU at the same time. In this case, Ack/BA should not be scheduled when the STA is transmitting PPDU. There are several ways to achieve this: (i) Transmit BA request in the end of each PPDU transmission. Send BA only responses after receive BA request. (2) Configure this in the first P-RTS frame or PR+CDP frame or other management frames that exchanges between AP and STAs for reconfiguration.

The figure then depicts transmission of PPDU 938 from the AP to STA2, while STA1 is CCA busy 940, and depicts an Ack 942 back to the AP.

FIG. 32 through FIG. 35 illustrate an example embodiment 950 FD AP operation if the TXOP is started with a P-RTS, P-CTS combination.

Figure 32:
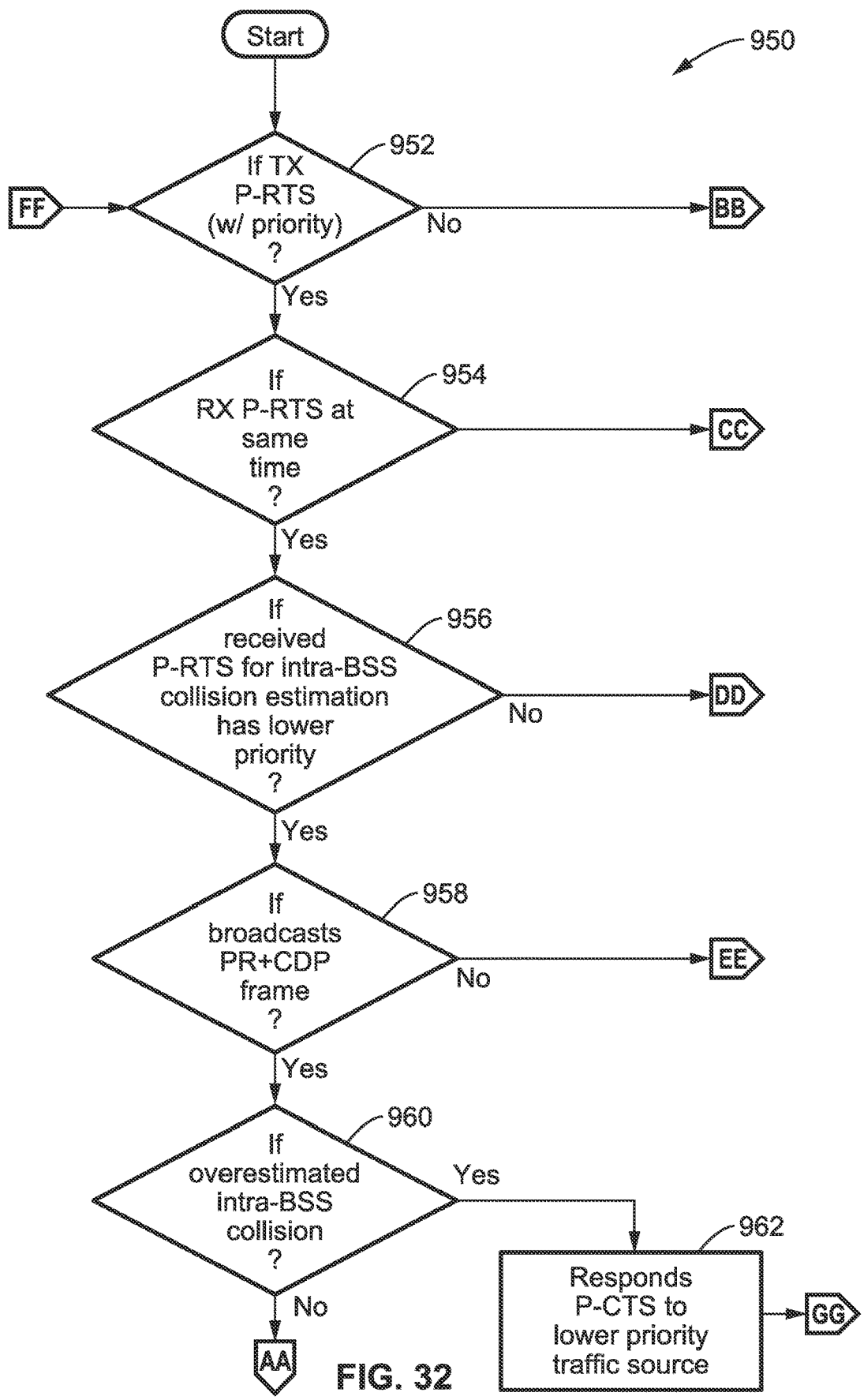
FIG. 32 through FIG. 35 is a flow diagram of FD AP operation if the TXOP is started with a P-RTS, P-CTS combination, according to at least one embodiment of the present disclosure.

In FIG. 32 a set of checks is performed to determine if a P-RTS was transmitted with priority 952; if a P-RTS was received at the same time 954; does the P-RTS for intra-BSS collision estimation have lower priority 956, if a PR+CDP has been broadcast 958 and if the intra-BSS collision has been overestimated 960. If all of these conditions are met, then at block 962 the AP responds with a P-CTS to the lower priority traffic source.

Figure 33:
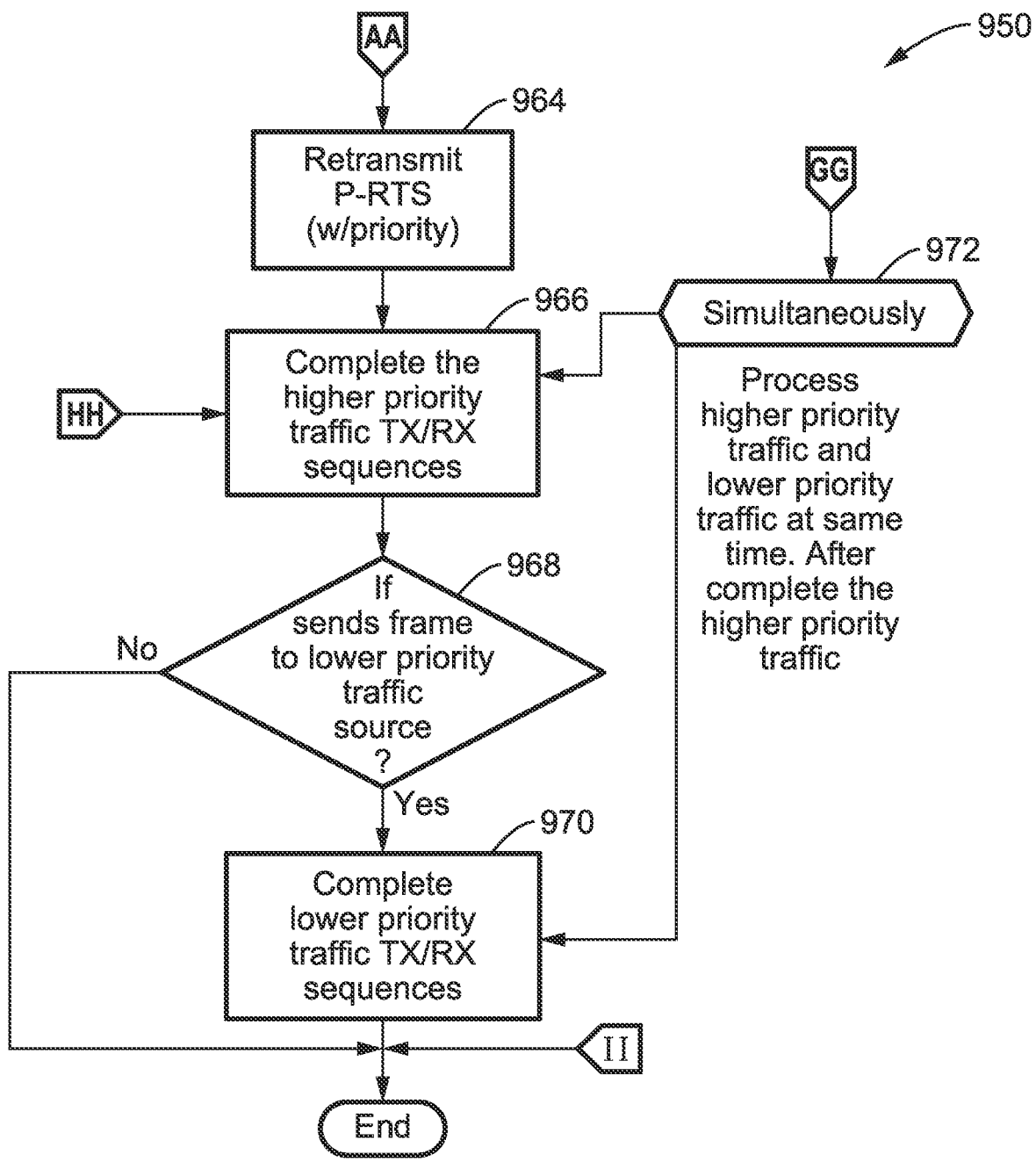

If check 960 indicates that the collision was not overestimated, then at block 964 in FIG. 33 the AP retransmits 964 P-RTS with priority indicated, and completes 966 the higher priority traffic TX/RX sequences.

A check 968 then decides if it should send a frame to the lower priority traffic source. If the frame should not be sent, then the process ends. Otherwise, if it is decided to send the frame, then in block 970 the lower priority traffic sequences are completed before the process ends.

Figure 35:
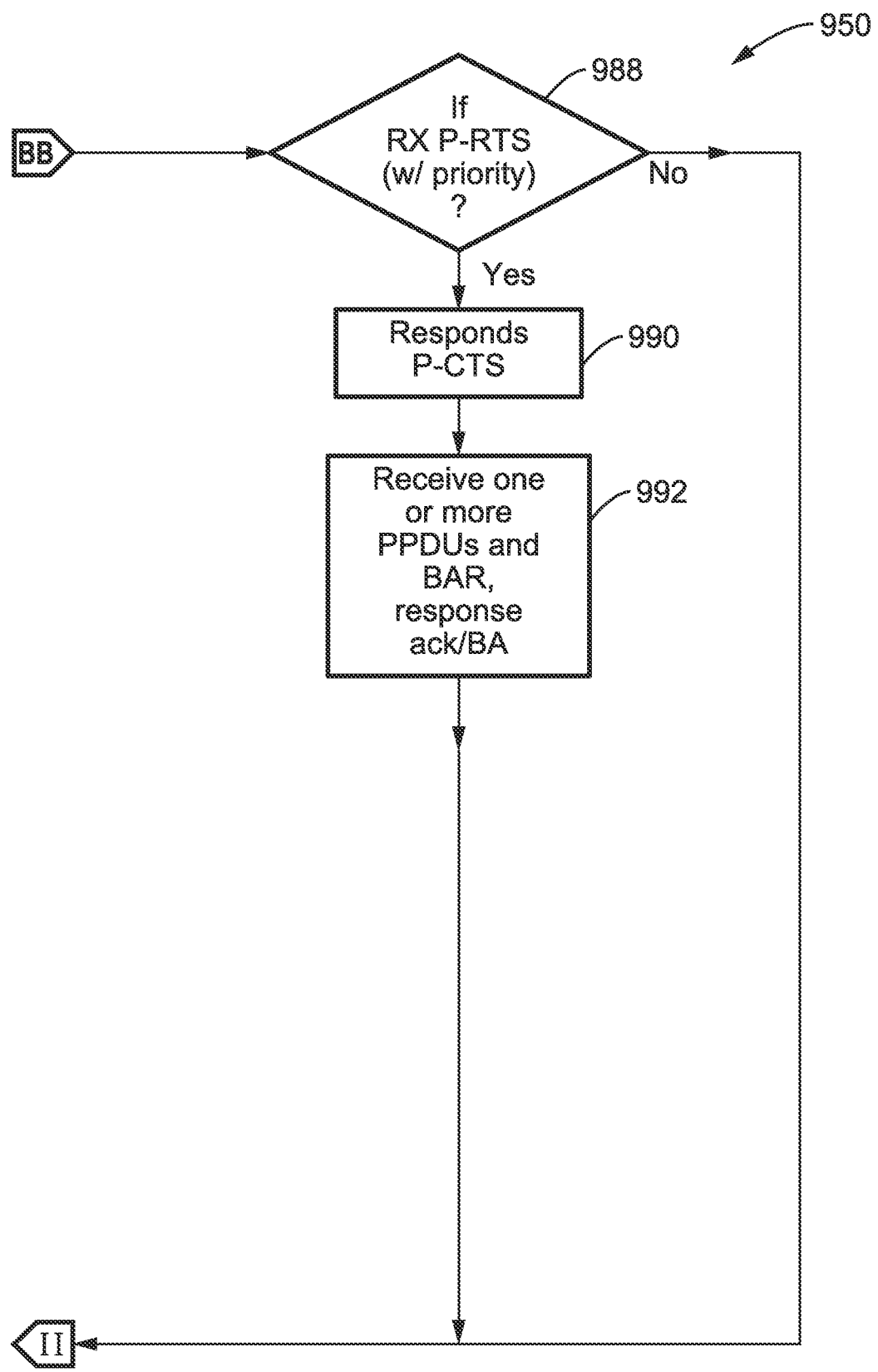

Returning to the first decision block 952 in FIG. 32, if the condition is not met, then execution moves to block 988 of FIG. 35 where it is determined if a P-RTS was received. If it was received, then the AP responds 990 with a P-CTS and the AP receives 992 one or more PPDUs and a Block Ack Request (BAR), and responds with Ack/BA, before the process ends. If the P-RTS was not received as determined at block 988, then the process also ends.

Figure 34:
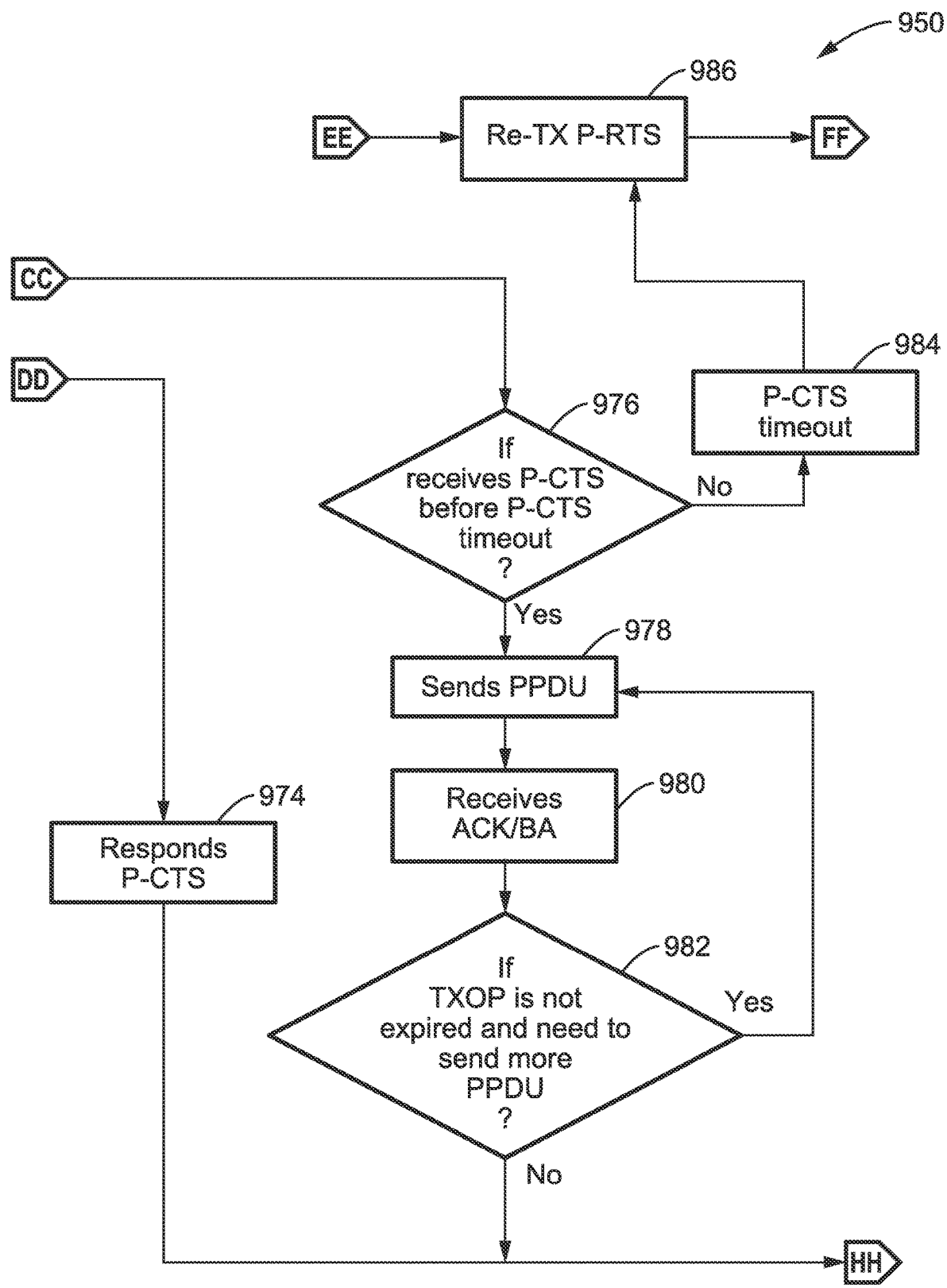

Returning to the second decision block 954 in FIG. 32, if the condition is not met, then execution moves to block 976 in FIG. 34 with a check to determine if a P-CTS was received before the P-CTS timeout. If the condition was not met, then a P-CTS timeout 984 is registered and the P-RTS is retransmitted 986 before execution returns to start at block 952 of FIG. 32.

However, if the conditions of block 976 are met, then at block 978 the AP sends a PPDU and receives Ack/BA 980, then a check 982 is made to determine whether the TXOP has not yet expired and more PPDU should be sent 982. If more PPDU are to be sent, then execution moves back to block 978; otherwise, execution moves to block 966 of FIG. 33 for completing the higher priority TX/RX sequences.

Returning to the third decision block 956 in FIG. 32, if the condition is not met, then at block 974 in FIG. 34 the AP responds with a P-CTS and execution moves to block 966 of FIG. 33.

Returning to the fourth decision block 958 in FIG. 32, if the condition is not met, then at block 986 in FIG. 34, the AP retransmits the P-RTS, with execution returning to the start of the process.

Returning to the fifth decision block 960 in FIG. 32, if collision has been overestimated, then at block 962 the AP responds with a P-CTS to the lower priority traffic source, and execution moves to block 972 in FIG. 33 at which time both the higher and lower priority traffic are processed at the same time seen executing block 966 and 970.

Figure 36:
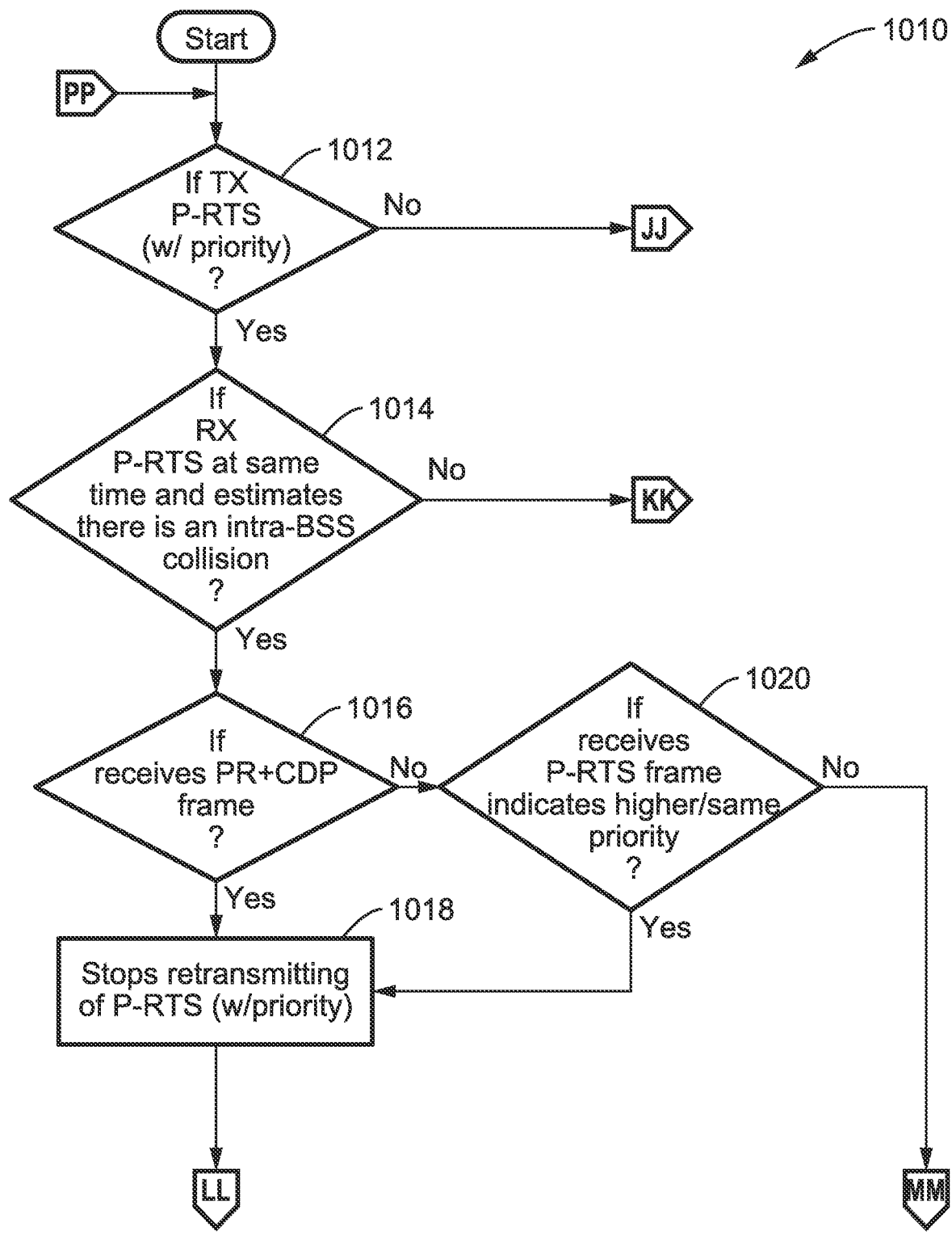
FIG. 36 through FIG. 38 is a flow diagram of FD STA operation if the TXOP starts with a P-RTS, P-CTS combination, according to at least one embodiment of the present disclosure.
Figure 37:
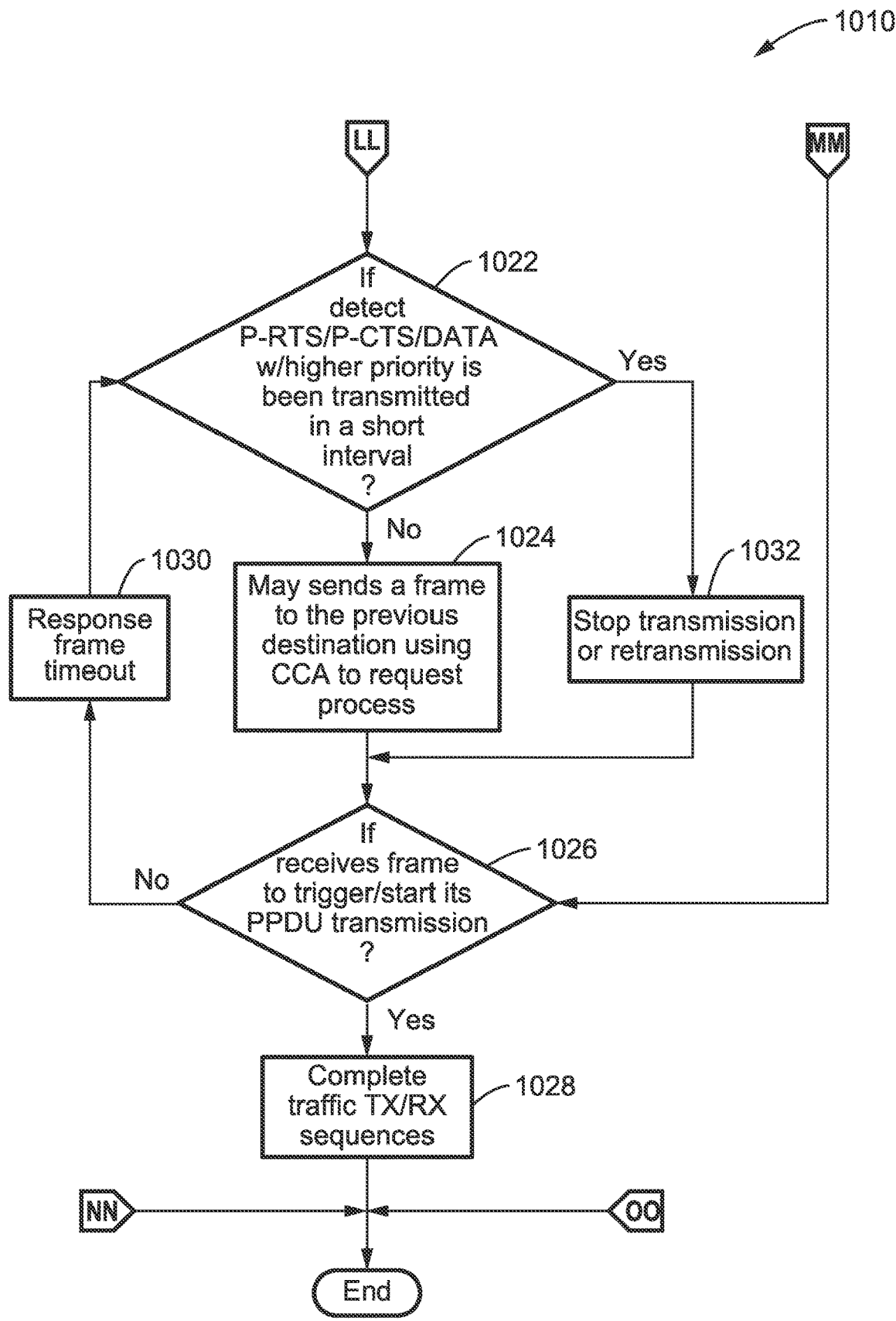
Figure 38:
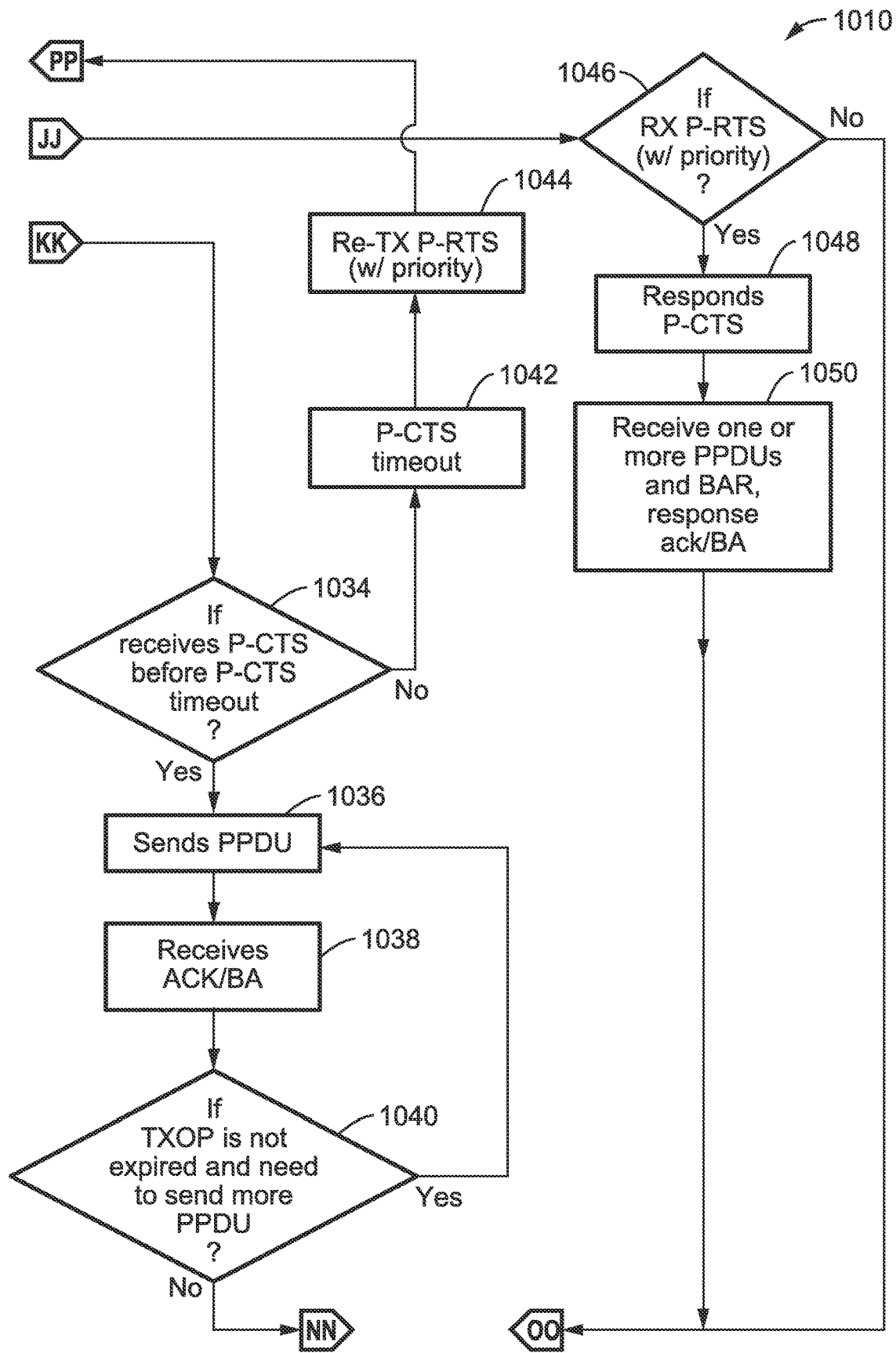
Figure 39:
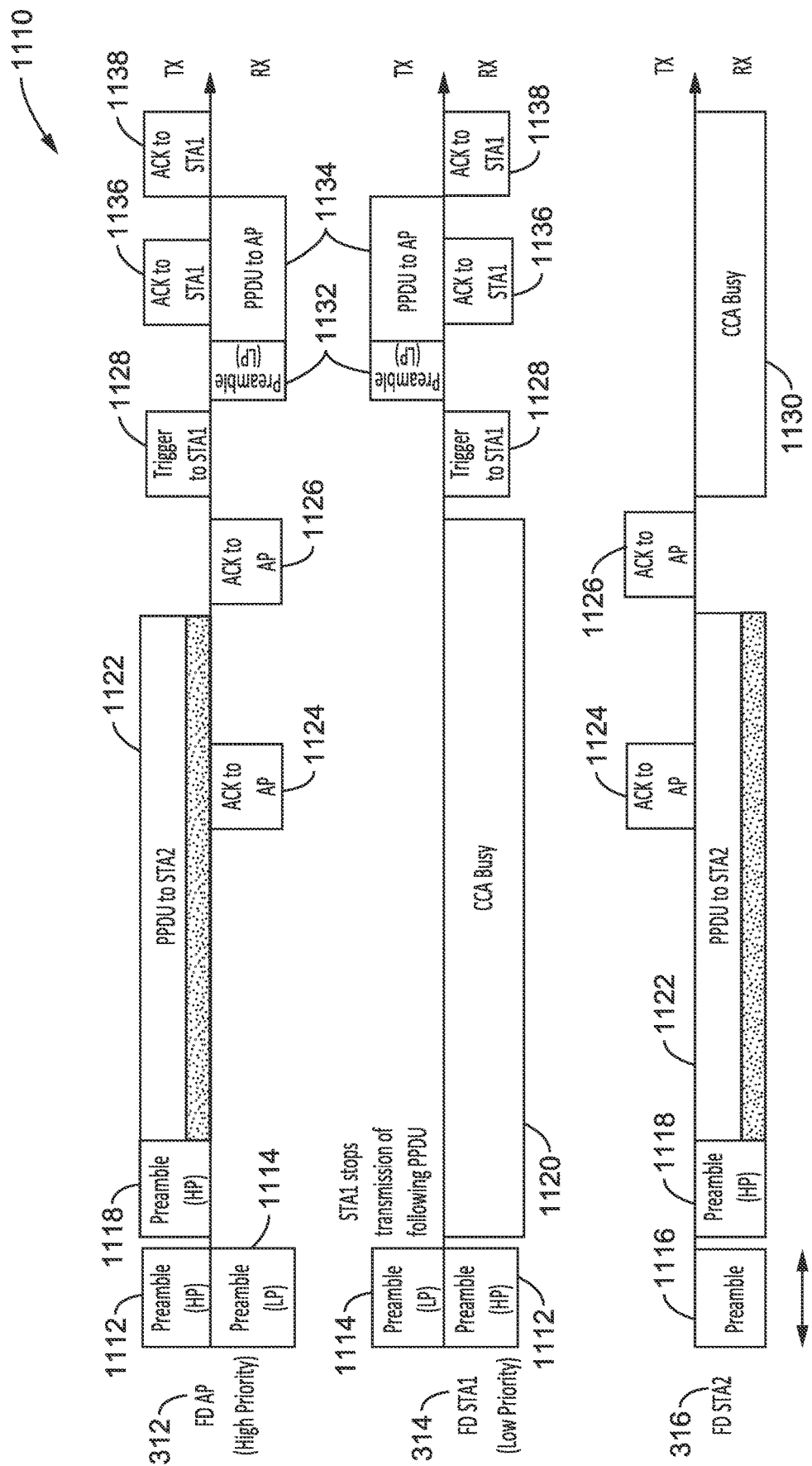
FIG. 39 is a communication diagram of Example 3-1: HP Traffic Grant for PPDU Initiated TXOP, according to at least one embodiment of the present disclosure.

FIG. 36 through FIG. 38 illustrate operation of the FD STA if the TXOP starts with a P-RTS, P-CTS combination.

In FIG. 36 a sequence of checks determines 1012 if a P-RTS has been transmitted; if a P-RTS has been received at the same time and it estimates an intra-BSS collision 1014; and if a PR+CDP frame has been received 1016.

If all these conditions are met, then at block 1018 the STA stops retransmitting of P-RTS and execution moves to block 1022 of FIG. 37, with a check if a P-RTS or P-CTS or DATA with higher priority has been transmitted in a short interval, for example a PIFS time period after it stops (re)transmission.

If the condition is not met, then at block 1024 the STA sends a frame to the same destination as previously sent P-RTS using CCA to request processing of the following transmission.

If the condition of block 1022 is met, then at block 1032 the STA stops its transmission or retransmissions. In either case, execution moves to check 1026 which determines if a frame has been received for triggering and/or starting PPDU transmission. If the condition is met, then at block 1028 the STA completes its TX/RX sequences, and the process ends.

If the condition of check 1026 is not met, then at block 1030 a response frame time out is registered, and execution returns to block 1022.

Returning to block 1012 of FIG. 36 when the condition is not met, execution moves to block 1046 of FIG. 38, which determines if the STA received a P-RTS with priority information.

If the condition is not met, then the process ends.

If the condition of check 1046 is met, then at block 1048 the STA responds with a P-CTS, and then in block 1050 the STA receives one or more PPDUs and BAR and responds with Ack/BA, and the process ends.

Returning to check 1014 if the condition is not met, then at check 1034 of FIG. 38, it is determined if the STA has received a P-CTS before P-CTS timeout. If it was not received in time, then a timeout is registered in block 1042, and the STA retransmits 1044 a P-RTS with priority information and execution moves to block 1012 of FIG. 36.

Otherwise, if the condition is met in check 1034, then at block 1036 the STA sends a PPDU and receives Ack/BA 1038. A check 1040 then determines if the TXOP is still active (not expired) and if more PPDUs need to be transmitted. If the condition is met, then execution returns to block 1036. Otherwise, the TXOP has expired, and the process ends.

Returning to check 1016 in FIG. 36 for when the condition is not met, execution moves to block 1020 which determines if the STA has received a P-RTS frame indicating a higher or equal priority. If the condition is not met, then execution moves to check 1026 of FIG. 37.

6.2-3-1 Example 3-1: HP Traffic Grant for PPDU Initiated TXOP

The topology for this example was shown in FIG. 21. FD AP 312 has High Priority (HP) traffic for FD STA2 316, FD STA1 314 has Low Priority (LP) traffic to FD AP. FD AP, FD STA1 and FD STA2 are in communication range of one another. FD AP and FD STAs initiate a TXOP with a PPDU.

(1) At the beginning STA1 (lower priority) sends preamble 1114 to the associated AP indicating the priority of the traffic. At the same time the AP (higher priority) also sends preamble 1112 to STA2 indicating priority of the traffic.

(2) Both AP and STA1 estimate that there may be an intra-BSS collision, since each has sent its own preamble and received the other's preamble at about the same time.

(3) STA 1 stops transmitting the remainder of the PPDU to AP after estimating an intra-BSS collision and is seen CCA busy 1120. STA1 waits to sense the channel, or wait for AP's response, or a trigger frame to perform the next transmission.

(4) After the AP estimates the intra-BSS collision, if the colliding preamble indicates a lower priority than AP's traffic. Then the AP retransmits the PPDU 1122 immediately, or alternatively a PIFS after receiving the colliding preamble.

(5) AP may reserve some RUs (represented by lower shaded region of the PPDU blocks) to transmit select control messages to other STAs which are not the destination of the current PPDU frames. If the colliding preamble indicates a higher priority than the traffic of the AP, then the process is performed as introduced in example 3-3 and 3-4 which will be described in latter sections.

(6) STA2 receives DL PPDU 1122 from the AP and can respond with an Ack/BA 1124, 1126, to the AP during its reception. The time to respond to the Ack/BA should follow the schedule (if any) which could be set in the BAR or other control/management frames.

(7) AP does not receive an Ack/BA from STA2 after/during the retransmission of PPDU and may send a trigger frame 1128 to STA1 to enable STA1 to access the channel.

(8) STA1 doesn't receive a PPDU from the AP, nor from STA2 with a destination to the AP which can access the channel again after EDCA backoff by sending for example a control frame or retransmitted PPDU to the AP or wait for a trigger frame from the AP to start transmitting TB-PPDU.

(9) STA1 senses CCA busy 1120, and thus waits to access the channel for (re)transmit PPDU unless it receives a trigger from the AP to enable STA1 to access channel.

In the figure, during the PPDU 1122 STA2 sends ACKs 1124 and 1126. AP sends a trigger to STA1 1128. STA1 sends preamble (LP) 1132 PPDU 1134. AP responds to STA1 with Acks 1136 and 1138; during which STA2 is CCA busy 1130.

Figure 40:
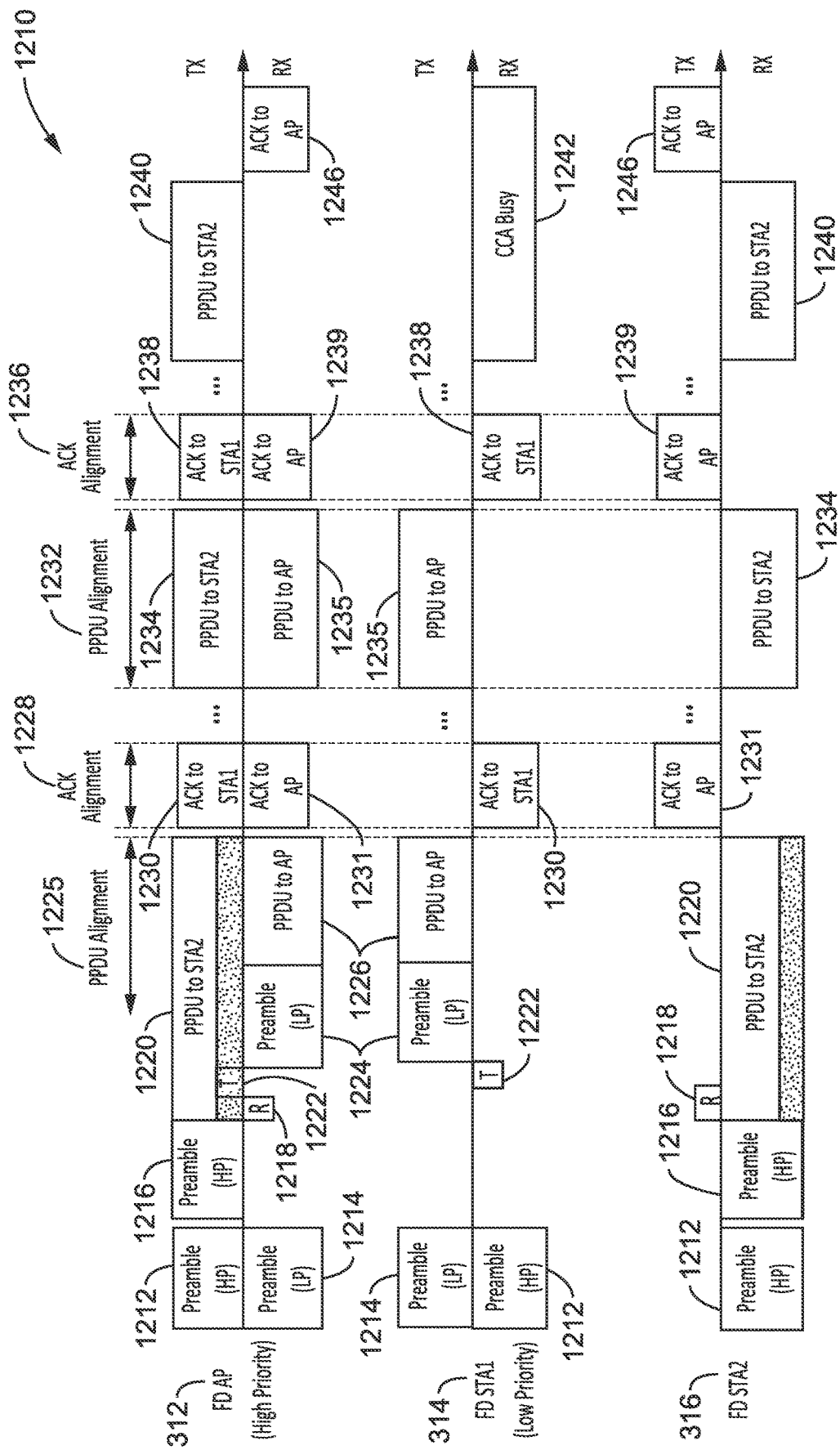
FIG. 40 is a communication diagram of Example 3-2: HP Traffic Grant with an Overestimated Intra-BSS Collision, according to at least one embodiment of the present disclosure.

6.2-3-2 Example 3-2: HP Traffic Grant with an Overestimated Intra-BSS Collision FIG. 40 illustrates an example embodiment 1210 of the AP with HP, STA1 with LP. STA1 and STA2 are not in communication range. The process starts with a DATA PPDU.

(1) At the beginning STA1 (lower priority) sends preamble 1214 to the associated AP indicating the priority of the traffic. At the same time AP (higher priority) also sends preamble 1212 to STA2 indicating the priority of the traffic.

(2) Both AP and STA1 estimate that there may be an intra-BSS collision since they have sent their own preamble and received a preamble from the other STA at the same time. However, both of them over-estimate the intra-BSS collision.

(3) STA1 stops transmitting the remainder of the PPDU to the AP after estimating the intra-BSS collision, it recognizes that a colliding preamble exists which indicates a higher priority traffic than its priority. STA1 should wait to sense the channel or wait for AP's response or trigger frame 1222 to perform the next transmission.

(4) After the AP estimates the intra-BSS collision, if the colliding preamble indicates a lower priority than the traffic of the AP, then the AP retransmits 1220 the PPDU to STA2 immediately, or maybe a PIFS after receiving the colliding preamble. The AP may reserve some RUs (shown in the shaded portion of the PPDU) to transmit control messages to some other STAs, which are different from the destination of the ongoing transmitting PPDUs.

(5) Since there is no collision on STA2, it receives the preamble from the AP, but doesn't receive the remainder of the DATA PPDU. Later, it receives the retransmitted PPDU with the same preamble. In this case, it may transmit a control frame, such as CTS to the PPDU source using the reserved RUs 1218 and 1222, which may be an immediate response or a SIFS after receiving the preamble.

(6) AP receives the control frame 1218 from STA2 in the reserved RUs during which the AP may be transmitting a DL PPDU to STA2. The AP may then send a trigger frame (e.g., PR+CDP) to STA1 using the reserved RU to trigger preamble 1224 with UL PPDU 1226 from STA1. It should be noted that the trigger frame should contain the PPDU end point alignment information to align the end point of the TB PPDU from STA1 to AP and the UL PPDU from AP to STA2.

(7) STA1 receives the control frame from the AP in the reserved RU to trigger UL PPDU 1220, it should transmit UL PPDU 1224, 1226 following the PPDU end point alignment 1225 rule from the received control frame.

(8) AP and STA2 receives the PPDUs 1220, 1226 and should respond with an Ack/BA 1230 and 1231, simultaneously with Ack/BA start point and end point alignment 1228. The Ack/BA should not be scheduled when the STA is transmitting PPDU. There are several ways to achieve this: (a) Transmit BA request in the end of each PPDU transmission. BA only responds after receiving the BA request. (b) Configure this in the control frames, such as PR+CDP frame or other management frames that exchange between AP and STAs for reconfiguration.

The figure shows additional aligned 1232 PPDUs 1234, 1235 between the AP and STA2, followed by the aligned 1236 associated Acks 1238 and 1239. After this another PPDU is 1240 is sent to STA2, with Ack 1246, while STA1 is seen CCA busy 1242.

Figure 41:
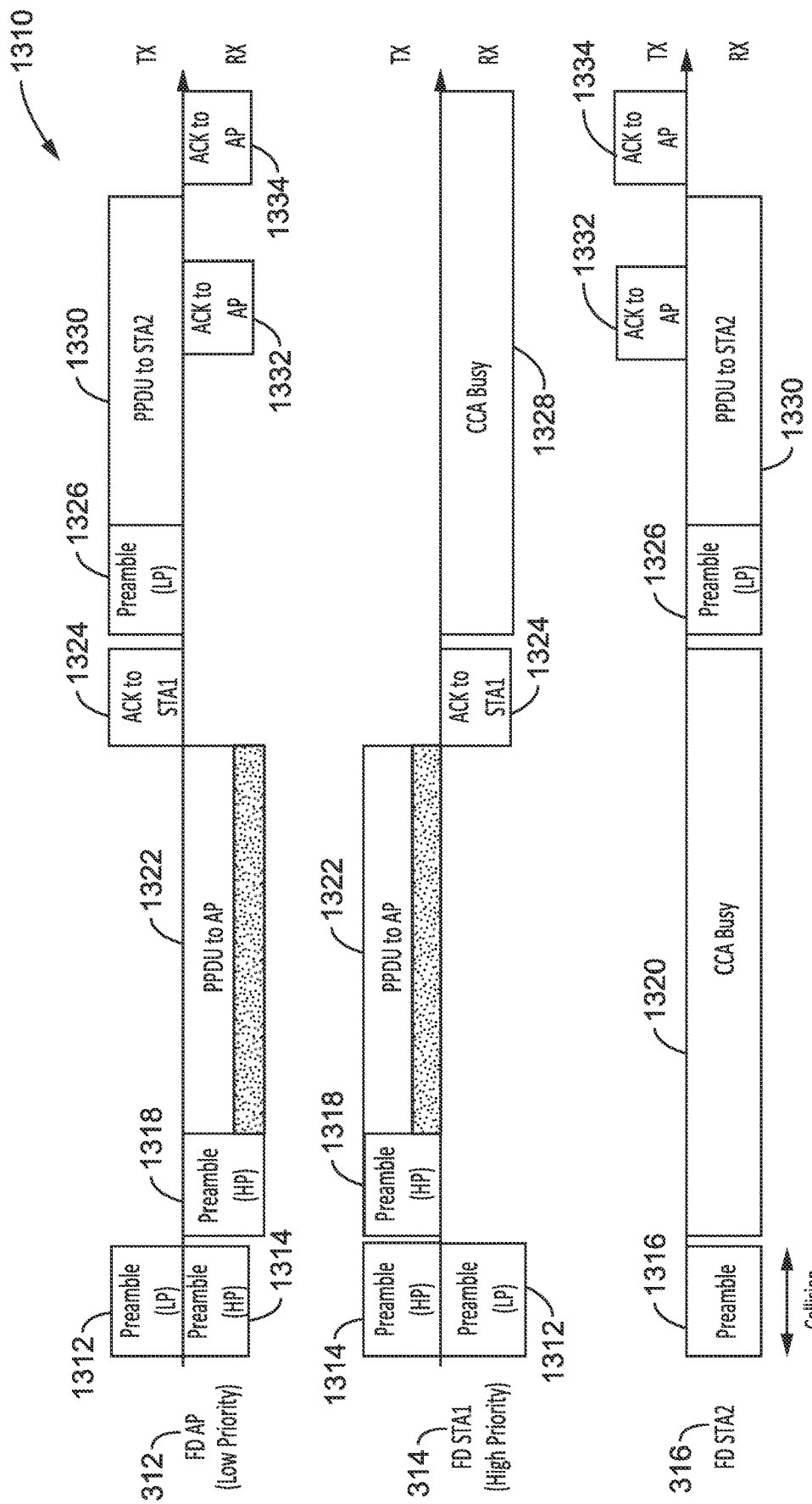
FIG. 41 is a communication diagram of Example 3-3: HP Traffic Grant for PPDU initiated TXOP when AP has LP, according to at least one embodiment of the present disclosure.

6.2-3-3 Example 3-3: HP Traffic Grant for PPDU initiated TXOP when AP has LP FIG. 41 illustrates an example embodiment 1310 of this Example 3-3, in exemplifying an HP traffic grant for a PPDU initiated TXOP when the AP has low priority. The topology is shown as Case 2 of FIG. 30.

The FD AP 312 has Low Priority (LP) traffic to send to FD STA2 316, while FD STA1 314 has High Priority (HP) traffic to send to FD AP. FD STA1 and FD STA2 are not in range of each other, but both are in communication range of the FD AP. The FD AP and FD STAs initiate TXOP with PPDU.

(1) At the beginning STA1 (higher priority) sends a preamble 1314 to the associated AP, indicating the priority of the traffic. At the same time AP (lower priority) also sends preamble 1312 to STA2 indicating the priority of the traffic.

(2) Both the AP and STA1 estimate that there may be an intra-BSS collision since they recognize that their own preambles are sent at the same time that the preambles are received at the same time.

(3) STA1 stops transmitting the PPDU (to avoid any possible further collision) after estimating the intra-BSS collision based on the transmitted and received preambles at the same time. If STA1 has higher priority, it may immediately retransmit a new preamble 1318 and PPDU 1322 to the AP or retransmit the PPDU a PIFS after received the colliding preamble. STA1 may reserve some RUs (as shown in shaded area of the PPDU) for AP to exchange control massages with other STAs.

(4) After the AP estimates the intra-BSS collision, if the colliding preamble indicates a higher priority than the traffic of the AP. The AP stops transmitting the remainder of the PPDU.

(5) AP receives UL PPDU 1322 from STA1 and can respond with Ack/BA 1324 to STA1 during its reception. The time to respond with an Ack/BA should follow a schedule (if any), which can be set in the BAR or other control/management frames.

(6) After completing transmission sequences to receive the UL PPDU from STA1, the AP can access the channel again after EDCA backoff to send a retransmitted preamble 1326, and PPDU 1330 to STA2, to be responded to by Ack/BA 1332 and 1334. During this time STA1 sees CCA busy.

6.2-3-4 Example 3-4: HP Traffic Grant for PPDU Initiated TXOP when AP has LP

Figure 42:
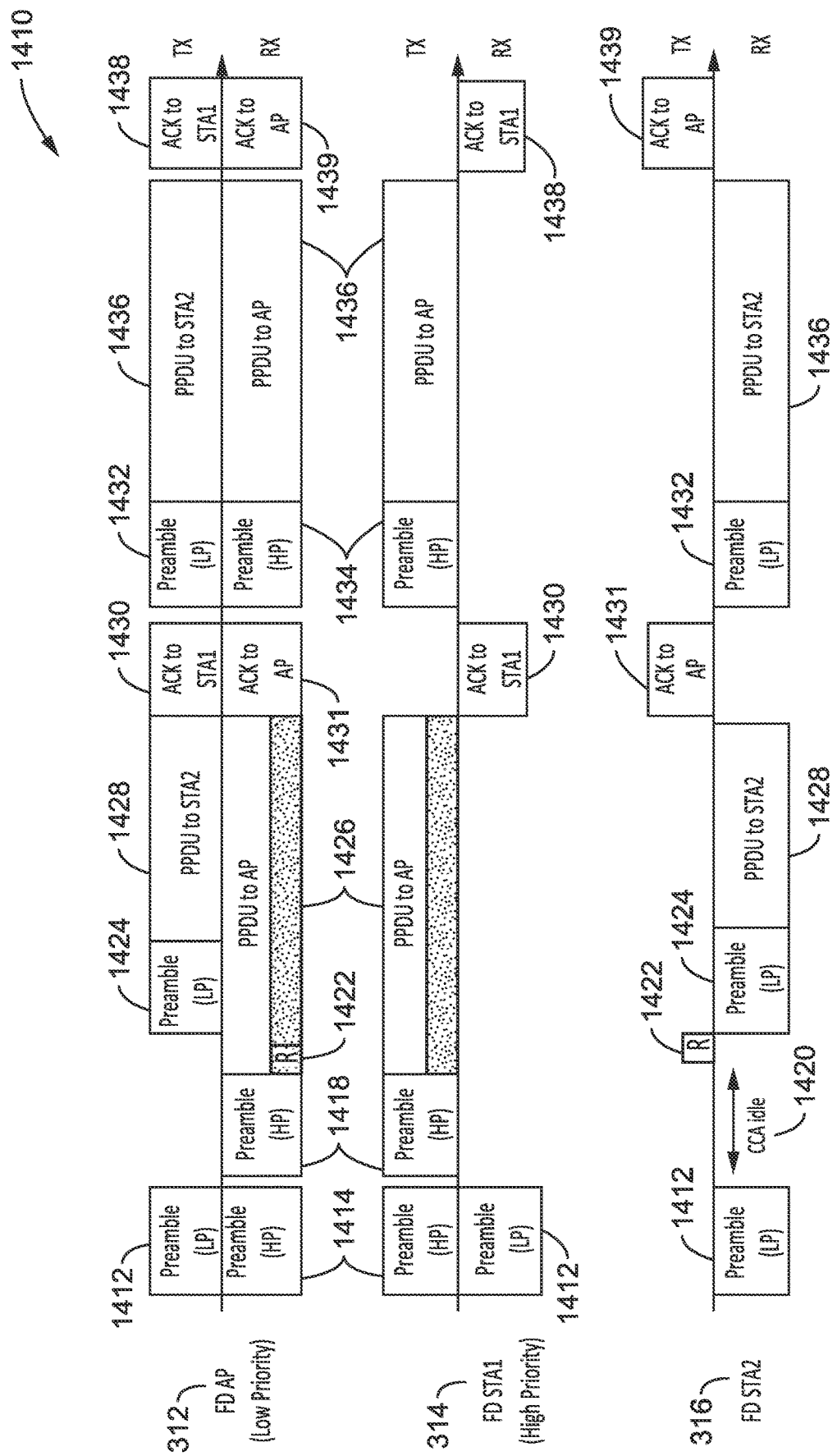
FIG. 42 is a communication diagram of Example 3-4: HP Traffic Grant for PPDU Initiated TXOP when AP has LP, according to at least one embodiment of the present disclosure.

FIG. 42 illustrates an example embodiment 1410 with the FD AP 312 having LP, the FD STA1 314 with HP, and FD STA2 316. In this STA1 and STA2 are not in range of one another, but are in range of the AP. The example commences with a DATA PPDU.

The topology is like that shown in FIG. 30 Case 2 850*b*, the only difference being that the AP has LP to STA2 and STA1 has HP to the AP. The FD AP has Low Priority (LP) traffic to FD STA2, FD STA1 has High Priority (HP) traffic to FD AP. FD STA1 and FD STA2 cannot communicate with each other, but both can communicate with FD AP. FD AP and FD STAs initiate TXOP with PPDU.

(1) At the beginning STA1 (higher priority) sends a preamble 1414 to the associated AP, indicating the priority of the traffic. At the same time the AP (lower priority) also sends preamble 1412 to STA2 with indicating the priority of the traffic.

(2) Both the AP and STA1 estimate that there may be an intra-BSS collision since they sent their own preamble and received a preamble from the other station at the same time. However, both of them overestimated the intra-BSS collision in this case.

(3) After AP estimates the intra-BSS collision, if the colliding preamble indicates a higher priority than AP's traffic. The AP stops transmitting the remainder of the PPDU, unless it receives a control frame from the reserved RU, which indicates the AP has overestimated the intra-BSS collision.

(4) STA1 stops transmitting the remainder of the PPDU 1414 (to avoid any possible further collision) after estimating the intra-BSS collision based on the transmitted and received preambles. If STA1 has higher priority, then STA1 may immediately retransmit the preamble 1418 and PPDU 1426 or retransmit the PPDU a PIFS after receiving the colliding preamble. STA1 may reserve some RUs (as shown in the shaded portion of the PPDU) for the AP to exchange control messages with the other STAs.

(5) In this case, STA2 receives the preamble from the AP without the remainder of the DATA PPDU. If STA2 doesn't receive anything and the channel is idle for another preamble duration and perhaps plus a PIFS interval, STA2 may send the AP a control frame immediately or with another SIFS delay using the reserved RUs, to indicate it receives the preamble.

(6) AP receives the control frame 1422 from STA2 on reserved RUs, which indicates it overestimated the intra-BSS collision. The AP may retransmit the preamble 1424 and PPDU 1428 to STA2, which is the destination of the over-estimated intra-BSS collision. AP shall transmit DL PPDU to STA2 with PPDU having end point alignment with the received UL PPDU from STA1.

(7) AP and STA2 receives the PPDUs and should respond with Ack/BAs 1430 and 1431 simultaneously with Ack/BA start point and end point alignment. Ack/BA should not be scheduled when the STA is transmitting PPDUs. There are several ways to achieve this: (a) Transmit a BA request in the end of each PPDU transmission. Utilize BA only responses after a received BA request (BAR). (b) Configure this in the control frames, such as PR+CDP frame or other management frames that exchanges between AP and STAs for reconfiguration.

Then the figure shows additional PPDUs with preamble 1432 and PPDU 1436 to STA2, and preamble 1434 and PPDU to AP 1436, followed by Acks 1438 and 1439.

Figure 43:
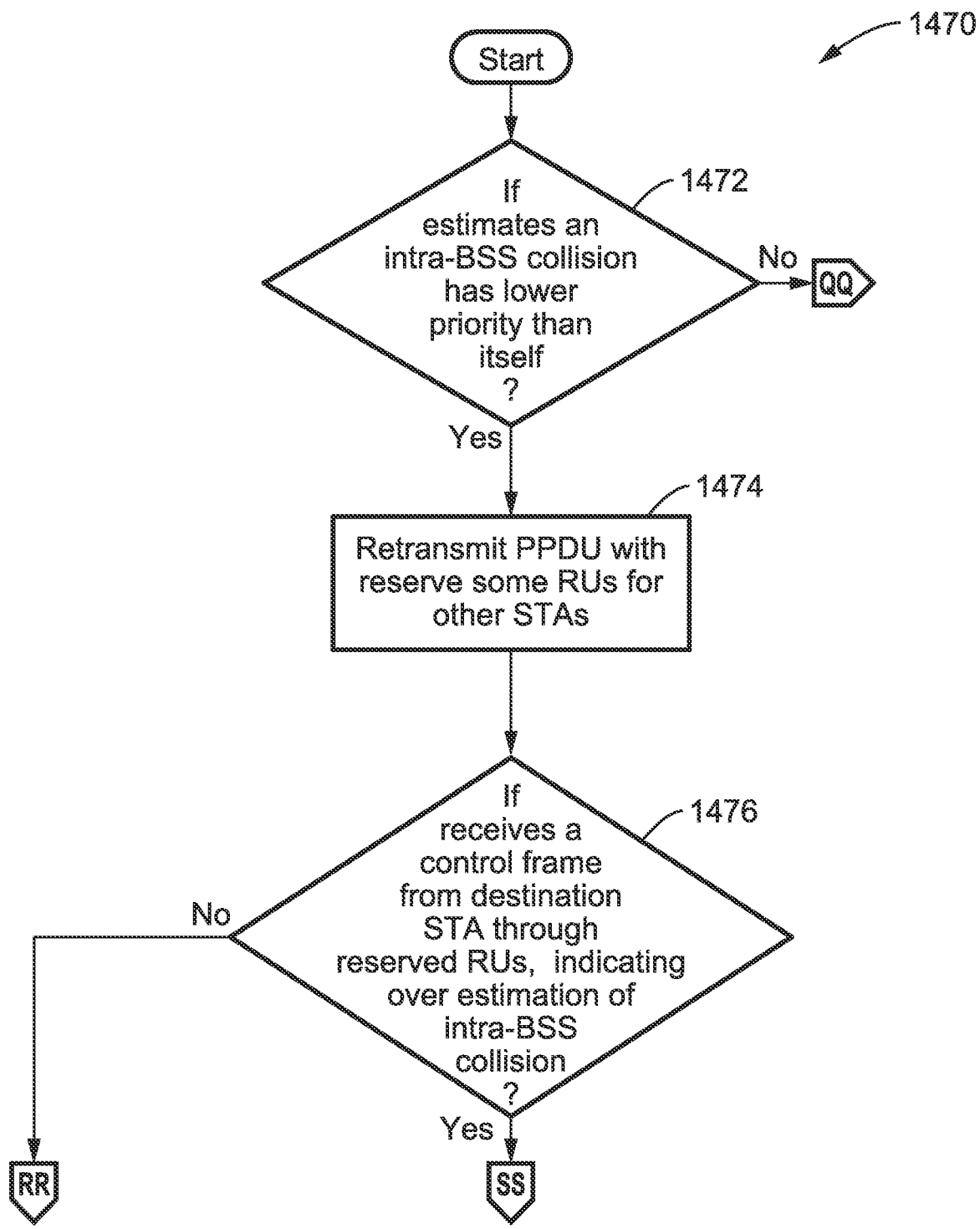
FIG. 43 through FIG. 45 is a flow diagram of a FD AP starting a TXOP with the DATA PPDU, according to at least one embodiment of the present disclosure.
Figure 44:
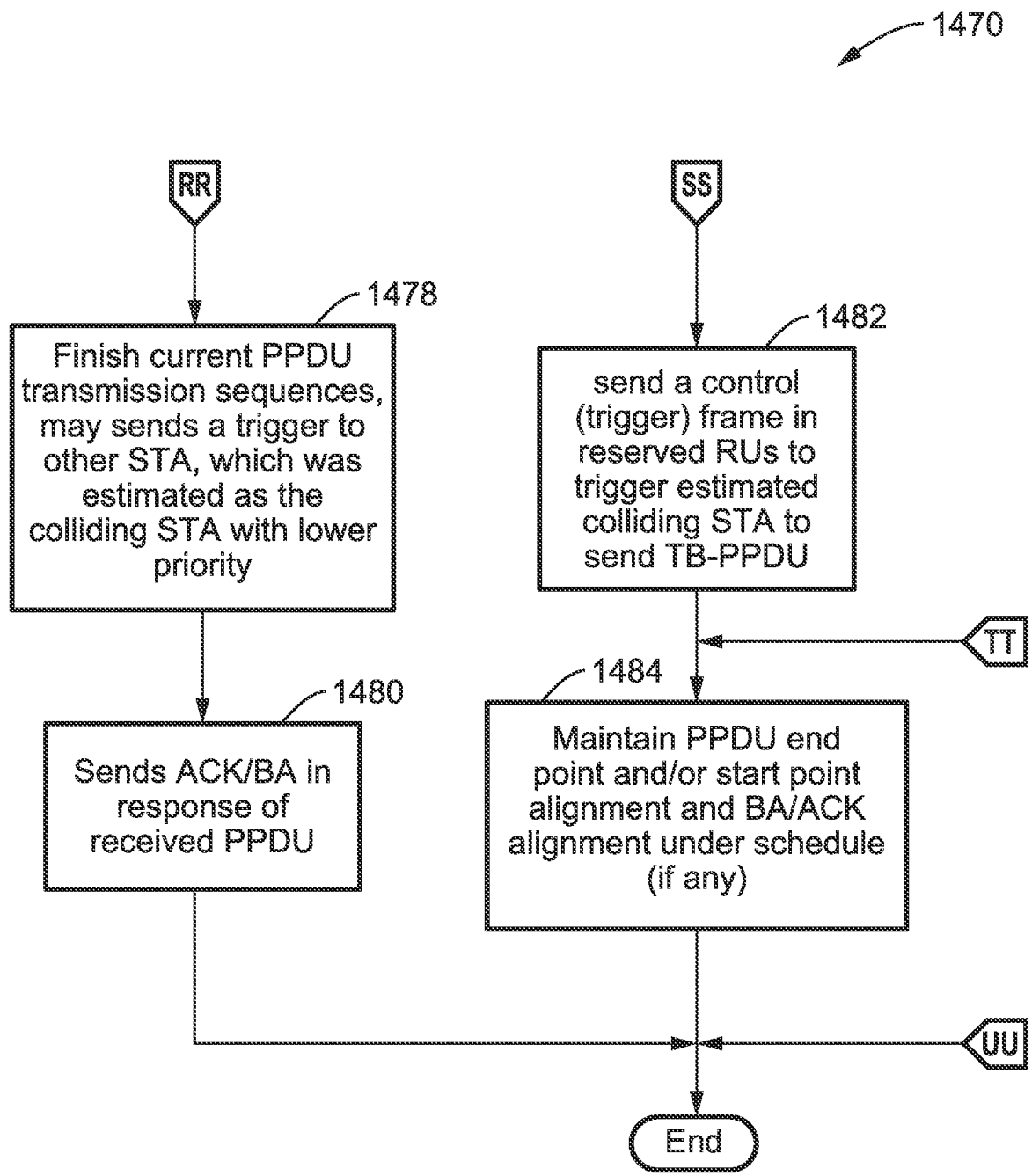
Figure 45:
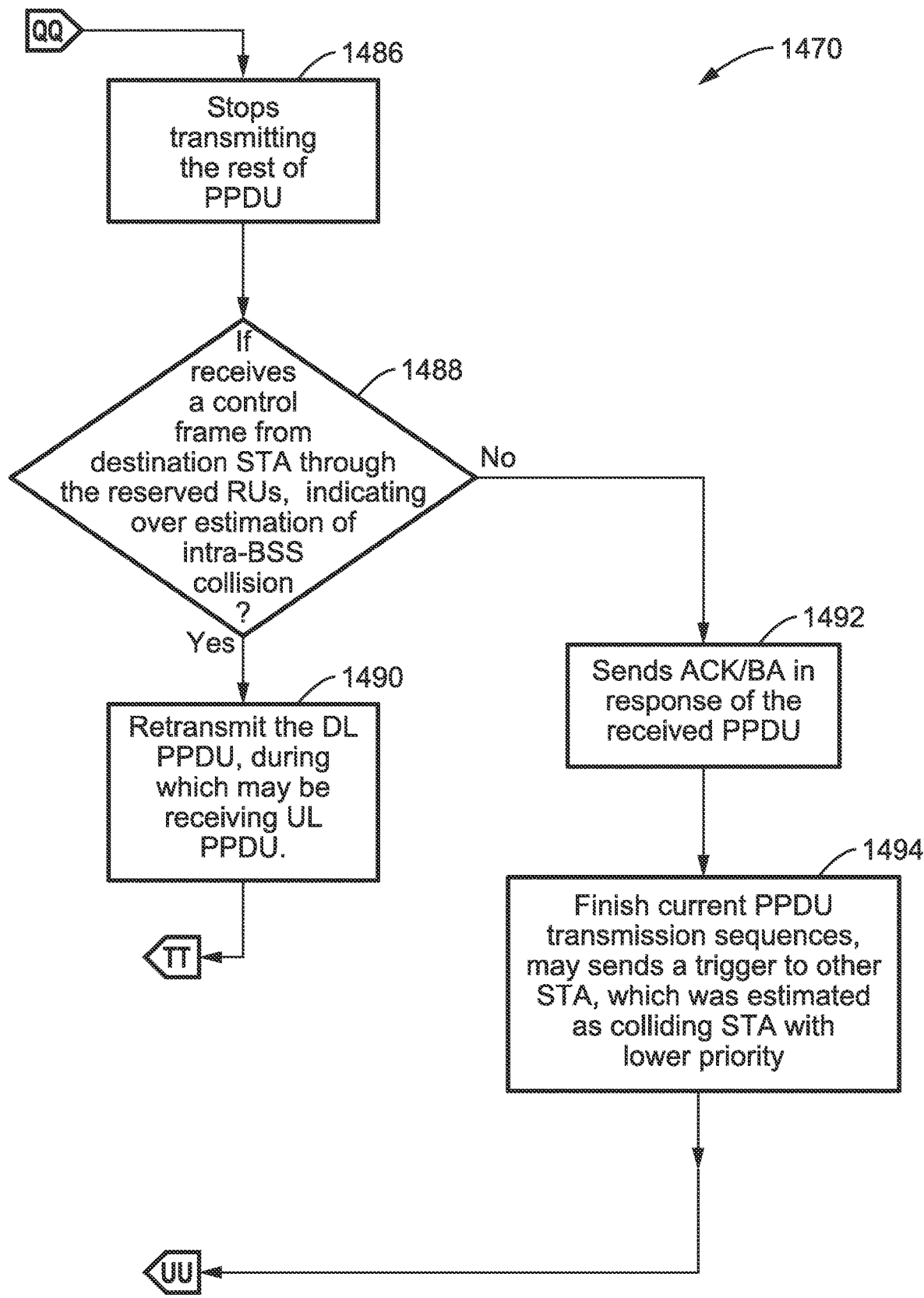

FIG. 43 through FIG. 45 illustrate an example embodiment 1470 of a FD AP starting a TXOP with the DATA PPDU. At check 1472 the AP estimates an intra-BSS collision has lower priority than itself.

In FIG. 43, if the condition is met, then at block 1474 the AP retransmits the PPDU with a reserve of some RUs for other STAs. Then in check 1476 a check determines if the AP received a control frame from the destination through reserved RUs, indicating overestimation of the intra-BSS collision.

If the condition is met at block 1476, then at block 1482 in FIG. 44 the AP sends a control (trigger) frame in reserved RUs to trigger estimated colliding STA to send a Trigger-Based PPDU (TB-PPDU). Then at block 1484 the AP maintains a PPDU end point and/or start point alignment and Ack/BA alignment under a schedule, if there is one, and the process ends.

Returning to check 1476, if the condition is not met, then execution reaches block 1478 in FIG. 44 to finish the current PPDU transmission sequences, and sends a trigger to another STA which was estimated to be the colliding STA with lower priority. Then in block 1480, the AP sends an Ack/BA in response to the received PPDU, and the process ends.

Returning to check 1472, if the condition is not met, execution reaches block 1486 in FIG. 45, where the AP stops transmitting the remainder of the PPDU. Then at check 1488 the AP determines if it has received a control frame from the destination STA through the reserved RUs, indicating over estimation of the Intra-BSS collision.

If the condition is met, then at block 1490 the AP retransmits the DL PPDU during which it may be receiving a UL PPDU, with execution moving to block 1484 in FIG. 44.

Returning to block 1488, if the condition is not met, then at block 1492 the AP sends an Ack/BA in response of the received PPDU, after which in block 1494 the AP finishes the current PPDU transmission sequences, that may send a trigger to the other STA, which was estimated as colliding STA with lower priority, and the process ends.

Figure 46:
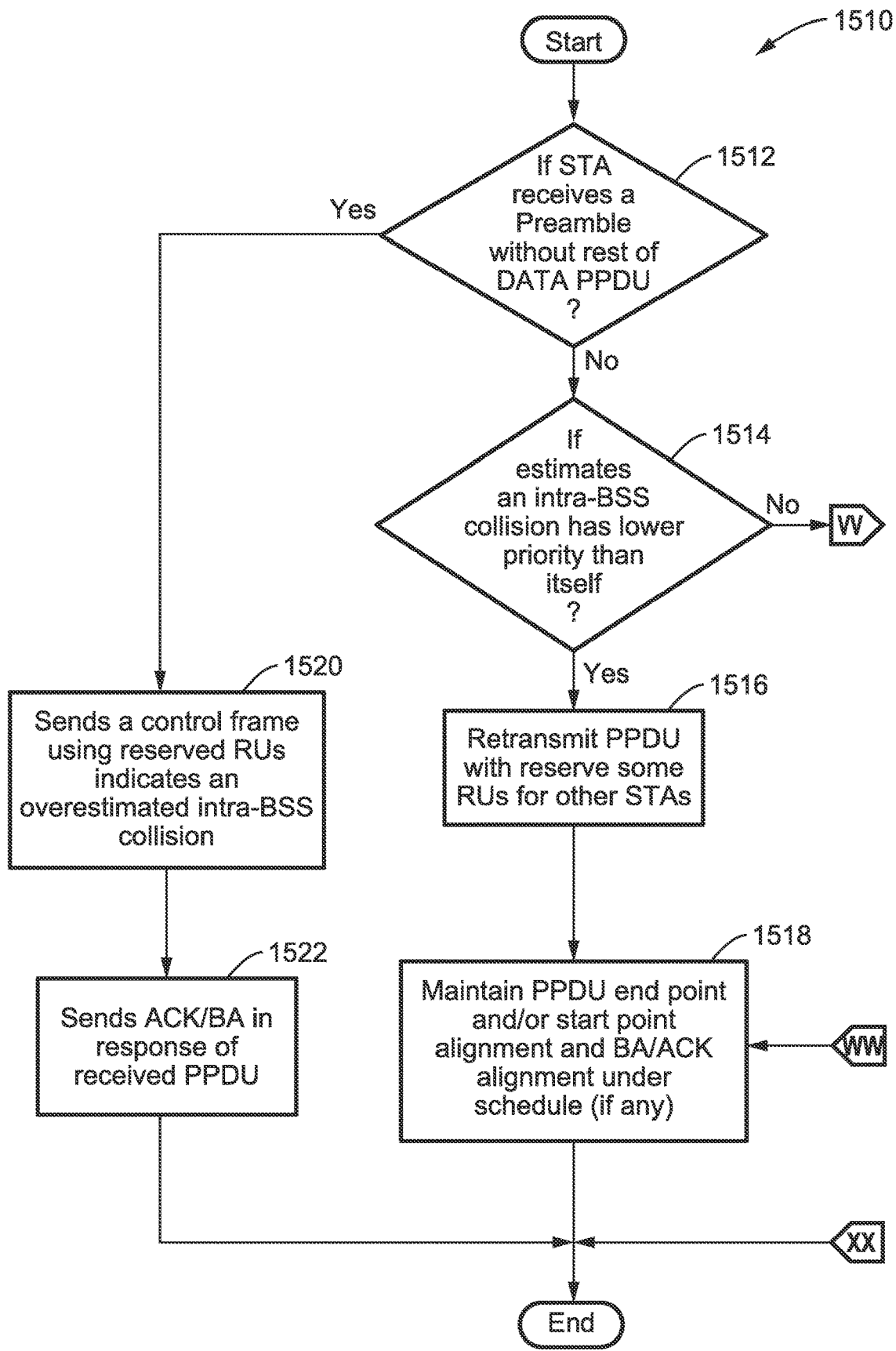
FIG. 46 through FIG. 47 is a flow diagram of a non-AP STA starting the TXOP with a DATA PPDU, according to at least one embodiment of the present disclosure.
Figure 47:
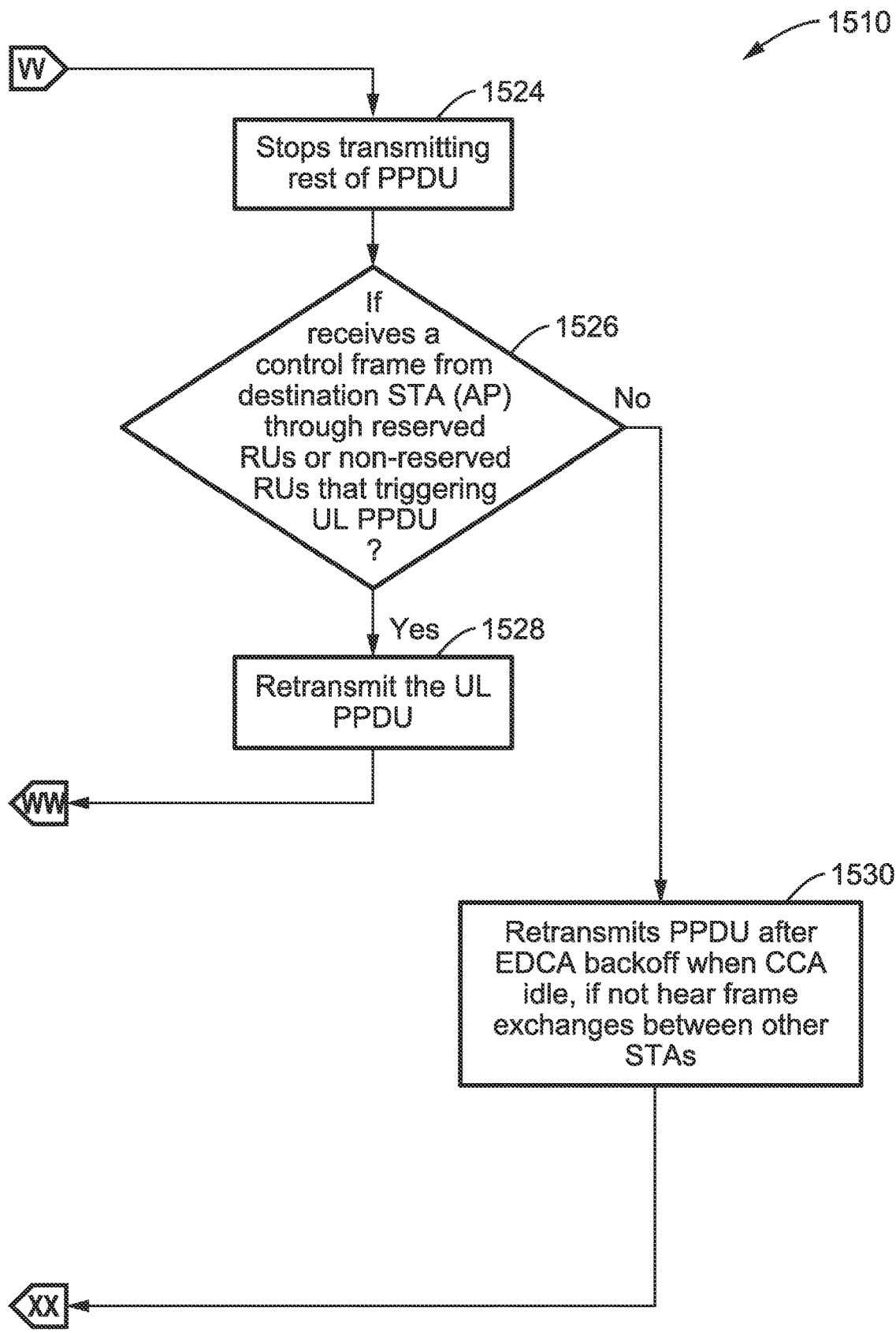

FIG. 46 and FIG. 47 illustrates an example embodiment 1510 of a non-AP STA starting the TXOP with a DATA PPDU.

A check 1512 determines if the non-AP STA has received a preamble without the remainder of the DATA PPDU. If this condition is met, then at block 1520 the STA sends a control frame using reserved RUs to indicate an overestimated intra-BSS collision, then in block 1522 the non-AP STA sends an Ack/BA in response to the PPDU, and the process ends.

Returning to check 1512, if the condition is not met, then at check 1514 the STA checks if the estimates of the intra-BSS collision has lower priority than itself.

If the condition is met, then at block 1516 the STA retransmits PPDU with reserving some RUs for other STAs, and in block 1518 the STA maintains the PPDU end point and/or start point alignment and Ack/BA alignment under a schedule (if there is a schedule), and the process ends.

Returning to check 1514, if the condition is not met, then execution reaches block 1524 in FIG. 47 and the STA stops transmitting the remainder of the PPDU. A check 1526 determines if a control frame has been received from the destination STA (AP) through reserved RUs, or non-reserved RUs, that triggered the UL PPDU.

If the condition is not met, then at block 1530 the STA retransmits PPDU after EDCA backoff when channel is CCA Idle, if it is not able to receive frame exchanges between other STAs, and the process ends.

If the condition is met, then execution moves from check 1526 to block 1528 with the STA retransmitting the UL PPDU, before moving to block 1518 in FIG. 46.

7. Data Structures
7.1. Preamble with Priority

There are some reserved bits in legacy preambles. Referring back to the FD training sequence of FIG. 4 and FIG. 5 the following should be noted. Bit 14 (B14) of the HE-SIG-A field of an HE SU PPDU and HE ER SU PPDU is reserved. Bit 7 (B7) of HE-SIG-A field of an HE MU PPDU is reserved. In both cases, these reserved bits can be utilized to indicate priority High (stage 1) and priority Low (stage 0).

In the following descriptions specific bit states for indicating a condition/information are provided by way of example and not limitation.

Another way is to implement priority information in the FD Preamble following the legacy preamble was shown in FIG. 5. A priority subfield can be contained in the FD Preamble field. Alternatively, different priorities can be embedded in different subcarrier/subcarriers with certain space (i.e., at least 40 ppm) in between on top of the tones corresponding to the bits range of FD Preamble field.

7.2. P-RTS (Prioritized RTS)

FIG. 48 illustrates an example of a P-RTS frame 1590. FD STAs may initiate a TXOP with sending a P-RTS frame, which indicates the priority of the traffic that the transmitting STA requests to send and some scheduling information such as PPDU alignment. A STA receiving a P-RTS frame should recognize the traffic priority required, and should follow the PPDU or/and the Ack alignment rules as request in this frame. Frame Control indicates frame control information corresponding to different frame types. Duration/ID field sets a NAV value at receiving STAs that protects up to the end of any following Data, Management, or response frame plus any additional overhead frames in single protection; otherwise, it sets a NAV that protects up to the estimated end of a sequence of multiple frames in multiple protection.

RA field of this frame is the address of the STA that is the intended immediate recipient TA field is the address of the STA transmitting this frame. Priority field indicates the priority specified in the RTS frame. FCS field for error-detection that contains a 32-bit CRC. PR control field indicates the Priority Request information and the corresponding control information for the following process after sending/receiving this frame.

FIG. 49 illustrates an example embodiment 1610 of a PR Control field from FIG. 48. A Priority Request subfield indicates the priority of the traffic that the STA who sent this frame requests to transmit. PPDU and ACK SYN request subfield: if set 1, the STAs that sends or receives this frame should align the start point of PPDU and aligns the start point of Ack/BA as the response of per received PPDU.

A PPDU Start Time subfield indicates the options of starting PPDU TX/RX after TX/RX this frame. If set as 0: means no specific start time indicated, STA starts sending PPDU a SIFS after completing all control frame exchanges with its destination. (e.g., from sending P-RTS to receiving P-CTS as the response of P-RTS). If set as 1: indicates a specific start time. For example, after 1 PR+CDP frame duration+SIFS+1 CTS frame duration+SIFS for FD STAs after receiving this frame. For FD STAs that sends this frame, it needs to add one more SIFS to the previous calculation since it starts counting after it transmits this frame. PPDU Duration Alignment subfield: set as 1 to indicate the PPDU shall be padded to end at the same time, as indicated by the L-SIG field of the preamble.

7.3. P-CTS (Prioritized CTS)

Figure 50:
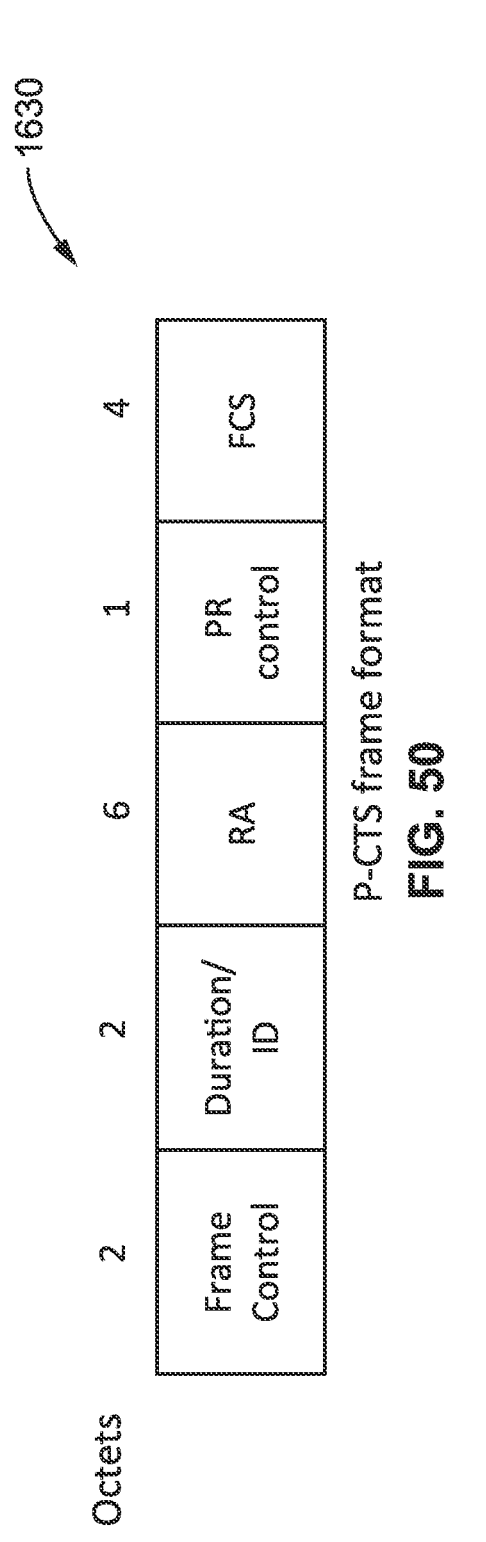
FIG. 50 is a data field diagram of a P-CTS frame, according to at least one embodiment of the present disclosure.

FIG. 50 illustrates an example embodiment 1630 of a P-CTS frame. FD STA sends P-CTS frame as a response of receiving P-RTS frame. This is shown with Frame control, Duration ID, RA, PR Control and FCS.

Figure 51:
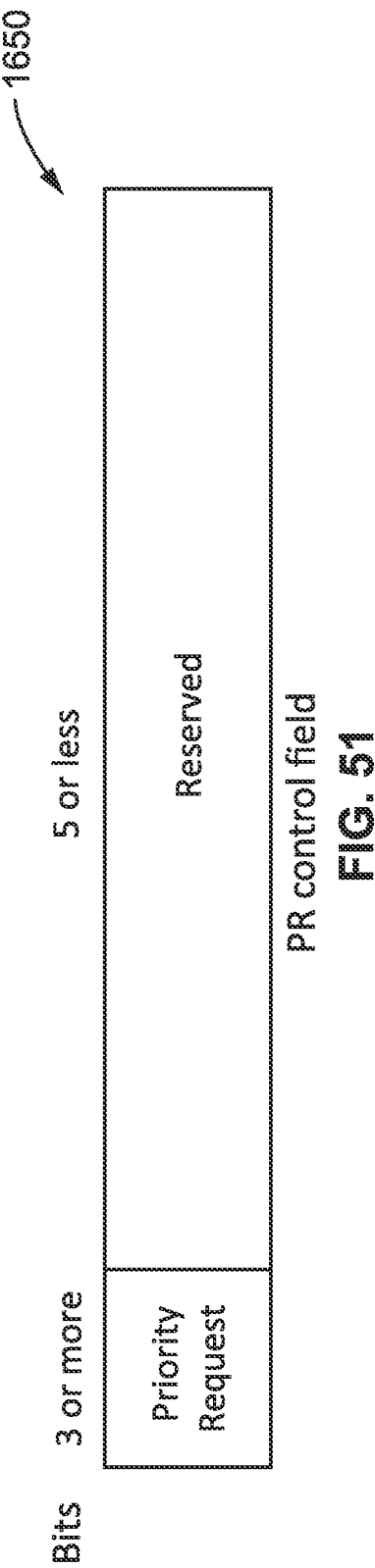
FIG. 51 is a data field diagram of a PR control field shown in FIG. 50, according to at least one embodiment of the present disclosure.

FIG. 51 illustrates an example embodiment 1650 of the PR control field shown in FIG. 50. The PR control field indicates the Priority Request information for the following process after sending/receiving this frame. The priority request subfield indicates which priority this P-CTS is a response for, which should be the same as the priority specified in the responded P-RTS frame.

Other fields are the same as that outlined for P-RTS.

7.4. PR+CDP Frame Format

Figure 52:
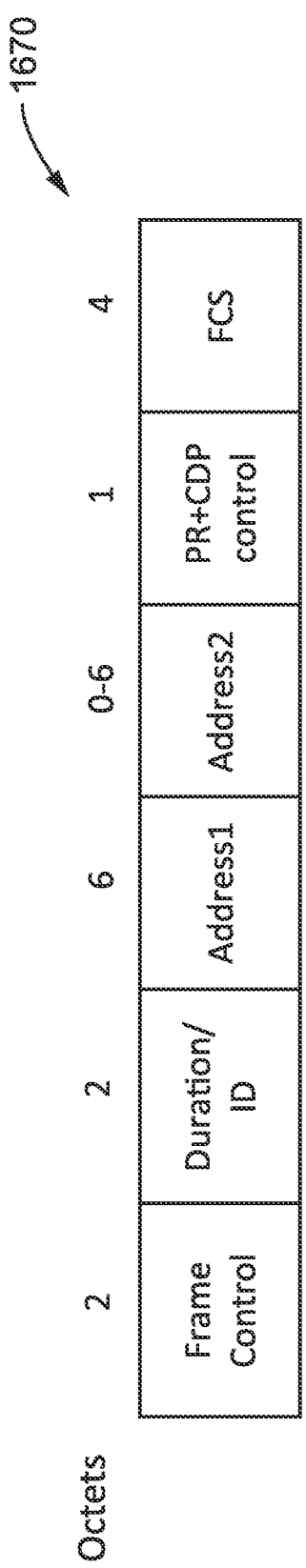
FIG. 52 is a data field diagram of a PR+CDP frame, according to at least one embodiment of the present disclosure.

FIG. 52 illustrates an example embodiment 1670 of a PR+CDP frame. When a FD AP detects an intra-BSS collision, it may broadcast a new frame (PR+CDP) to declare AP requests for higher priority (with indicating priority level) DATA transmission, it may also indicate scheduling rules such as PPDU alignment and/or ACK alignment in this frame.

A STA that receives a PR+CDP frame, and previously sent a prioritized control frame, such as P-RTS AP, should compare the AP declared priority carried by PR+CDP frame with the priority of the traffic it requested to send to AP. If the AP declared priority is higher than its own priority, it should suspend the retransmission of the previous control frame.

Figure 53:
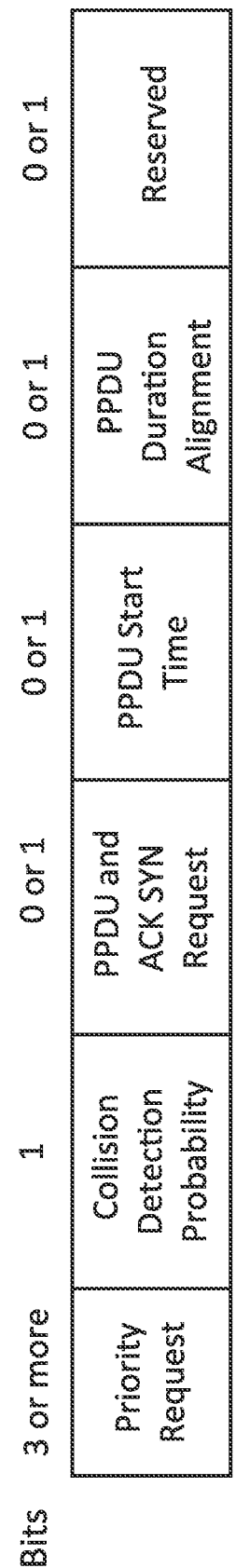
FIG. 53 is a data field diagram of the PR+CDP control field as seen in FIG. 52.

FIG. 53 illustrates an example embodiment 1690 of a PR+CDP control field. PR+CDP control field indicates the Priority Request and Collision Detection Probability information and the corresponding control information for the following process after sending/receiving this frame. A Priority Request subfield indicates the priority the STA that sent this frame requests to process at first. A Collision Detection Probability subfield indicates the estimated probability of an intra-BSS collision, possible values are 0 or 1. A PPDU and ACK SYN request subfield can be set to 1 to indicate that the STAs sending or receiving this frame should align the start point of PPDU and align the start point of ACK as the response of per received PPDU.

PPDU Start Time subfield: indicates the options of starting TX/RX PPDU after TX/RX this frame. If set as 0: means no specific start time indicated, STA starts sending PPDU a SIFS after completing all previous control frame exchange with its destination. (from sending RTS to receiving CTS and may include additional frame exchanges that used to cancel overestimation of collision detection).

If set as 1: indicates a specific start time, for example after 1 CTS frame duration+SIFS for FD STAs after receiving this frame. For FD STAs that sends this frame, it needs to add one more SIFS to the previous calculation since it starts counting after it transmits this frame.

PPDU Duration Alignment subfield: set to 1 for indicating that the PPDU shall be padded to end at the same time as indicated by the L-SIG field of the preamble. Other fields are same as that defined in P-RTS frame.

8. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a station (STA), wirelessly communicating with other STAs on a wireless local area network (WLAN) in an IEEE 802.11 protocol configured for supporting carrier sense multiple access/collision avoidance (CSMA/CA); (b) a processor of said STA; (c) a non-transitory memory storing instructions executable by the processor for communicating with other STAs and fulfilling different roles of a communications protocol; and (d) wherein said instructions, when executed by the processor, perform one or more steps of a preamble-based collision detection comprising: (d)(i) generating an orthogonal preamble by the STA, which is a full-duplex (FD) STA, said orthogonal preamble containing embedded traffic priority information, and processing preambles comprising: (d)(i)(A) upon detecting a colliding preamble with lower priority than its own priority, the STA retransmits the preamble and its associated physical layer protocol data unit (PPDU); (d)(i)(B) upon detecting a colliding preamble with equal or higher priority than its own priority, or with no priority, the STA stops its transmissions and starts a backoff after sensing the medium is idle; and (d)(i)(C) continuing to transmit the PPDU if a collision is not detected; (d)(ii) prioritizing transmission after processing an intra-basic service set (intra-BSS) collision estimation, comprising: (d)(ii)(A) indicating priority in each control frame transmitted for collision avoidance; and (d)(ii)(B) allowing higher priority traffic to be processed no later than lower priority traffic when an intra-BSS collision is estimated by a STA operating as a scheduler.

An apparatus for wireless communication in a network, the apparatus comprising: (a) a wireless communication circuit, as a station (STA), wirelessly communicating with other STAs on a wireless local area network (WLAN) in an IEEE 802.11 protocol configured for supporting carrier sense multiple access/collision avoidance (CSMA/CA); (b) a processor of said STA; (c) a non-transitory memory storing instructions executable by the processor for communicating with other STAs and fulfilling different roles of a communications protocol; and (d) wherein said instructions, when executed by the processor, perform one or more steps of a preamble-based collision detection comprising: (d)(i) generating orthogonal preambles, which are orthogonal in a time domain and/or a frequency domain, by the STA which is an FD STA, which contain embedded traffic priority information, and processing preambles comprising: (d)(i)(A) upon detecting a colliding preamble with lower priority than its own priority, the STA retransmits the preamble and its associated physical layer protocol data unit (PPDU); (d)(i)(B) upon detecting a colliding preamble with equal or higher priority than its own priority, or with no priority, the STA stops its transmissions and starts a backoff after sensing the medium is idle; and (d)(i)(C) continue transmitting the remainder of a PPDU if a collision is not detected; (d)(ii) prioritizing transmission after processing an intra-basic service set (intra-BSS) collision estimation, comprising: (d)(ii)(A) indicating priority in each control frame transmitted for collision avoidance; and (d)(ii)(B) allowing higher priority traffic to be processed no later than lower priority traffic when intra-BSS collision is estimated by a STA operating as a scheduler; (d)(iii) initiating a transmit opportunity (TXOP), and upon estimating existence of intra-basic service set (intra-BSS) interference a frame is broadcast to indicate preferred priority of requests to process for the TXOP.

A method of wireless communication in a network, comprising: (a) a wireless communication circuit, as a station (STA), wirelessly communicating with other STAs on a wireless local area network (WLAN) in an IEEE 802.11 protocol configured for supporting carrier sense multiple access/collision avoidance (CSMA/CA) configured for performing roles in preamble-based collision detection; (b) generating orthogonal preambles by the STA, which is an FD STA, which contain embedded traffic priority information, and processing preambles comprising: (b)(i) upon detecting a colliding preamble with lower priority than its own priority, the STA retransmits the preamble and its associated physical layer protocol data unit (PPDU); (b)(ii) upon detecting a colliding preamble with equal or higher priority than its own priority, or with no priority, the STA stops its transmissions and starts a backoff after sensing the medium is idle; and (b)(iii) continuing transmitting the remainder of a PPDU if a collision is not detected; (c) prioritizing transmission after processing an intra-basic service set (intra-BSS) collision estimation, comprising: (c)(i) indicating priority in each control frame transmitted for collision avoidance; and (c)(ii) allowing higher priority traffic to be processed no later than lower priority traffic when intra-BSS collision is estimated by a STA operating as a scheduler.

A WLAN apparatus comprising: (a) full-duplex (FD) stations (STA) enabled with new preamble-based collision detection without performing self-interference (SI) estimation, and provides new collision resolution estimation and scheduling for prioritized communication; (b) detecting collisions faster using orthogonal preambles without performing self-interference channel estimation; (c) embedding priority information in preambles; (d) priority levels can be predetermined and agreed upon by all FD STAs, and may be embedded in a FD preamble field, such as following the legacy preamble field defined in 802.11; (e) detecting the colliding preamble with lower priority than its own priority, and retransmit the preamble and its PPDU; otherwise stopping transmission and starting a backoff after sensing that the channel is idle; (f) detecting, by an FD STA, a collision without detecting the priority of the colliding preamble, wherein the STA should stop transmission and start a backoff after sensing that the channel is idle; and (g) not detecting a collision, wherein the STA continue transmitting the rest of the PPDU.

The apparatus or method of any preceding implementation, wherein said preamble-based collision detection is performed without the need of performing self-interference cancellation (SIC) channel estimation.

The apparatus or method of any preceding implementation, wherein priority information is embedded in preambles as predetermined and/or agreed upon by stations on the wireless network.

The apparatus or method of any preceding implementation, wherein priority information is embedded in preambles following the legacy preamble field defined in 802.11.

The apparatus or method of any preceding implementation, wherein said orthogonal preambles are orthogonal in a time domain, or in a frequency domain, or in both the time domain and the frequency domain.

The apparatus or method of any preceding implementation, wherein said orthogonal preambles in the time domain carry orthogonal priority signals which are orthogonal to other priority signals carried by preambles of other STAs.

The apparatus or method of any preceding implementation, wherein said orthogonal priority signals are preconfigured, and wherein central frequency synchronization between transmitters should be requested.

The apparatus or method of any preceding implementation, wherein said orthogonal preambles in the frequency domain contain priority information could embedded in different subcarriers spaced at least 40 ppm apart.

The apparatus or method of any preceding implementation, wherein the STA zeros out the tones of its own FD preamble to discover other STAs with a different priority.

The apparatus or method of any preceding implementation, wherein the FD STA may initiate a transmit opportunity (TXOP) with a ready-to-send (RTS), clear-to-send (CTS), message exchange.

The apparatus or method of any preceding implementation, wherein upon estimating existence of intra-basic service set (intra-BSS) interference a frame is broadcast to indicate preferred priority of requests to be processed for the TXOP.

The apparatus or method of any preceding implementation, wherein after receiving a frame indicating requested traffic priority, each FD STA on the network performs actions depending on which traffic priority is being processed: (i) when processing lower priority traffic than the requested priority, they stop any transmissions and retransmissions; and (ii) when processing higher, or equal, priority traffic than the requested priority, each FD STA continues their respective transmitter and receiver processing.

The apparatus or method of any preceding implementation, wherein said STA is an FD access point (AP) which triggers non-AP FD STAs on the network to initiate transmissions of lower prioritized traffic, allowing these non-AP FD STAs with lower prioritized traffic to re-access the channel without the need of being triggered, if the channel is idle for at least a PIFS duration after the non-AP FD STA receives a broadcast frame, which indicates a higher prioritized traffic is preferred.

The apparatus or method of any preceding implementation, wherein after processing requested priority traffic, the FD STA that broadcasted a frame with requested priority information then transmits another frame to estimated colliding FD STAs on the network, which have lower priority traffic, indicating they may commence lower priority traffic transmission and reception.

The apparatus or method of any preceding implementation, wherein the FD STA initiates a transmit-opportunity (TXOP) by transmitting a DATA PPDU.

The apparatus or method of any preceding implementation, wherein simultaneously transmitted and received preambles are utilized to estimate intra-basic-service-set (intra-BSS) collisions and make process decisions based on priority resolution as follows: (a) when existence of an intra-BSS collision with lower priority than itself is estimated, then the PPDU is retransmitted; (b) when existence of an intra-BSS collision with higher priority than itself is estimated, then transmission of the PPDU is stopped, unless a control frame was received from the reserved RU or the non-reserved RUs; and (c) when a preamble is received without a DATA PPDU portion, then a control frame is transmitted over reserved RUs to indicate there is an over-estimated intra-BSS collision.

The apparatus or method of any preceding implementation, wherein for the overestimated intra-BSS collision, a STA in the network that sourced this preamble receives this control frame through reserved RUs, and retransmits or triggers retransmission of previously terminated PPDUs with lower priority which had been overestimated as the intra-BSS colliding signal.

The apparatus or method of any preceding implementation, wherein after receiving a frame indicating requested traffic priority, each FD STA on the network performs actions depending on which traffic priority being processed: (i) when processing lower priority traffic than the requested priority, they stop any transmissions and retransmissions; and (ii) when processing higher, or equal, priority traffic than the requested priority, each FD STA continues their respective transmitter and receiver processing.

The apparatus or method of any preceding implementation, wherein prioritized transmission is guaranteed after processing intra-BSS collision estimation: (a) FD STAs should indicate priority in the control frames used for collision avoidance; (b) FD scheduler STA should allow the higher priority traffic to be processed no later than the lower priority traffic when intra-BSS collision is estimated.

The apparatus or method of any preceding implementation, wherein a FD STA uses orthogonal preambles in the time domain and/or the frequency domain.

The apparatus or method of any preceding implementation, wherein for time-domain orthogonal preambles: (i) each STA Transmits FD preamble of the PPDU that carries the priority signals that is orthogonal to other priority signals carried by the other STA's FD preamble; and the orthogonal priority signals are preconfigured; and (ii) the application requests central frequency synchronization between transmitters.

The apparatus or method of any preceding implementation, wherein for frequency-domain orthogonal preambles: (i) priority information can be embedded in different sub-carriers at least 40 ppm apart on frequency domain of the FD preamble; (ii) in baseband after analog cancellation and before digital cancellation (note that the digital cancellation requires SI channel estimation), STA zeros out the tones of its own FD preamble to discover other STAs with a different priority; (iii) as this application is CFO tolerance, a request may not be made for central frequency synchronization between transmitters.

The apparatus or method of any preceding implementation, wherein an FD STA may initiate the TXOP with RTS/CTS exchange: (a) FD STA that estimates an existing of intra-BSS interference may broadcast a frame to indicate the preferred priority it requests to process at the first place; (b) After receiving the frame indicating the request traffic priority, FD STAs perform differently depend on the traffic priorities they are processing: (i) For FD STAs dealing with lower priority traffic than the requested priority, they shall stop any transmission/retransmission; (ii) For FD STAs dealing with higher/same priority traffic than the requested priority, they should continue their TX/RX process; (c) an FD AP may trigger non-AP FD device to initiate the transmission of lower prioritized traffic; wherein the non-AP FD device with lower prioritized traffic may re-access channel, without being triggered, if the channel is idle for at least a PIFS duration after the non-AP FD device receives the broadcast frame, which indicating a higher prioritized traffic is preferred; (d) after finishing processing the requested priority traffic, FD STA that broadcasted the frame with requested priority information may send another frame to the estimated colliding FD STAs with lower priority traffic to start the process of lower traffic transmission and reception.

The apparatus or method of any preceding implementation, wherein in the FD STA that stops (re)transmission after receiving a broadcasted frame w/higher request priority than its own priority, may access the medium if it doesn't receive or detect any frames from STAs that dealing with the requested priority traffic after a certain time, e.g., 1 PIFS after stops (re)transmission.

The apparatus or method of any preceding implementation, wherein the FD STA that overestimated an intra-BSS collision should be aware of the overestimation after it receives a response frame from the estimated collision destination.

The apparatus or method of any preceding implementation, wherein the FD STA finds out it overestimated an intra-BSS collision, should response a frame to the overestimated colliding source who sent a frame e.g., RTS w/priority but haven't receive the response frame.

The apparatus or method of any preceding implementation, wherein the FD STAs w/different traffic priorities have received the response from their destinations to allow their transmissions. They could starts transmitting one or multiple PPDUs to their destinations simultaneously with PPDUs' start points alignment and end points or PPDU length alignment.

The apparatus or method of any preceding implementation, wherein the alignment of start time of PPDU can be achieved in: (a) based on the predetermined time after the collision detecting STA sends the $1^{st}$ frame e.g., P-RTS till it receives a response frame e.g., P-CTS with an additional SIFS; (b) an alignment information, e.g., PPDU start time can be defined in the broadcasted frame that indicating the request priority.

The apparatus or method of any preceding implementation, wherein the alignment of PPDU length can be achieved in: (a) Indicate in the first frame to start a new TXOP, e.g., P-RTS; (b) Indicate in the broadcasted frame that indicating the request priority; and (c) Indicated in a management frame that exchangeable between AP and STAs.

The apparatus or method of any preceding implementation, wherein the destination FD STAs that receive the PPDUs as recited in previous claims, shall response Ack/BA simultaneously with the Ack/BA alignment; wherein the transmitted Ack/BA shall not overlap with any concurrent TX/RX of PPDUs at the Ack/BA destination.

The apparatus or method of any preceding implementation, wherein said Ack/BA alignment could be achieved by: (a) sending a BA request with each PPDU, FD STA only response BA when receives BA request; (b) configuring as claimed in a previous claim in the first frame to start new TXOP, e.g., P-RTS; or in the broadcasted frame that indicating the request priority or in a management frame that exchangeable between AP and STAs.

The apparatus or method of any preceding implementation, wherein the FD STA may initiate the TXOP with transmitting DATA PPDU.

The apparatus or method of any preceding implementation, wherein the simultaneously transmitted and received preambles are utilized to estimate the intra-BSS collision and decide on the following process based on the priority resolution; (a) a FD device estimates the existing of an intra-BSS collision with lower priority than itself should retransmit the PPDU; and wherein a portion of the RUs may be reserved not for serving DATA PPDUs for this device but for exchange control massages between AP and other STAs; (b) A FD device estimates the existing of an intra-BSS collision with higher priority than itself should stop transmitting the rest of the PPDU, unless it receives a control frame from the reserved RU or the non-reserved RUs, e.g., trigger from its destination. If this STA doesn't hear any other frame exchanges between other STAs, it may access the channel again after EDCA backoff when CCA idle; and wherein (c) a FD device only receives a preamble without the rest of the DATA PPDU may send a control frame using the reserved RUs (could be predetermined RUs) to indicated there is an overestimated intra-BSS collision; wherein if the preamble source STA receives this control frame through the reserved RUs, it may retransmit or trigger (through reserved RUs) the retransition of the previously terminated PPDUs with lower priority which has been overestimated as the intra-BSS colliding signal.

The apparatus or method of any preceding implementation, wherein in the FD STAs may receive the PPDUs of different flows simultaneously, they shall response Ack/BA simultaneously with the Ack/BA alignment.

The apparatus or method of any preceding implementation, wherein said Ack/BA alignment could be achieved by: (a) Send BA request with each PPDU, FD STA only response BA when receives BA request; (b) configure that as in a previous claim, in the first frame to start new TXOP; or in the control frame that indicating the request priority or in a management frame that exchangeable between AP and STAs.

The apparatus or method of any preceding implementation, wherein the alignment of PPDU end point can be achieved in: (a) Indicate in the first frame to start new TXOP; (b) indicate in the control frames that indicating the request priority and exchanged in the reserved RUs; and (c) indicated in a management frame that exchangeable between AP and STAs.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
   (a) a wireless communication circuit, as a station (STA), wirelessly communicating with other STAs on a wireless local area network (WLAN) in an IEEE 802.11 protocol configured for supporting carrier sense multiple access/collision avoidance (CSMA/CA);
   (b) a processor of said STA;
   (c) a non-transitory memory storing instructions executable by the processor for communicating with other STAs and fulfilling different roles of a communications protocol; and
   (d) wherein said instructions, when executed by the processor, perform one or more steps of a preamble-based collision detection comprising:
      (i) generating an orthogonal preamble by the STA, which is a full-duplex (FD) STA, said orthogonal preamble containing embedded traffic priority information, and processing preambles comprising:
         (A) upon detecting a colliding preamble with lower priority than its own priority, the STA retransmits the preamble and its associated physical layer protocol data unit (PPDU);
         (B) upon detecting a colliding preamble with equal or higher priority than its own priority, or with no priority, the STA stops its transmissions and starts a backoff after sensing the medium is idle; and
         (C) continuing to transmit the PPDU if a collision is not detected;
      (ii) prioritizing transmission after processing an intra-basic service set (intra-BSS) collision estimation, comprising:
         (A) indicating priority in each control frame transmitted for collision avoidance; and
         (B) allowing higher priority traffic to be processed no later than lower priority traffic when an intra-BSS collision is estimated by a STA operating as a scheduler.

2. The apparatus of claim 1, wherein said preamble-based collision detection is performed without the need of performing self-interference cancellation (SIC) channel estimation.

3. The apparatus of claim 1, wherein priority information is embedded in preambles as predetermined and/or agreed upon by stations on the wireless network.

4. The apparatus of claim 1, wherein priority information is embedded in preambles following the legacy preamble field defined in 802.11.

5. The apparatus of claim 1, wherein said orthogonal preambles are orthogonal in a time domain, or in a frequency domain, or in both the time domain and the frequency domain.

6. The apparatus of claim 5, wherein said orthogonal preambles in the time domain carry orthogonal priority signals which are orthogonal to other priority signals carried by preambles of other STAs.

7. The apparatus of claim 6, wherein said orthogonal priority signals are preconfigured, and wherein central frequency synchronization between transmitters should be requested.

8. The apparatus of claim 5, wherein said orthogonal preambles in the frequency domain contain priority information could embedded in different subcarriers spaced at least 40 ppm apart.

9. The apparatus of claim 8, wherein the STA zeros out the tones of its own FD preamble to discover other STAs with a different priority.

10. The apparatus of claim 1, wherein the FD STA may initiate a transmit opportunity (TXOP) with a ready-to-send (RTS), clear-to-send (CTS), message exchange.

11. The apparatus of claim 10, wherein upon estimating existence of intra-basic service set (intra-BSS) interference a frame is broadcast to indicate preferred priority of requests to be processed for the TXOP.

12. The apparatus of claim 1, wherein after receiving a frame indicating requested traffic priority, each FD STA on the network performs actions depending on which traffic priority is being processed: (i) when processing lower priority traffic than the requested priority, they stop any transmissions and retransmissions; and (ii) when processing higher, or equal, priority traffic than the requested priority, each FD STA continues their respective transmitter and receiver processing.

13. The apparatus of claim 1, wherein said STA is an FD access point (AP) which triggers non-AP FD STAs on the network to initiate transmissions of lower prioritized traffic, allowing these non-AP FD STAs with lower prioritized traffic to re-access the channel without the need of being triggered, if the channel is idle for at least a PIFS duration after the non-AP FD STA receives a broadcast frame, which indicates a higher prioritized traffic is preferred.

14. The apparatus of claim 1, wherein after processing requested priority traffic, the FD STA that broadcasted a frame with requested priority information then transmits another frame to estimated colliding FD STAs on the network, which have lower priority traffic, indicating they may commence lower priority traffic transmission and reception.

15. The apparatus of claim 1, wherein the FD STA initiates a transmit-opportunity (TXOP) by transmitting a DATA PPDU.

16. The apparatus of claim 15, wherein simultaneously transmitted and received preambles are utilized to estimate intra-basic-service-set (intra-BSS) collisions and make process decisions based on priority resolution as follows: (a) when existence of an intra-BSS collision with lower priority than itself is estimated, then the PPDU is retransmitted; (b) when existence of an intra-BSS collision with higher priority than itself is estimated, then transmission of the PPDU is stopped, unless a control frame was received from the reserved RU or the non-reserved RUs; and (c) when a preamble is received without a DATA PPDU portion, then a control frame is transmitted over reserved RUs to indicate there is an overestimated intra-BSS collision.

17. The apparatus of claim 16, wherein for the overestimated intra-BSS collision, a STA in the network that sourced this preamble receives this control frame through reserved RUs, and retransmits or triggers retransmission of previously terminated PPDUs with lower priority which had been overestimated as the intra-BSS colliding signal.

18. An apparatus for wireless communication in a network, the apparatus comprising:
(a) a wireless communication circuit, as a station (STA), wirelessly communicating with other STAs on a wireless local area network (WLAN) in an IEEE 802.11 protocol configured for supporting carrier sense multiple access/collision avoidance (CSMA/CA);
(b) a processor of said STA;
(c) a non-transitory memory storing instructions executable by the processor for communicating with other STAs and fulfilling different roles of a communications protocol; and
(d) wherein said instructions, when executed by the processor, perform one or more steps of a preamble-based collision detection comprising:
  (i) generating orthogonal preambles, which are orthogonal in a time domain and/or a frequency domain, by the STA which is an FD STA, which contain embedded traffic priority information, and processing preambles comprising:
    (A) upon detecting a colliding preamble with lower priority than its own priority, the STA retransmits the preamble and its associated physical layer protocol data unit (PPDU);
    (B) upon detecting a colliding preamble with equal or higher priority than its own priority, or with no priority, the STA stops its transmissions and starts a backoff after sensing the medium is idle; and
    (C) continue transmitting the remainder of a PPDU if a collision is not detected;
  (ii) prioritizing transmission after processing an intra-basic service set (intra-BSS) collision estimation, comprising:
    (A) indicating priority in each control frame transmitted for collision avoidance; and
    (B) allowing higher priority traffic to be processed no later than lower priority traffic when intra-BSS collision is estimated by a STA operating as a scheduler;
  (iii) initiating a transmit opportunity (TXOP), and upon estimating existence of intra-basic service set (intra-BSS) interference a frame is broadcast to indicate preferred priority of requests to process for the TXOP.

19. The apparatus of claim 18, wherein after receiving a frame indicating requested traffic priority, each FD STA on the network performs actions depending on which traffic priority being processed: (i) when processing lower priority traffic than the requested priority, they stop any transmissions and retransmissions; and (ii) when processing higher, or equal, priority traffic than the requested priority, each FD STA continues its respective transmitter and receiver processing.

20. A method of wireless communication in a network, comprising:
(a) a wireless communication circuit, as a station (STA), wirelessly communicating with other STAs on a wireless local area network (WLAN) in an IEEE 802.11 protocol configured for supporting carrier sense multiple access/collision avoidance (CSMA/CA) configured for performing roles in preamble-based collision detection;
(b) generating orthogonal preambles by the STA, which is an FD STA, which contain embedded traffic priority information, and processing preambles comprising:
  (i) upon detecting a colliding preamble with lower priority than its own priority, the STA retransmits the preamble and its associated physical layer protocol data unit (PPDU);
  (ii) upon detecting a colliding preamble with equal or higher priority than its own priority, or with no priority, the STA stops its transmissions and starts a backoff after sensing the medium is idle; and
  (iii) continuing transmitting the remainder of a PPDU if a collision is not detected;
(c) prioritizing transmission after processing an intra-basic service set (intra-BSS) collision estimation, comprising:
  (i) indicating priority in each control frame transmitted for collision avoidance; and
  (ii) allowing higher priority traffic to be processed no later than lower priority traffic when intra-BSS collision is estimated by a STA operating as a scheduler.

* * * * *